United States Patent
Resch et al.

(10) Patent No.: US 10,225,205 B2
(45) Date of Patent: *Mar. 5, 2019

(54) ACCESSING A DISPERSED STORAGE NETWORK

(71) Applicant: International Business Machines Corporation, Armonk, NY (US)

(72) Inventors: Jason K. Resch, Chicago, IL (US); Greg Dhuse, Chicago, IL (US); Manish Motwani, Chicago, IL (US); Andrew Baptist, Mt. Pleasant, WI (US); Wesley Leggette, Chicago, IL (US); Ravi Khadiwala, Bartlett, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/903,992

(22) Filed: Feb. 23, 2018

(65) Prior Publication Data

US 2018/0191633 A1    Jul. 5, 2018

Related U.S. Application Data

(63) Continuation of application No. 14/707,943, filed on May 8, 2015, now Pat. No. 9,923,838.

(Continued)

(51) Int. Cl.
*G06F 15/167* (2006.01)
*H04L 12/911* (2013.01)
(Continued)

(52) U.S. Cl.
CPC .............. *H04L 47/70* (2013.01); *G06F 3/067* (2013.01); *G06F 3/0616* (2013.01);
(Continued)

(58) Field of Classification Search
CPC ...... G06F 3/067; G06F 3/0644; G06F 3/0614; G06F 3/0608
(Continued)

(56) References Cited

U.S. PATENT DOCUMENTS 4,092,732 A    5/1978  Ouchi
5,454,101 A    9/1995  MacKay et al.
(Continued)

OTHER PUBLICATIONS

Chung; An Automatic Data Segmentation Method for 3D Measured Data Points; National Taiwan University; pp. 1-8; 1998.
(Continued)

*Primary Examiner* — Phuoc H Nguyen
(74) *Attorney, Agent, or Firm* — Garlick & Markison; Timothy W. Markison; Harry S. Tyson, Jr.

(57) ABSTRACT

Methods and apparatus for selection of memory locations for data access operations in a dispersed storage network (DSN) are disclosed. In various embodiments, a dispersed storage (DS) processing module of the DSN receives a DSN access request regarding at least one data segment of a data object. The DS processing module determines a DSN address associated with the DSN access request and performs a scoring function using the DSN address and one or more properties of DSN memory to produce a storage scoring resultant. The storage scoring resultant is utilized to identify a set of storage units of the DSN. A set of access requests is then sent to the set of storage units regarding the DSN access request. The scoring function can include, for example, performing deterministic functions, normalizing functions and ranking functions to produce the storage scoring resultant.

20 Claims, 62 Drawing Sheets

Related U.S. Application Data

(60) Provisional application No. 62/019,074, filed on Jun. 30, 2014.

(51) Int. Cl.
*G06F 3/06* (2006.01)
*H04L 29/08* (2006.01)

(52) U.S. Cl.
CPC .......... *G06F 3/0623* (2013.01); *G06F 3/0647* (2013.01); *G06F 3/0685* (2013.01); *H04L 67/1097* (2013.01)

(58) Field of Classification Search
USPC .................................................. 709/212–216
See application file for complete search history.

(56) References Cited

U.S. PATENT DOCUMENTS

| | | | |
|---|---|---|---|
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Raiford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 8,275,744 B2 | 9/2012 | Baptist et al. | |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula | |
| 2005/0132070 A1 | 6/2005 | Redlich et al. | |
| 2005/0144382 A1 | 6/2005 | Schmisseur | |
| 2005/0229069 A1 | 10/2005 | Hassner et al. | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters et al. | |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |
| 2011/0106972 A1 | 5/2011 | Grube et al. | |
| 2012/0311068 A1 | 12/2012 | Gladwin et al. | |
| 2013/0110962 A1 | 5/2013 | Grube | |
| 2013/0111166 A1 | 5/2013 | Resch et al. | |
| 2013/0151670 A1 | 6/2013 | Leggette et al. | |
| 2013/0275480 A1 | 10/2013 | Dhuse et al. | |
| 2013/0290482 A1 | 10/2013 | Leggette | |
| 2014/0330921 A1 | 11/2014 | Storm et al. | |
| 2015/0067421 A1* | 3/2015 | Baptist | H04L 67/1097 714/723 |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 1511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): String Representation of Search Filters; IETF Network Working Group; RFC 4515; Jun. 2006; pp. 1-12.

Smith; Lightweight Directory Access Protocol (LDAP): Uniform Resource Locator; IETF Network Working Group; RFC 4516; Jun. 2006; pp. 1-15.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Technical Specification Road Map; IETF Network Working Group; RFC 4510; Jun. 2006; pp. 1-8.

(56) References Cited

OTHER PUBLICATIONS

Zeilenga; Lightweight Directory Access Protocol (LDAP): Directory Information Models; IETF Network Working Group; RFC 4512; Jun. 2006; pp. 1-49.
Zeilenga; Lightweight Directory Access Protocol (LDAP): Internationalized String Preparation; IETF Network Norking Group; RFC 4518; Jun. 2006; pp. 1-14.
Zeilenga; Lightweight Directory Access Protocol (LDAP): String Representation of Distinguished Names; IETF Network Working Group; RFC 4514; Jun. 2006; pp. 1-15.

* cited by examiner

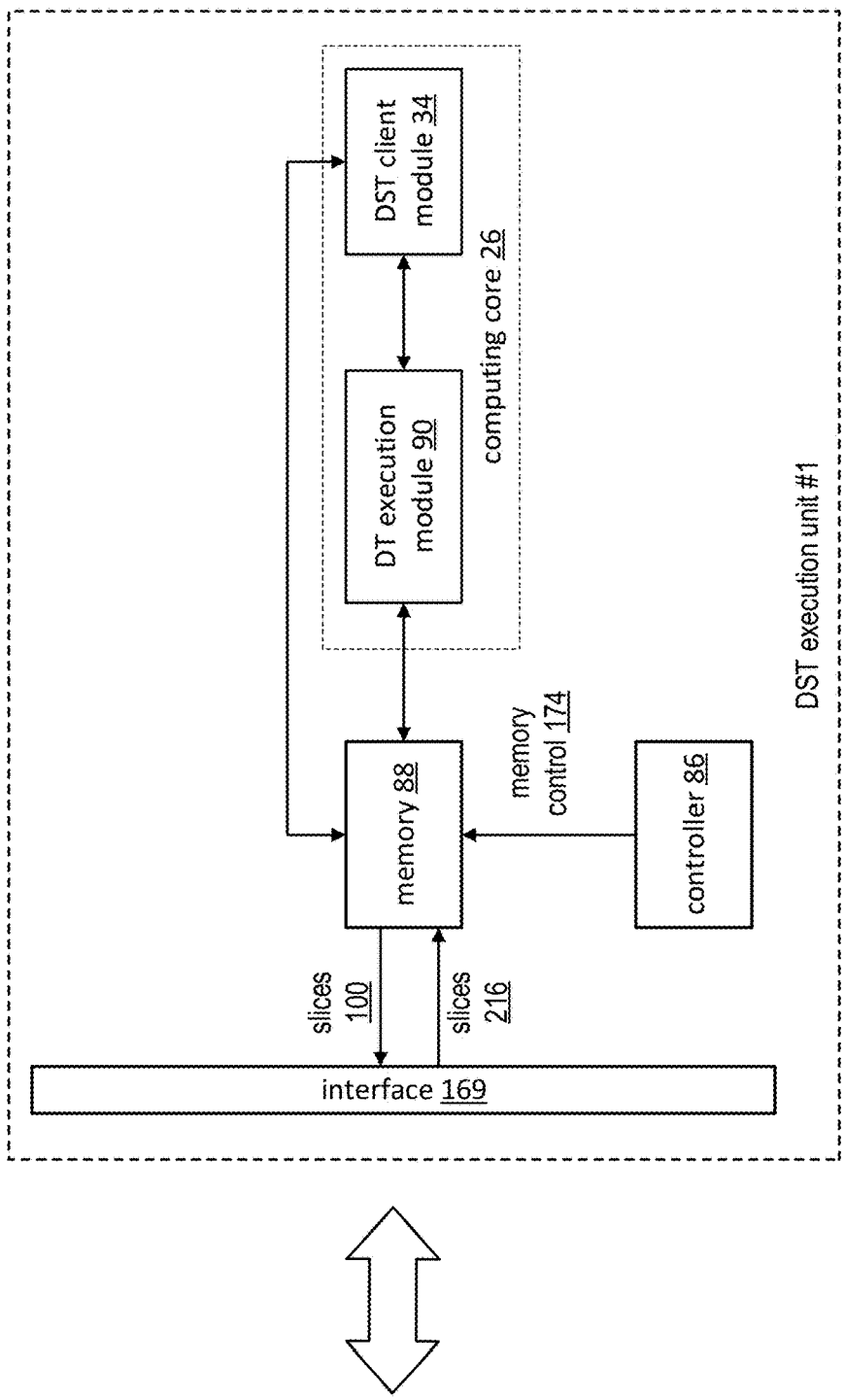
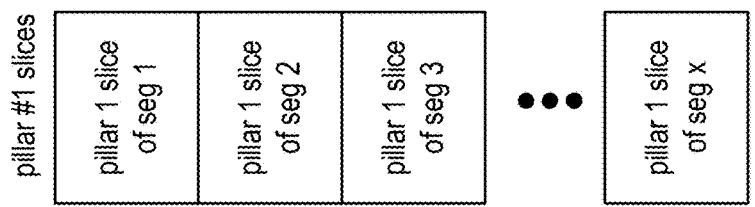
FIG. 24

| DST allocation info 242 | data partition info 320: data ID; | No. of partitions; | Addr. info for each partition; | format conversion indication | | |
|---|---|---|---|---|---|---|
| task execution info 322 ||||| intermediate result info 324 ||
| task 326 | task ordering 328 | data partition 330 | set of DT EX mods 332 | Name 334 | interm. result processing 336 | scratch pad storage 338 | intermediate result storage 340 |
|---|---|---|---|---|---|---|---|
| 1_1 | none | 2_1 - 2_z | 1_1, 2_1, 3_1, 4_1, & 5_1 | R1-1 | DST unit 1 | DST unit 1 | DST units 1-5 |
| 1_2 | none | 2_1 - 2_4 | 1_1, 2_1, 3_1, 4_1, & 5_1 | R1-2 | DST unit 1 | DST unit 1 | DST units 1-5 |
| 1_3 | none | 2_1 - 2_4<br>2_5 - 2_z | 1_1, 2_1, 3_1, 4_1, & 5_1<br>1_2, 2_2, 3_2, 4_2, & 5_2 | R1-3 | DST unit 2 | DST unit 2 | DST units 2-6 |
| 1_4 | after 1_3 | R1-3_1 - R1-3_4<br>R1-3_5 - R1-3_z | 1_1, 2_1, 3_1, 4_1, & 5_1<br>1_2, 2_2, 6_1, 7_1, & 7_2 | R1_4 | DST unit 3 | DST unit 3 | DST units 3-7 |
| 1_5 | after 1_4 | R1-4_1 - R1-4_z &<br>2_1 - 2_z | 1_1, 2_1, 3_1, 4_1, & 5_1 | R1-5 | DST unit 1 | DST unit 1 | DST units 1-5 |
| 1_6 | after 1_1 & 1_5 | R1-1_1 - R1-1_z &<br>R1-5_1 - R1-5_z | 1_2, 2_2, 3_2, 4_2, & 5_2 | R1-6 | DST unit 2 | DST unit 2 | DST units 2-6 |
| 1_7 | after 1_2 & 1_5 | R1-2_1 - R1-2_z &<br>R1-5_1 - R1-5_z | 1_2, 2_2, 3_2, 4_2, & 5_2 | R1-7 | DST unit 3 | DST unit 3 | DST units 3-7 |
| 2 | none | 2_1 - 2_z | 3_1, 4_1, 5_1, 6_1, & 7_1 | R2 | DST unit 7 | DST unit 7 | DST units 7, 1-4 |
| 3_1 | none (same as 1_3) | use R1_3 | | R1-1 | | | |
| 3_2 | after 3_1 | R1-3_1 - R1-3_z | 1_2, 2_2, 3_2, 4_2, & 5_2 | R3-2 | DST unit 5 | DST unit 5 | DST units 5,6, 1-3 |

FIG. 32

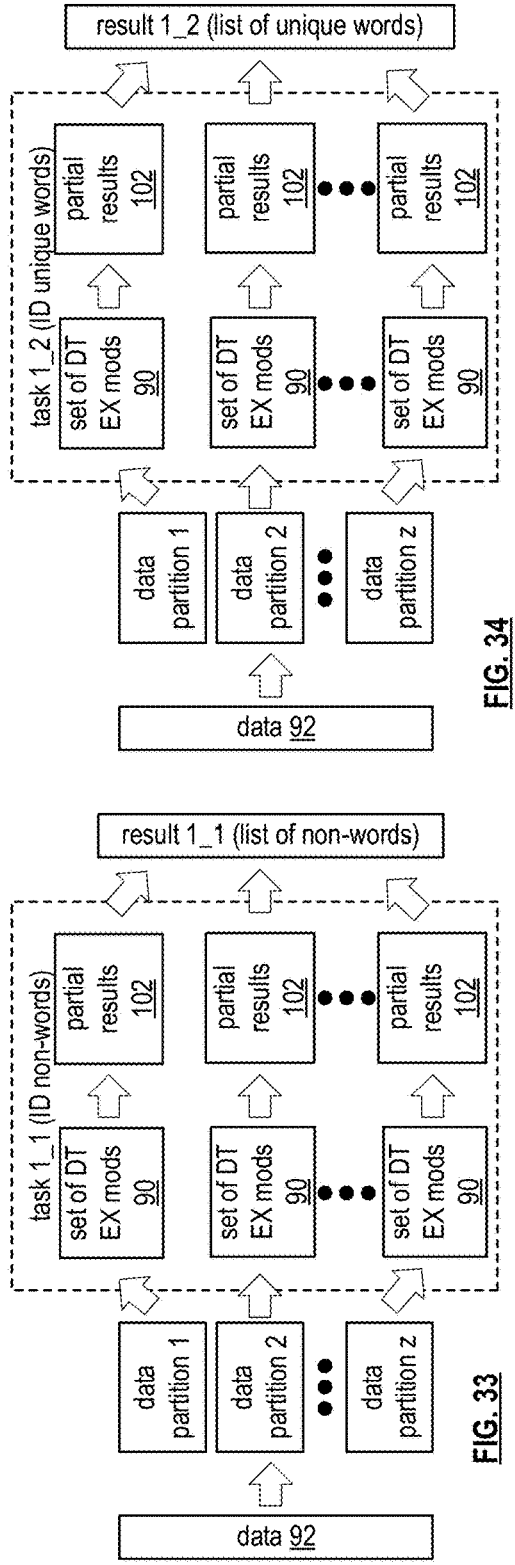
FIG. 33
FIG. 34
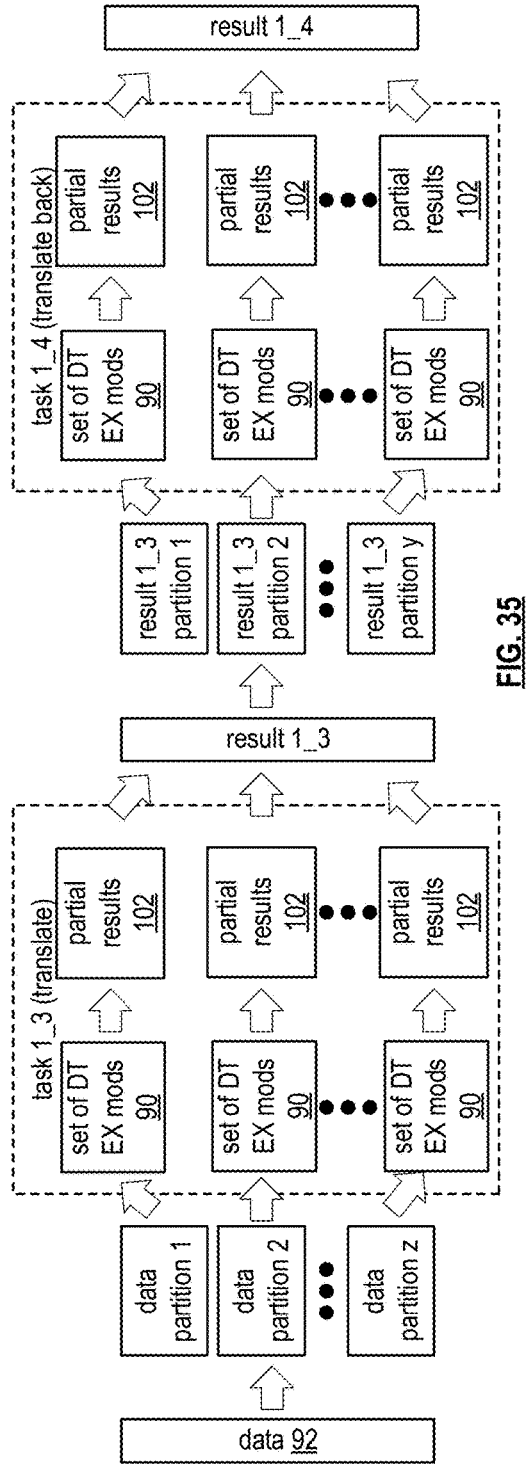
FIG. 35

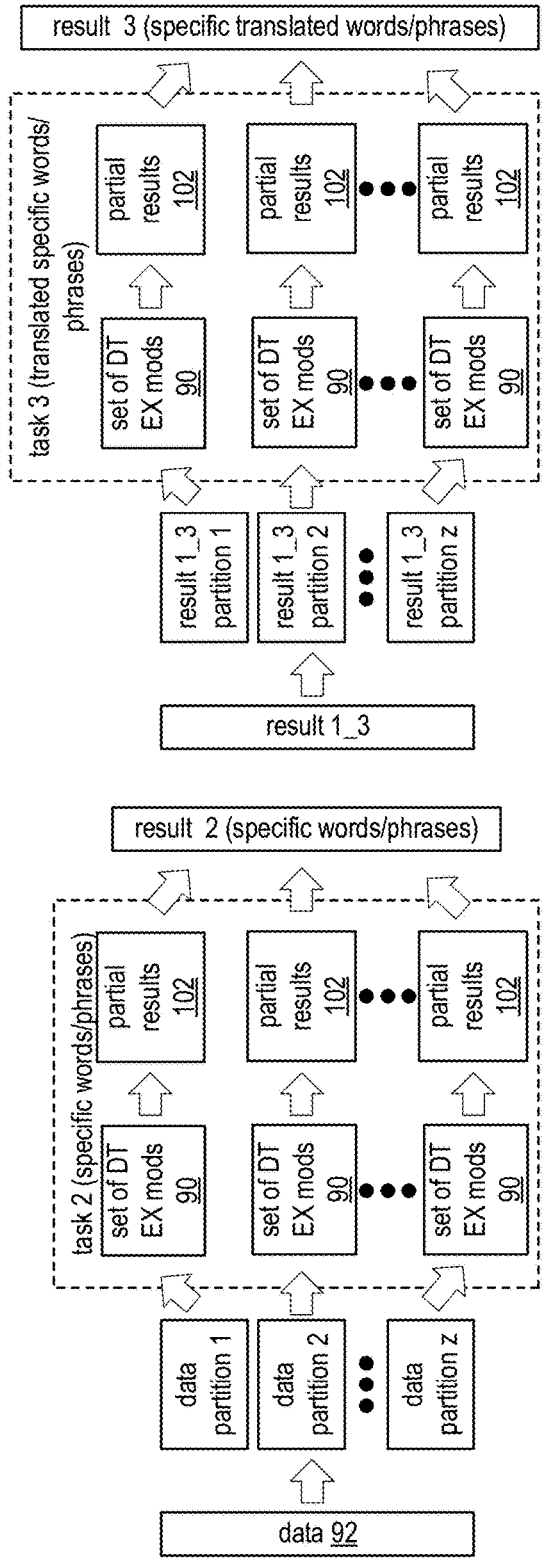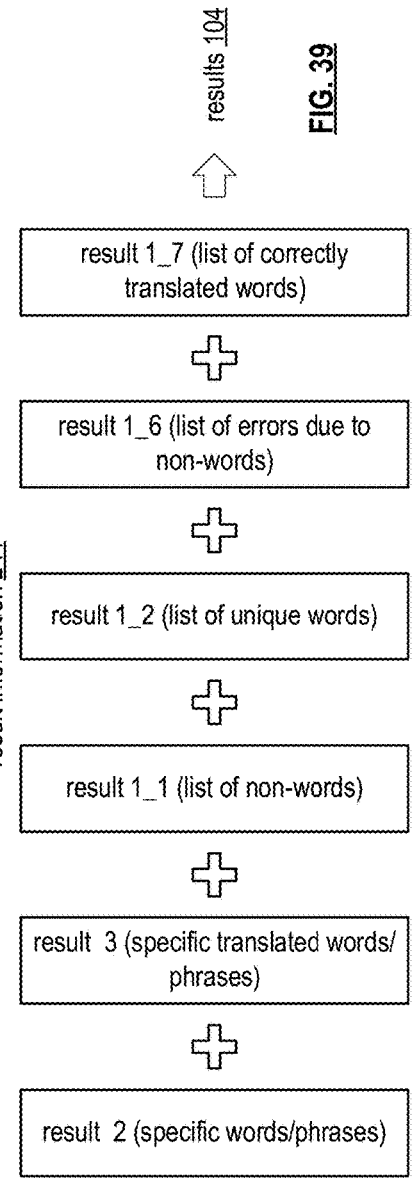

US 10,225,205 B2

ACCESSING A DISPERSED STORAGE NETWORK

CROSS REFERENCE TO RELATED PATENTS

The present U.S. Utility Patent Application claims priority pursuant to 35 U.S.C. § 120 as a continuation of U.S. Utility application Ser. No. 14/707,943, entitled "ACCESSING A DISPERSED STORAGE NETWORK", filed May 8, 2015, which claims priority pursuant to 35 U.S.C. § 119(e) to U.S. Provisional Application No. 62/019,074, entitled "UTILIZING A DECENTRALIZED AGREEMENT PROTOCOL IN A DISPERSED STORAGE NETWORK", filed Jun. 30, 2014, both of which are hereby incorporated herein by reference in their entirety and made part of the present U.S. Utility Patent Application for all purposes.

TECHNICAL FIELD OF THE INVENTION

This invention relates generally to computer networks and more particularly to dispersed storage of data and selection of memory locations for data access operations.

DESCRIPTION OF RELATED ART

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc., on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 24 is a schematic block diagram of an example of a storage operation of a DST execution unit in accordance with the present invention;

FIG. 32 is a diagram of an example of DST allocation information for the example of FIG. 30 in accordance with the present invention;

FIGS. 33-38 are schematic block diagrams of the DSTN module performing the example of FIG. 30 in accordance with the present invention;

FIG. 39 is a diagram of an example of combining result information into final results for the example of FIG. 30 in accordance with the present invention;

DETAILED DESCRIPTION OF THE INVENTION

Figure 1:
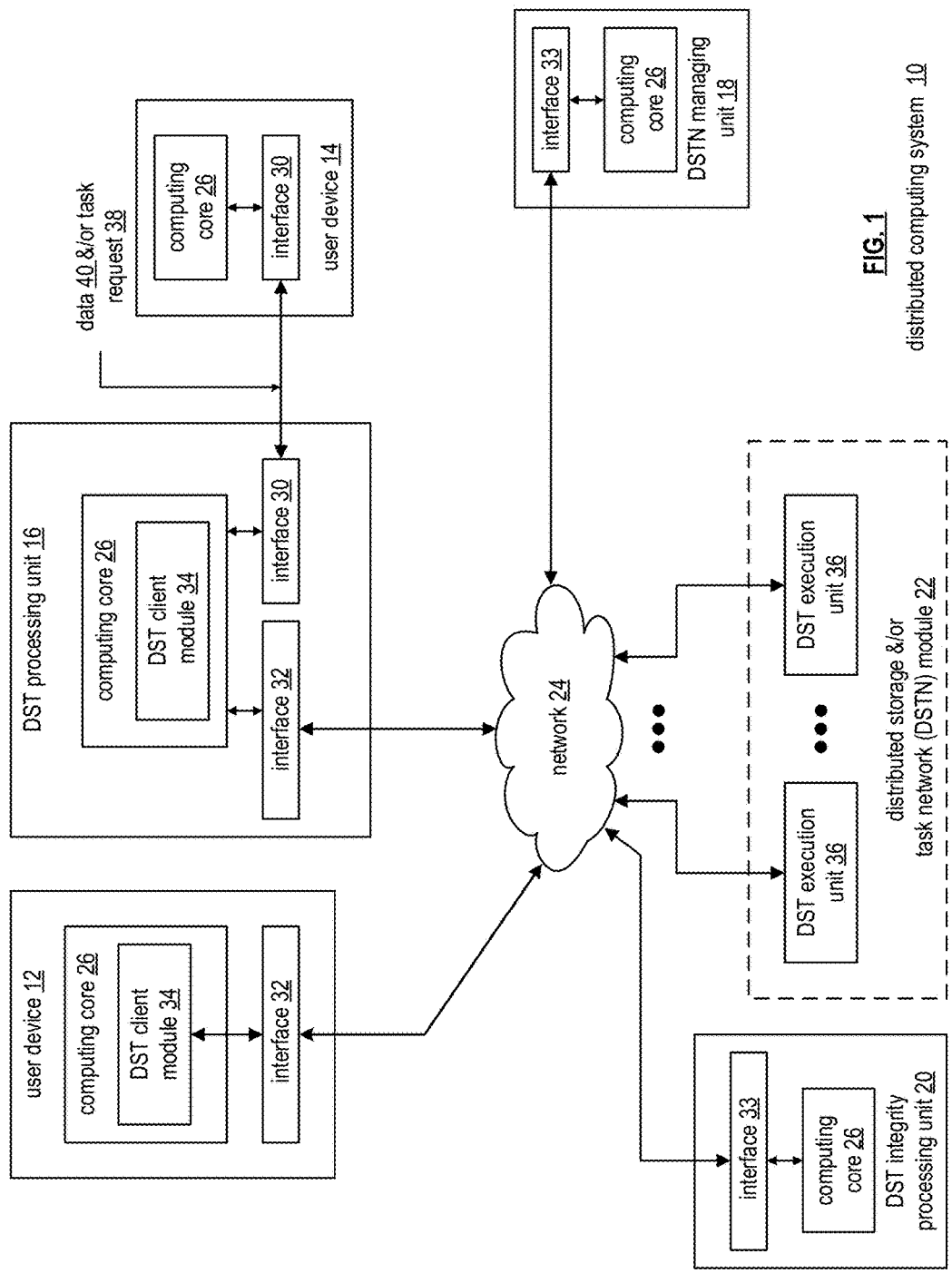
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public internet systems; and/or one or more local area networks (LAN) and/or wide area networks (WAN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interface 30 supports a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general and with respect to DS error encoded data storage and retrieval, the distributed computing system 10 supports three primary operations: storage management, data storage and retrieval (an example of which will be discussed with reference to FIGS. 20-26), and data storage integrity verification. In accordance with these three primary functions, data can be encoded, distributedly stored in physically different locations, and subsequently retrieved in a reliable and secure manner. Such a system is tolerant of a significant number of failures (e.g., up to a failure level, which may be greater than or equal to a pillar width minus a decode threshold minus one) that may result from individual storage device failures and/or network equipment failures without loss of data and without the need for a redundant or backup copy. Further, the system allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated registry information in one or more of the DSTN module 22, the user device 12, the DST processing unit 16, and the DST integrity processing unit 20.

The DS error encoding parameters (e.g., or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

To support distributed task processing on received data, the distributed computing system 10 has two primary operations: DST (distributed storage and/or task processing) management and DST execution on received data (an example of which will be discussed with reference to FIGS. 3-19). With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. An example of DST execution on stored data will be discussed in greater detail with reference to FIGS. 27-39. With respect to the DST management, it is substantially similar to the DST management to support distributed task processing on received data.

Figure 2:
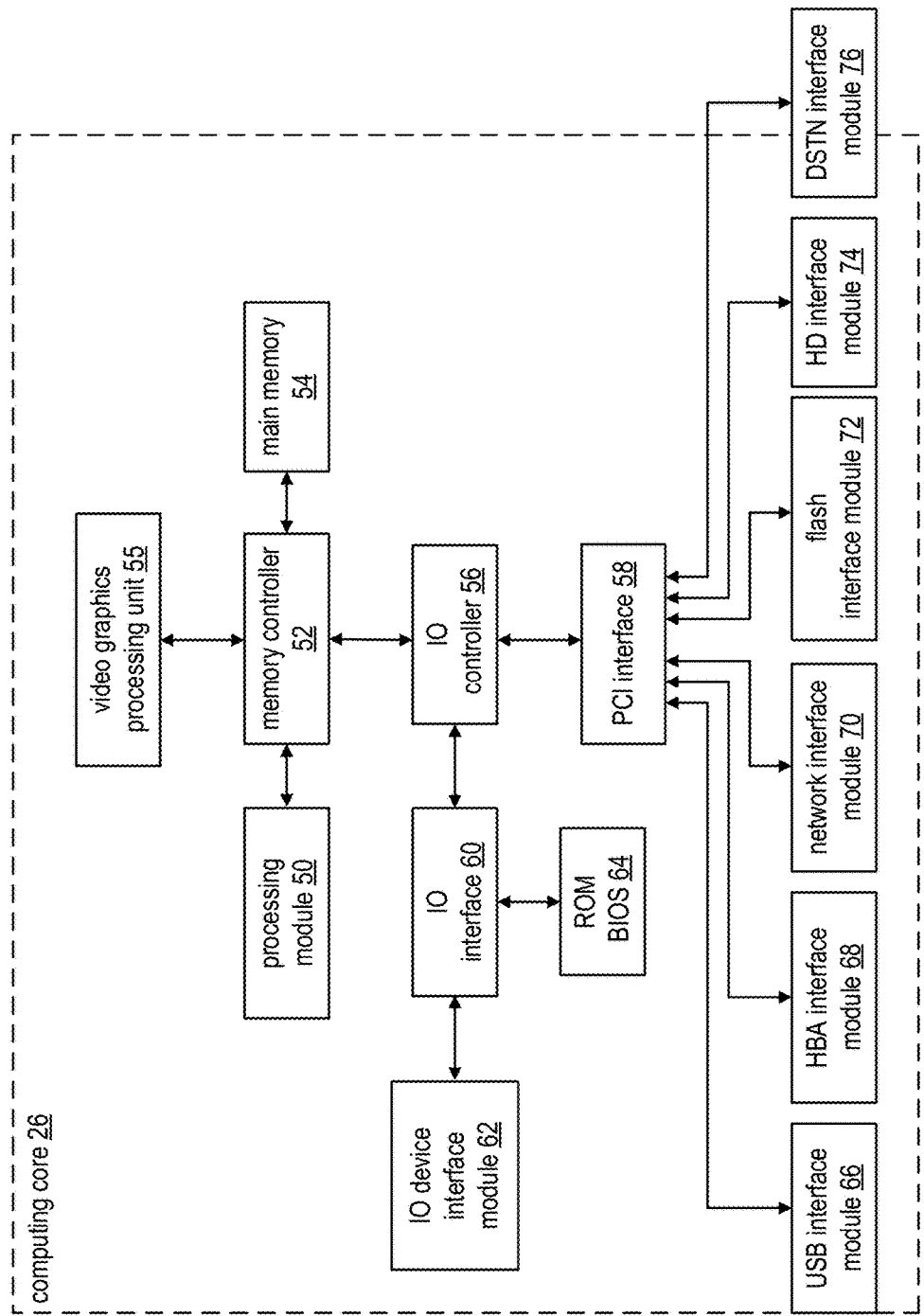
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (TO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
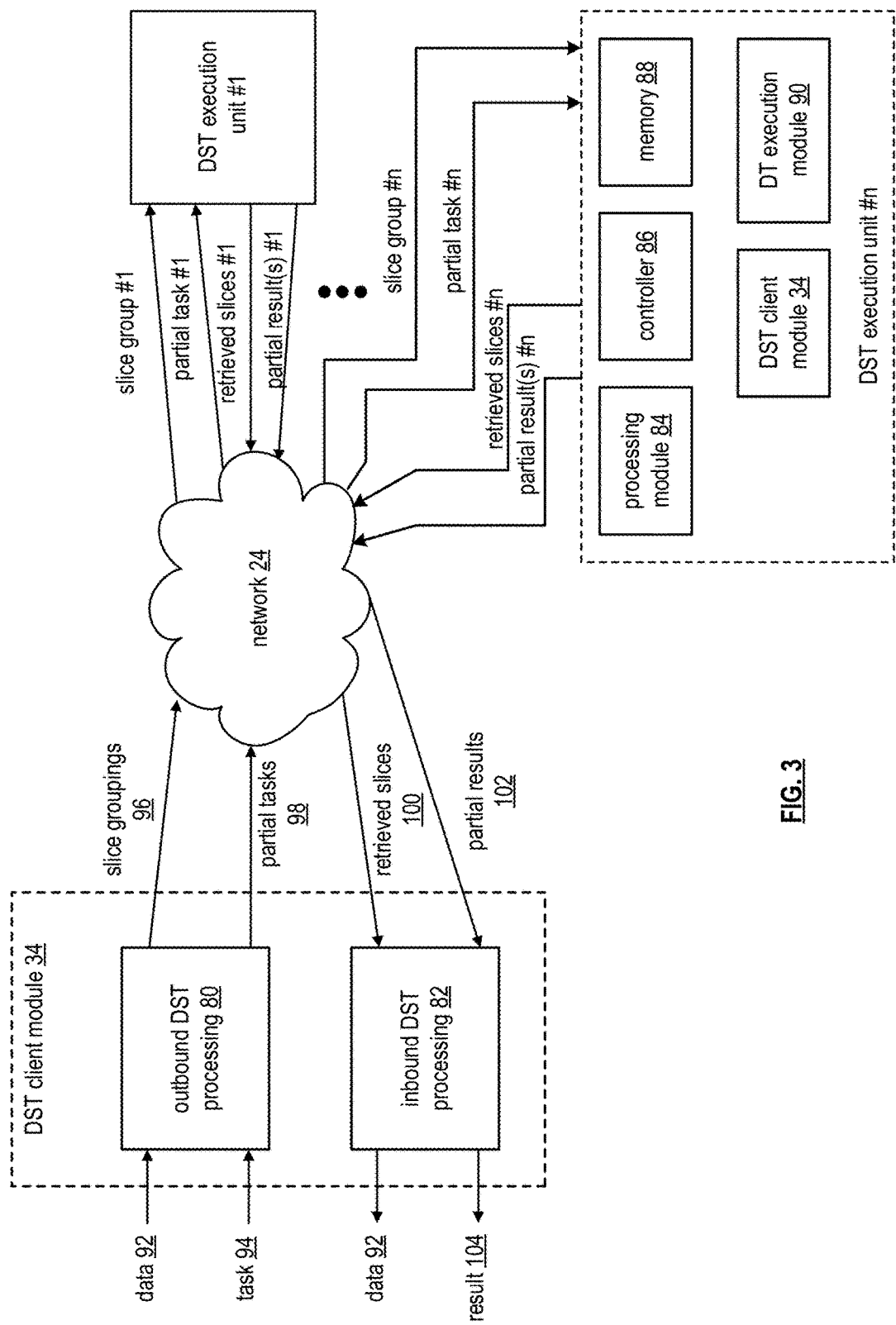
FIG. 3 is a diagram of an example of a distributed storage and task processing in accordance with the present invention.

FIG. 3 is a diagram of an example of the distributed computing system performing a distributed storage and task processing operation. The distributed computing system includes a DST (distributed storage and/or task) client module 34 (which may be in user device 14 and/or in DST processing unit 16 of FIG. 1), a network 24, a plurality of DST execution units 1-*n* that includes two or more DST execution units 36 of FIG. 1 (which form at least a portion of DSTN module 22 of FIG. 1), a DST managing module (not shown), and a DST integrity verification module (not shown). The DST client module 34 includes an outbound DST processing section 80 and an inbound DST processing section 82. Each of the DST execution units 1-*n* includes a controller 86, a processing module 84, memory 88, a DT (distributed task) execution module 90, and a DST client module 34.

In an example of operation, the DST client module 34 receives data 92 and one or more tasks 94 to be performed upon the data 92. The data 92 may be of any size and of any content, where, due to the size (e.g., greater than a few Terabytes), the content (e.g., secure data, etc.), and/or task(s) (e.g., MIPS intensive), distributed processing of the task(s) on the data is desired. For example, the data 92 may be one or more digital books, a copy of a company's emails, a large-scale Internet search, a video security file, one or more entertainment video files (e.g., television programs, movies, etc.), data files, and/or any other large amount of data (e.g., greater than a few Terabytes).

Within the DST client module 34, the outbound DST processing section 80 receives the data 92 and the task(s) 94. The outbound DST processing section 80 processes the data 92 to produce slice groupings 96. As an example of such processing, the outbound DST processing section 80 partitions the data 92 into a plurality of data partitions. For each data partition, the outbound DST processing section 80 dispersed storage (DS) error encodes the data partition to produce encoded data slices and groups the encoded data slices into a slice grouping 96. In addition, the outbound DST processing section 80 partitions the task 94 into partial tasks 98, where the number of partial tasks 98 may correspond to the number of slice groupings 96.

The outbound DST processing section 80 then sends, via the network 24, the slice groupings 96 and the partial tasks 98 to the DST execution units 1-*n* of the DSTN module 22 of FIG. 1. For example, the outbound DST processing section 80 sends slice group 1 and partial task 1 to DST execution unit 1. As another example, the outbound DST processing section 80 sends slice group #n and partial task #n to DST execution unit #n.

Each DST execution unit performs its partial task 98 upon its slice group 96 to produce partial results 102. For example, DST execution unit #1 performs partial task #1 on slice group #1 to produce a partial result #1, for results. As a more specific example, slice group #1 corresponds to a data partition of a series of digital books and the partial task #1 corresponds to searching for specific phrases, recording where the phrase is found, and establishing a phrase count. In this more specific example, the partial result #1 includes information as to where the phrase was found and includes the phrase count.

Upon completion of generating their respective partial results 102, the DST execution units send, via the network 24, their partial results 102 to the inbound DST processing section 82 of the DST client module 34. The inbound DST processing section 82 processes the received partial results 102 to produce a result 104. Continuing with the specific example of the preceding paragraph, the inbound DST processing section 82 combines the phrase count from each of the DST execution units 36 to produce a total phrase count. In addition, the inbound DST processing section 82 combines the 'where the phrase was found' information from each of the DST execution units 36 within their respective data partitions to produce 'where the phrase was found' information for the series of digital books.

In another example of operation, the DST client module 34 requests retrieval of stored data within the memory of the DST execution units 36 (e.g., memory of the DSTN module). In this example, the task 94 is retrieve data stored in the memory of the DSTN module. Accordingly, the outbound DST processing section 80 converts the task 94 into a plurality of partial tasks 98 and sends the partial tasks 98 to the respective DST execution units 1-*n*.

In response to the partial task 98 of retrieving stored data, a DST execution unit 36 identifies the corresponding encoded data slices 100 and retrieves them. For example, DST execution unit #1 receives partial task #1 and retrieves, in response thereto, retrieved slices #1. The DST execution units 36 send their respective retrieved slices 100 to the inbound DST processing section 82 via the network 24.

The inbound DST processing section 82 converts the retrieved slices 100 into data 92. For example, the inbound DST processing section 82 de-groups the retrieved slices 100 to produce encoded slices per data partition. The inbound DST processing section 82 then DS error decodes the encoded slices per data partition to produce data partitions. The inbound DST processing section 82 de-partitions the data partitions to recapture the data 92.

Figure 4:
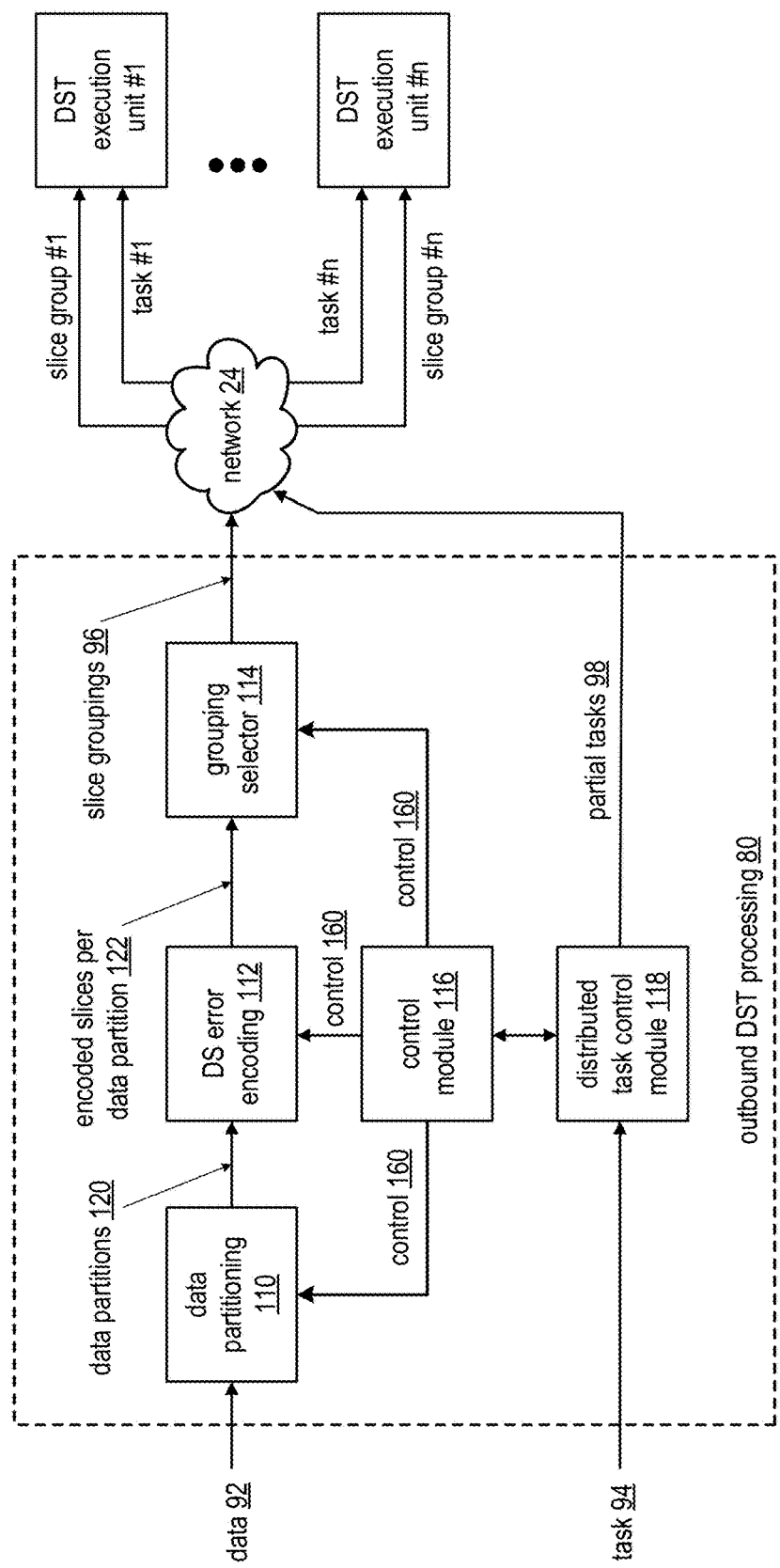
FIG. 4 is a schematic block diagram of an embodiment of an outbound distributed storage and/or task (DST) processing in accordance with the present invention.

FIG. 4 is a schematic block diagram of an embodiment of an outbound distributed storage and/or task (DST) processing section 80 of a DST client module 34 FIG. 1 coupled to a DSTN module 22 of a FIG. 1 (e.g., a plurality of n DST execution units 36) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 partitions data 92 into a plurality of data partitions 120. The number of partitions and the size of the partitions may be selected by the control module 116 via control 160 based on the data 92 (e.g., its size, its content, etc.), a corresponding task 94 to be performed (e.g., simple, complex, single step, multiple steps, etc.), DS encoding parameters (e.g., pillar width, decode threshold, write threshold, segment security parameters, slice security parameters, etc.), capabilities of the DST execution units 36 (e.g., processing resources, availability of processing recourses, etc.), and/or as may be inputted by a user, system administrator, or other operator (human or automated). For example, the data partitioning module 110 partitions the data 92 (e.g., 100 Terabytes) into 100,000 data segments, each being 1 Gigabyte in size. Alternatively, the data partitioning module 110 partitions the data 92 into a plurality of data segments, where some of data segments are of a different size, are of the same size, or a combination thereof.

The DS error encoding module 112 receives the data partitions 120 in a serial manner, a parallel manner, and/or a combination thereof. For each data partition 120, the DS error encoding module 112 DS error encodes the data partition 120 in accordance with control information 160 from the control module 116 to produce encoded data slices 122. The DS error encoding includes segmenting the data partition into data segments, segment security processing (e.g., encryption, compression, watermarking, integrity check (e.g., CRC), etc.), error encoding, slicing, and/or per slice security processing (e.g., encryption, compression, watermarking, integrity check (e.g., CRC), etc.). The control information 160 indicates which steps of the DS error encoding are active for a given data partition and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 122 of a data partition into a set of slice groupings 96. The number of slice groupings corresponds to the number of DST execution units 36 identified for a particular task 94. For example, if five DST execution units 36 are identified for the particular task 94, the grouping selector module groups the encoded slices 122 of a data partition into five slice groupings 96. The grouping selector module 114 outputs the slice groupings 96 to the corresponding DST execution units 36 via the network 24.

The distributed task control module 118 receives the task 94 and converts the task 94 into a set of partial tasks 98. For example, the distributed task control module 118 receives a task to find where in the data (e.g., a series of books) a phrase occurs and a total count of the phrase usage in the data. In this example, the distributed task control module 118 replicates the task 94 for each DST execution unit 36 to produce the partial tasks 98. In another example, the distributed task control module 118 receives a task to find where in the data a first phrase occurs, where in the data a second phrase occurs, and a total count for each phrase usage in the data. In this example, the distributed task control module 118 generates a first set of partial tasks 98 for finding and counting the first phrase and a second set of partial tasks for finding and counting the second phrase. The distributed task control module 118 sends respective first and/or second partial tasks 98 to each DST execution unit 36.

Figure 5:
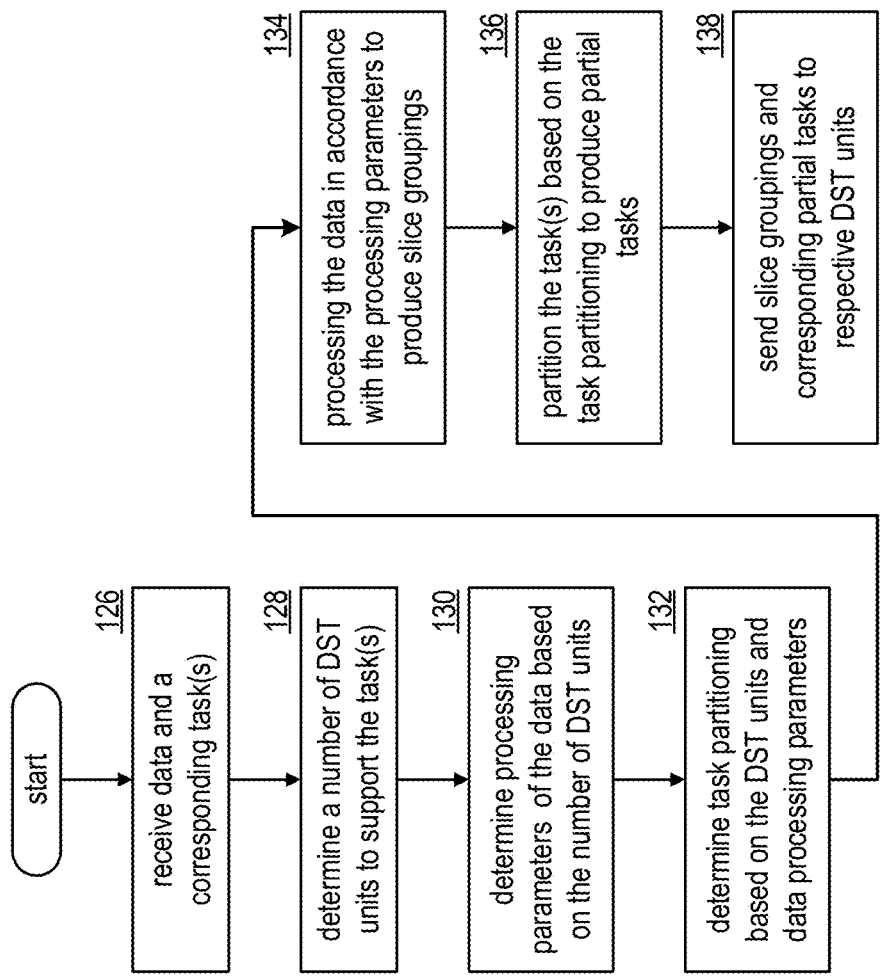
FIG. 5 is a logic diagram of an example of a method for outbound DST processing in accordance with the present invention.

FIG. 5 is a logic diagram of an example of a method for outbound distributed storage and task (DST) processing that begins at step 126 where a DST client module receives data and one or more corresponding tasks. The method continues at step 128 where the DST client module determines a number of DST units to support the task for one or more data partitions. For example, the DST client module may determine the number of DST units to support the task based on the size of the data, the requested task, the content of the data, a predetermined number (e.g., user indicated, system administrator determined, etc.), available DST units, capability of the DST units, and/or any other factor regarding distributed task processing of the data. The DST client module may select the same DST units for each data partition, may select different DST units for the data partitions, or a combination thereof.

The method continues at step 130 where the DST client module determines processing parameters of the data based on the number of DST units selected for distributed task processing. The processing parameters include data partitioning information, DS encoding parameters, and/or slice grouping information. The data partitioning information includes a number of data partitions, size of each data partition, and/or organization of the data partitions (e.g., number of data blocks in a partition, the size of the data blocks, and arrangement of the data blocks). The DS encoding parameters include segmenting information, segment security information, error encoding information (e.g., dispersed storage error encoding function parameters including one or more of pillar width, decode threshold, write threshold, read threshold, generator matrix), slicing information, and/or per slice security information. The slice grouping information includes information regarding how to arrange the encoded data slices into groups for the selected DST units. As a specific example, if the DST client module determines that five DST units are needed to support the task, then it determines that the error encoding parameters include a pillar width of five and a decode threshold of three.

The method continues at step 132 where the DST client module determines task partitioning information (e.g., how to partition the tasks) based on the selected DST units and data processing parameters. The data processing parameters include the processing parameters and DST unit capability information. The DST unit capability information includes the number of DT (distributed task) execution units, execution capabilities of each DT execution unit (e.g., MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.)), and/or any information germane to executing one or more tasks.

The method continues at step 134 where the DST client module processes the data in accordance with the processing parameters to produce slice groupings. The method continues at step 136 where the DST client module partitions the task based on the task partitioning information to produce a set of partial tasks. The method continues at step 138 where the DST client module sends the slice groupings and the corresponding partial tasks to respective DST units.

Figure 6:
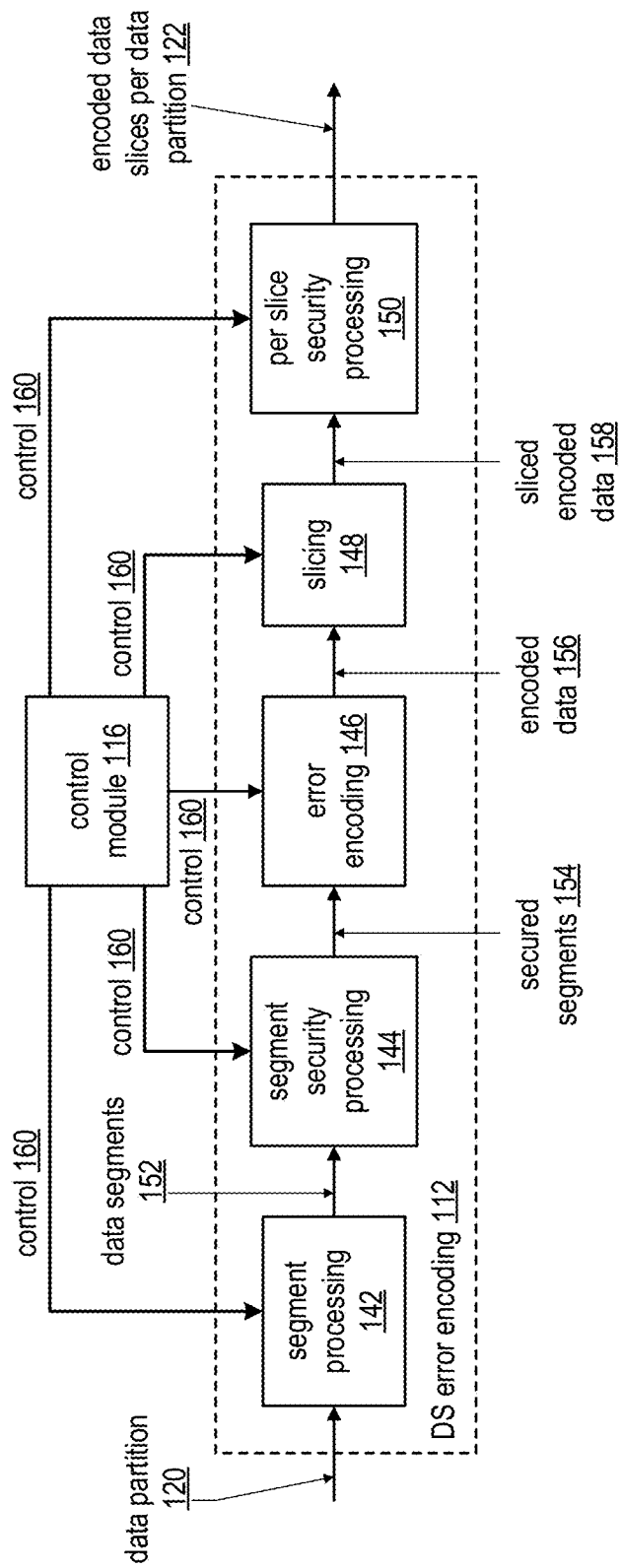
FIG. 6 is a schematic block diagram of an embodiment of a dispersed error encoding in accordance with the present invention.

FIG. 6 is a schematic block diagram of an embodiment of the dispersed storage (DS) error encoding module 112 of an outbound distributed storage and task (DST) processing section. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives a data partition 120 from a data partitioning module and receives segmenting information as the control information 160 from the control module 116. The segmenting information indicates how the segment processing module 142 is to segment the data partition 120. For example, the segmenting information indicates how many rows to segment the data based on a decode threshold of an error encoding scheme, indicates how many columns to segment the data into based on a number and size of data blocks within the data partition 120, and indicates how many columns to include in a data segment 152. The segment processing module 142 segments the data 120 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., cyclic redundancy check (CRC), etc.), and/or any other type of digital security. For example, when the segment security processing module 144 is enabled, it may compress a data segment 152, encrypt the compressed data segment, and generate a CRC value for the encrypted data segment to produce a secure data segment 154. When the segment security processing module 144 is not enabled, it passes the data segments 152 to the error encoding module 146 or is bypassed such that the data segments 152 are provided to the error encoding module 146.

The error encoding module 146 encodes the secure data segments 154 in accordance with error correction encoding parameters received as control information 160 from the control module 116. The error correction encoding parameters (e.g., also referred to as dispersed storage error coding parameters) include identifying an error correction encoding scheme (e.g., forward error correction algorithm, a Reed-Solomon based algorithm, an online coding algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment 154 to produce an encoded data segment 156.

The slicing module 148 slices the encoded data segment 156 in accordance with the pillar width of the error correction encoding parameters received as control information 160. For example, if the pillar width is five, the slicing module 148 slices an encoded data segment 156 into a set of five encoded data slices. As such, for a plurality of encoded data segments 156 for a given data partition, the slicing module outputs a plurality of sets of encoded data slices 158.

The per slice security processing module 150, when enabled by the control module 116, secures each encoded data slice 158 based on slice security information received as control information 160 from the control module 116. The slice security information includes data compression, encryption, watermarking, integrity check (e.g., CRC, etc.), and/or any other type of digital security. For example, when the per slice security processing module 150 is enabled, it compresses an encoded data slice 158, encrypts the compressed encoded data slice, and generates a CRC value for the encrypted encoded data slice to produce a secure encoded data slice 122. When the per slice security processing module 150 is not enabled, it passes the encoded data slices 158 or is bypassed such that the encoded data slices 158 are the output of the DS error encoding module 112.

Note that the control module 116 may be omitted and each module stores its own parameters.

Figure 7:
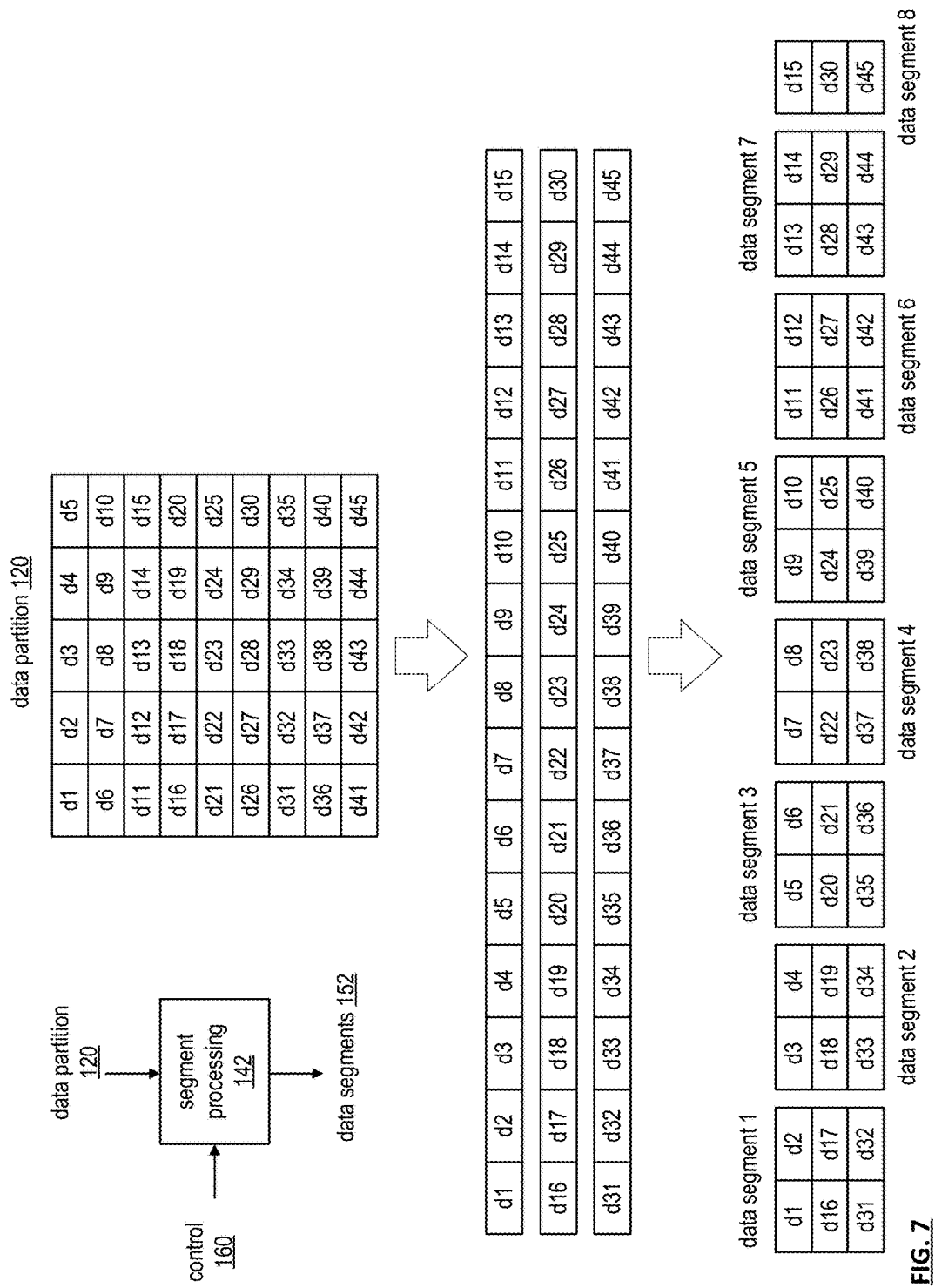
FIG. 7 is a diagram of an example of a segment processing of the dispersed error encoding in accordance with the present invention.

FIG. 7 is a diagram of an example of a segment processing of a dispersed storage (DS) error encoding module. In this example, a segment processing module 142 receives a data partition 120 that includes 45 data blocks (e.g., d1-d45), receives segmenting information (i.e., control information 160) from a control module, and segments the data partition 120 in accordance with the control information 160 to produce data segments 152. Each data block may be of the same size as other data blocks or of a different size. In addition, the size of each data block may be a few bytes to megabytes of data. As previously mentioned, the segmenting information indicates how many rows to segment the data partition into, indicates how many columns to segment the data partition into, and indicates how many columns to include in a data segment.

In this example, the decode threshold of the error encoding scheme is three; as such the number of rows to divide the data partition into is three. The number of columns for each row is set to 15, which is based on the number and size of data blocks. The data blocks of the data partition are arranged in rows and columns in a sequential order (i.e., the first row includes the first 15 data blocks; the second row includes the second 15 data blocks; and the third row includes the last 15 data blocks).

With the data blocks arranged into the desired sequential order, they are divided into data segments based on the segmenting information. In this example, the data partition is divided into 8 data segments; the first 7 include 2 columns of three rows and the last includes 1 column of three rows. Note that the first row of the 8 data segments is in sequential order of the first 15 data blocks; the second row of the 8 data segments in sequential order of the second 15 data blocks; and the third row of the 8 data segments in sequential order of the last 15 data blocks. Note that the number of data blocks, the grouping of the data blocks into segments, and size of the data blocks may vary to accommodate the desired distributed task processing function.

Figure 8:
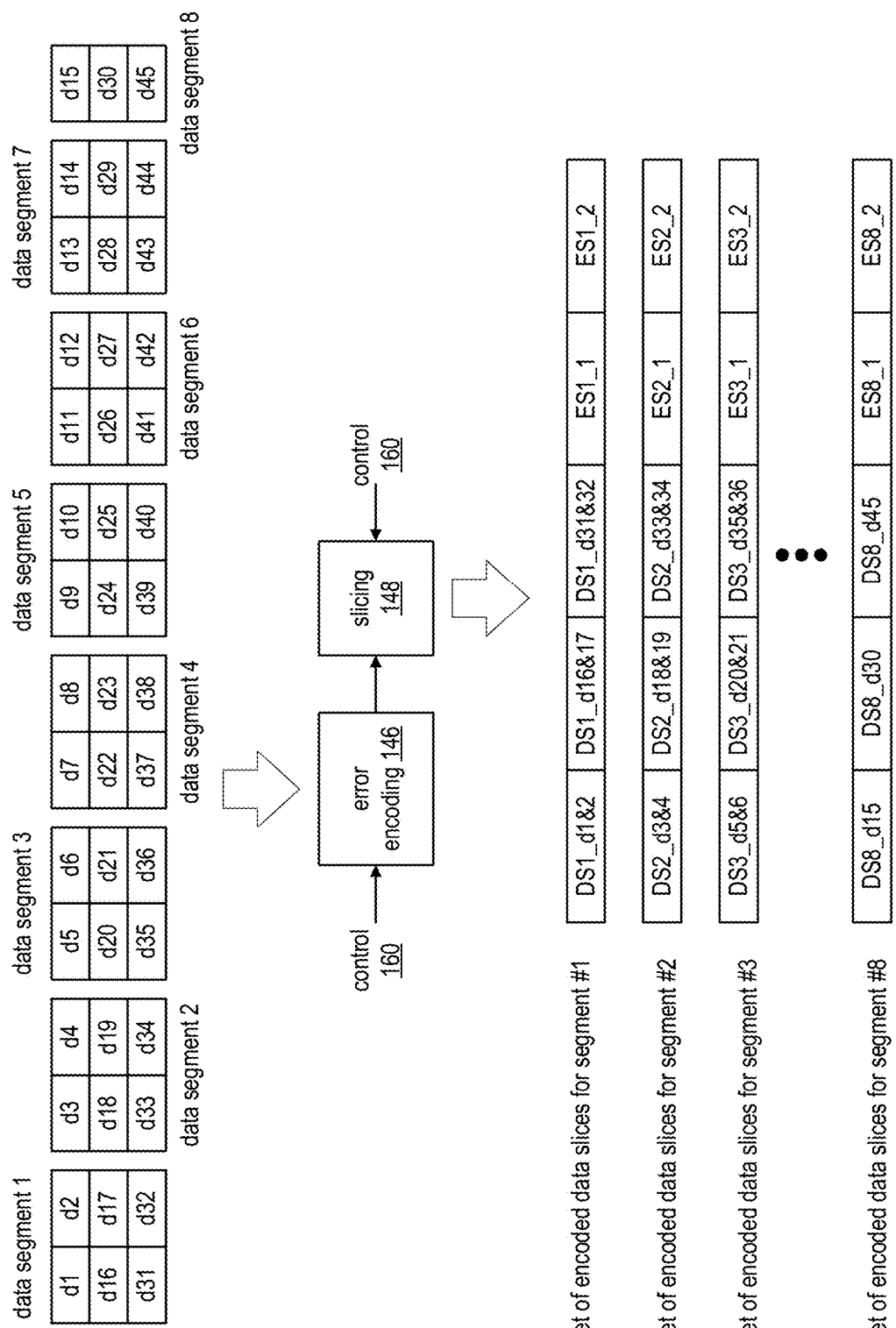
FIG. 8 is a diagram of an example of error encoding and slicing processing of the dispersed error encoding in accordance with the present invention.

FIG. 8 is a diagram of an example of error encoding and slicing processing of the dispersed error encoding processing the data segments of FIG. 7. In this example, data segment 1 includes 3 rows with each row being treated as one word for encoding. As such, data segment 1 includes three words for encoding: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

In operation, an error encoding module 146 and a slicing module 148 convert each data segment into a set of encoded data slices in accordance with error correction encoding parameters as control information 160. More specifically, when the error correction encoding parameters indicate a unity matrix Reed-Solomon based encoding algorithm, 5 pillars, and decode threshold of 3, the first three encoded data slices of the set of encoded data slices for a data segment are substantially similar to the corresponding word of the data segment. For instance, when the unity matrix Reed-Solomon based encoding algorithm is applied to data segment 1, the content of the first encoded data slice (DS1_d1&2) of the first set of encoded data slices (e.g., corresponding to data segment 1) is substantially similar to content of the first word (e.g., d1 & d2); the content of the second encoded data slice (DS1_d16&17) of the first set of encoded data slices is substantially similar to content of the second word (e.g., d16 & d17); and the content of the third encoded data slice (DS1_d31&32) of the first set of encoded data slices is substantially similar to content of the third word (e.g., d31 & d32).

The content of the fourth and fifth encoded data slices (e.g., ES1_1 and ES1_2) of the first set of encoded data slices include error correction data based on the first—third words of the first data segment. With such an encoding and slicing scheme, retrieving any three of the five encoded data slices allows the data segment to be accurately reconstructed.

The encoding and slicing of data segments 2-7 yield sets of encoded data slices similar to the set of encoded data slices of data segment 1. For instance, the content of the first encoded data slice (DS2_d3&4) of the second set of encoded data slices (e.g., corresponding to data segment 2) is substantially similar to content of the first word (e.g., d3 & d4); the content of the second encoded data slice (DS2_d18&19) of the second set of encoded data slices is substantially similar to content of the second word (e.g., d18 & d19); and the content of the third encoded data slice (DS2_d33&34) of the second set of encoded data slices is substantially similar to content of the third word (e.g., d33 & d34). The content of the fourth and fifth encoded data slices (e.g., ES1_1 and ES1_2) of the second set of encoded data slices includes error correction data based on the first—third words of the second data segment.

Figure 9:
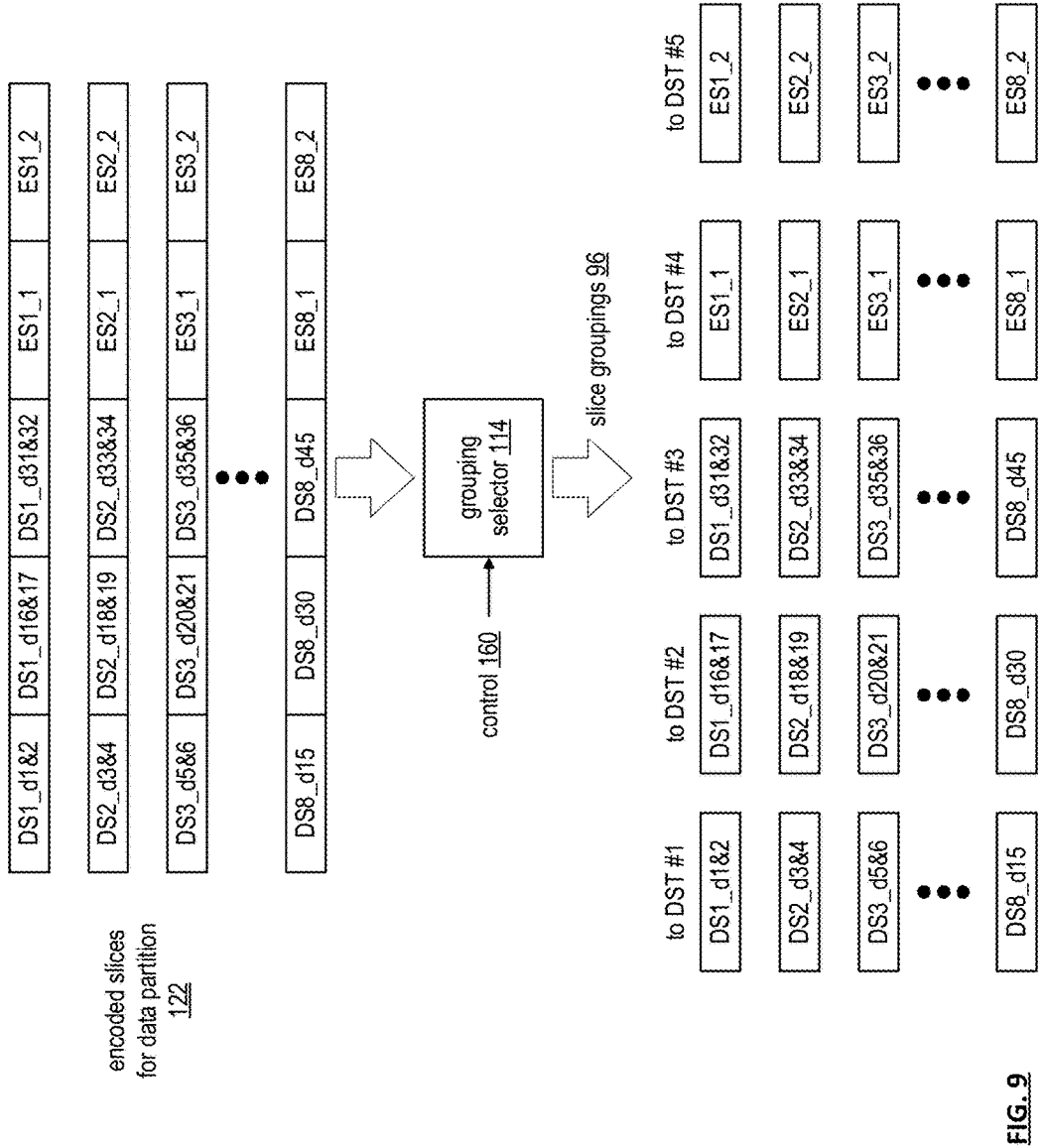
FIG. 9 is a diagram of an example of grouping selection processing of the outbound DST processing in accordance with the present invention.

FIG. 9 is a diagram of an example of grouping selection processing of an outbound distributed storage and task (DST) processing in accordance with group selection information as control information 160 from a control module. Encoded slices for data partition 122 are grouped in accordance with the control information 160 to produce slice groupings 96. In this example, a grouping selector module 114 organizes the encoded data slices into five slice groupings (e.g., one for each DST execution unit of a distributed storage and task network (DSTN) module). As a specific example, the grouping selector module 114 creates a first slice grouping for a DST execution unit #1, which includes first encoded slices of each of the sets of encoded slices. As such, the first DST execution unit receives encoded data slices corresponding to data blocks 1-15 (e.g., encoded data slices of contiguous data).

The grouping selector module 114 also creates a second slice grouping for a DST execution unit #2, which includes second encoded slices of each of the sets of encoded slices. As such, the second DST execution unit receives encoded data slices corresponding to data blocks 16-30. The grouping selector module 114 further creates a third slice grouping for DST execution unit #3, which includes third encoded slices of each of the sets of encoded slices. As such, the third DST execution unit receives encoded data slices corresponding to data blocks 31-45.

The grouping selector module 114 creates a fourth slice grouping for DST execution unit #4, which includes fourth encoded slices of each of the sets of encoded slices. As such, the fourth DST execution unit receives encoded data slices corresponding to first error encoding information (e.g., encoded data slices of error coding (EC) data). The grouping selector module 114 further creates a fifth slice grouping for DST execution unit #5, which includes fifth encoded slices of each of the sets of encoded slices. As such, the fifth DST execution unit receives encoded data slices corresponding to second error encoding information.

Figure 10:
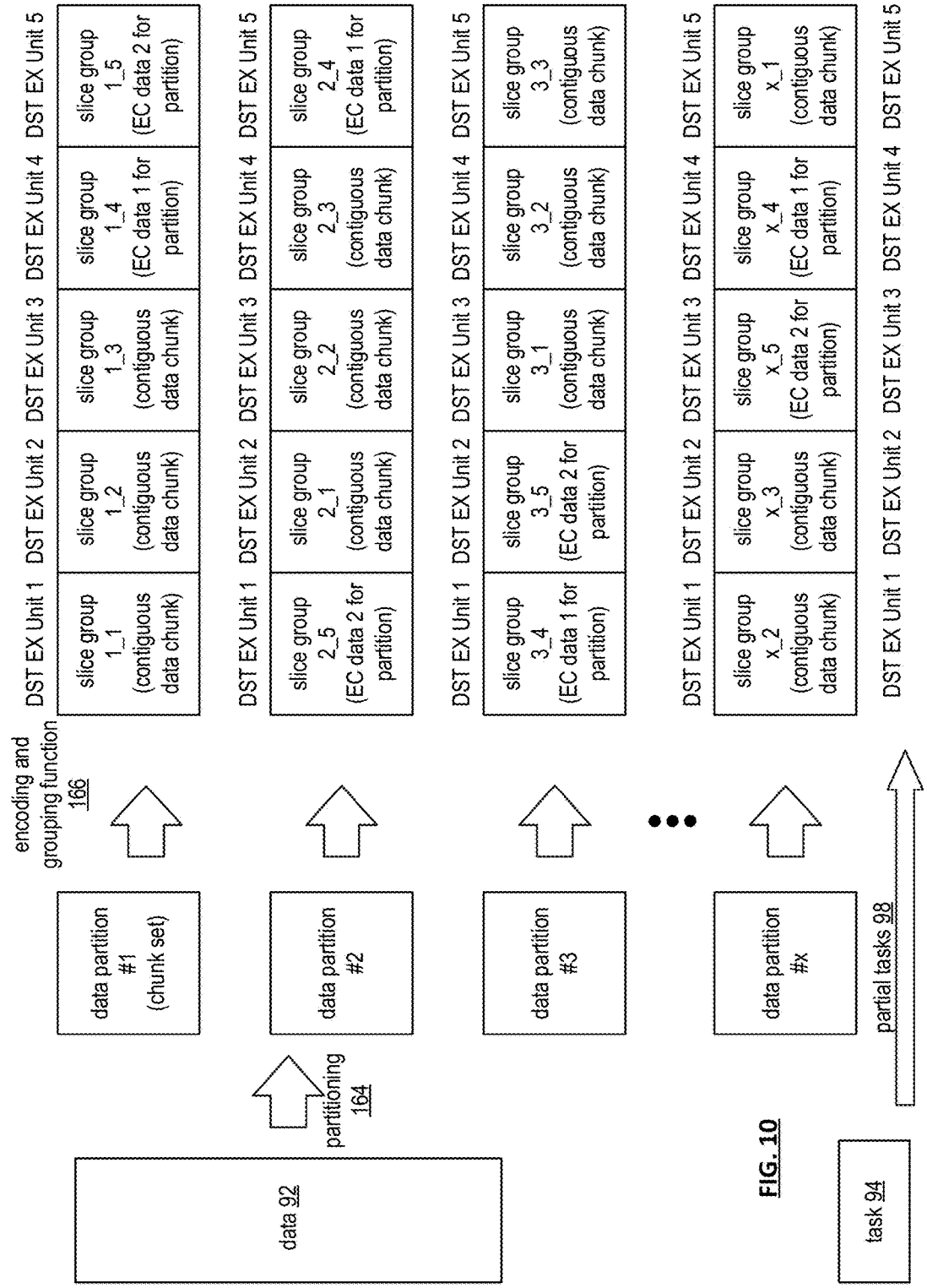
FIG. 10 is a diagram of an example of converting data into slice groups in accordance with the present invention.

FIG. 10 is a diagram of an example of converting data 92 into slice groups that expands on the preceding figures. As shown, the data 92 is partitioned in accordance with a partitioning function 164 into a plurality of data partitions (1-, where x is an integer greater than 4). Each data partition (or chunkset of data) is encoded and grouped into slice groupings as previously discussed by an encoding and grouping function 166. For a given data partition, the slice groupings are sent to distributed storage and task (DST) execution units. From data partition to data partition, the ordering of the slice groupings to the DST execution units may vary.

For example, the slice groupings of data partition #1 is sent to the DST execution units such that the first DST execution receives first encoded data slices of each of the sets of encoded data slices, which corresponds to a first continuous data chunk of the first data partition (e.g., refer to FIG. 9), a second DST execution receives second encoded data slices of each of the sets of encoded data slices, which corresponds to a second continuous data chunk of the first data partition, etc.

For the second data partition, the slice groupings may be sent to the DST execution units in a different order than it was done for the first data partition. For instance, the first slice grouping of the second data partition (e.g., slice group 2_1) is sent to the second DST execution unit; the second slice grouping of the second data partition (e.g., slice group 2_2) is sent to the third DST execution unit; the third slice grouping of the second data partition (e.g., slice group 2_3) is sent to the fourth DST execution unit; the fourth slice grouping of the second data partition (e.g., slice group 2_4, which includes first error coding information) is sent to the fifth DST execution unit; and the fifth slice grouping of the second data partition (e.g., slice group 2_5, which includes second error coding information) is sent to the first DST execution unit.

The pattern of sending the slice groupings to the set of DST execution units may vary in a predicted pattern, a random pattern, and/or a combination thereof from data partition to data partition. In addition, from data partition to data partition, the set of DST execution units may change. For example, for the first data partition, DST execution units 1-5 may be used; for the second data partition, DST execution units 6-10 may be used; for the third data partition, DST execution units 3-7 may be used; etc. As is also shown, the task is divided into partial tasks that are sent to the DST execution units in conjunction with the slice groupings of the data partitions.

Figure 11:
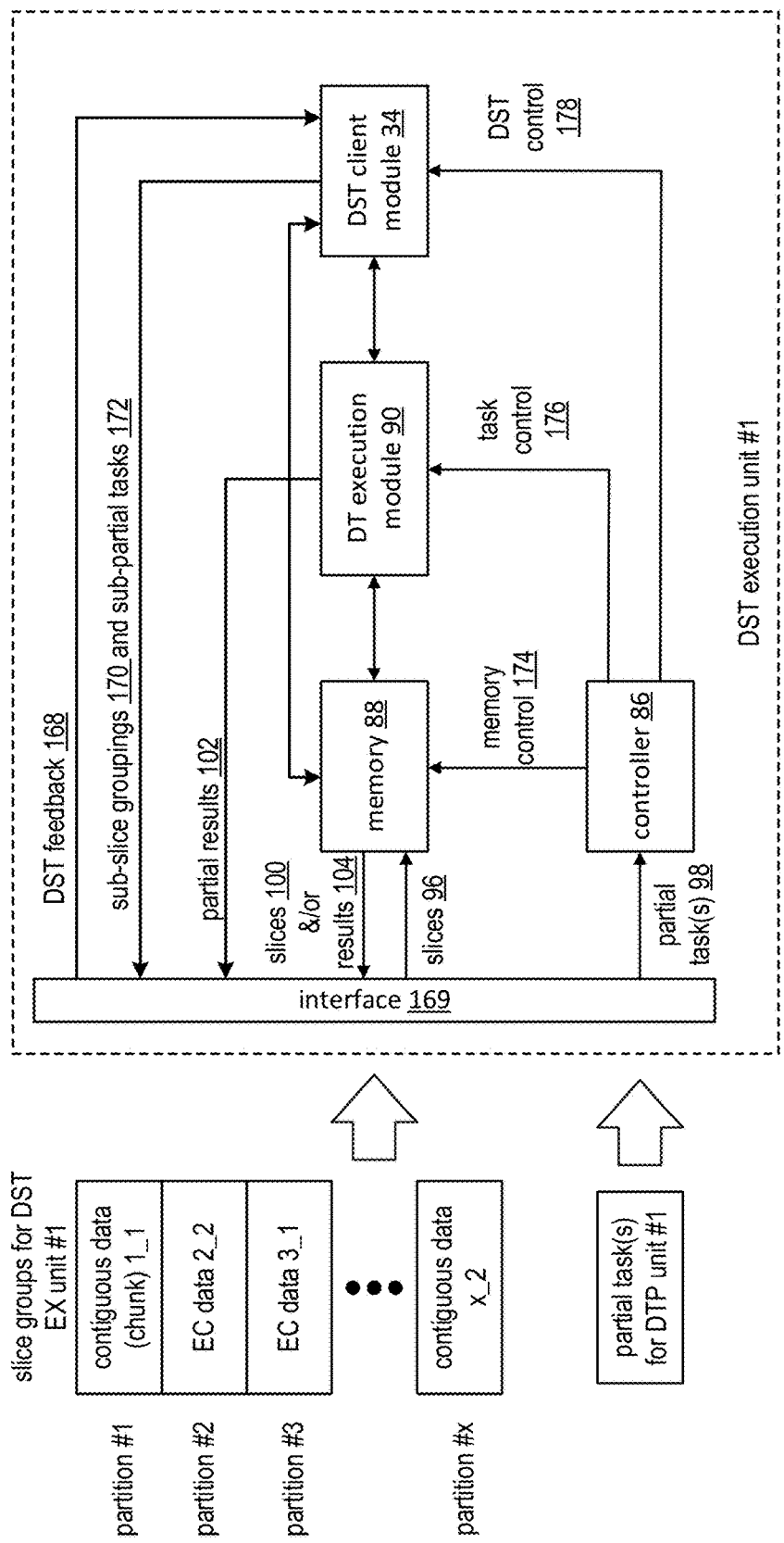
FIG. 11 is a schematic block diagram of an embodiment of a DST execution unit in accordance with the present invention.

FIG. 11 is a schematic block diagram of an embodiment of a DST (distributed storage and/or task) execution unit that includes an interface 169, a controller 86, memory 88, one or more DT (distributed task) execution modules 90, and a DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a slice group, the DST execution module receives a slice grouping 96 (e.g., slice group #1) via interface 169. The slice grouping 96 includes, per partition, encoded data slices of contiguous data or encoded data slices of error coding (EC) data. For slice group #1, the DST execution module receives encoded data slices of contiguous data for partitions #1 and #x (and potentially others between 3 and x) and receives encoded data slices of EC data for partitions #2 and #3 (and potentially others between 3 and x). Examples of encoded data slices of contiguous data and encoded data slices of error coding (EC) data are discussed with reference to FIG. 9. The memory 88 stores the encoded data slices of slice groupings 96 in accordance with memory control information 174 it receives from the controller 86.

The controller 86 (e.g., a processing module, a CPU, etc.) generates the memory control information 174 based on a partial task(s) 98 and distributed computing information (e.g., user information (e.g., user ID, distributed computing permissions, data access permission, etc.), vault information (e.g., virtual memory assigned to user, user group, temporary storage for task processing, etc.), task validation information, etc.). For example, the controller 86 interprets the partial task(s) 98 in light of the distributed computing information to determine whether a requestor is authorized to perform the task 98, is authorized to access the data, and/or is authorized to perform the task on this particular data. When the requestor is authorized, the controller 86 determines, based on the task 98 and/or another input, whether the encoded data slices of the slice grouping 96 are to be temporarily stored or permanently stored. Based on the foregoing, the controller 86 generates the memory control information 174 to write the encoded data slices of the slice grouping 96 into the memory 88 and to indicate whether the slice grouping 96 is permanently stored or temporarily stored.

With the slice grouping 96 stored in the memory 88, the controller 86 facilitates execution of the partial task(s) 98. In an example, the controller 86 interprets the partial task 98 in light of the capabilities of the DT execution module(s) 90. The capabilities include one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, etc. If the controller 86 determines that the DT execution module(s) 90 have sufficient capabilities, it generates task control information 176.

The task control information 176 may be a generic instruction (e.g., perform the task on the stored slice grouping) or a series of operational codes. In the former instance, the DT execution module 90 includes a co-processor function specifically configured (fixed or programmed) to perform the desired task 98. In the latter instance, the DT execution module 90 includes a general processor topology where the controller stores an algorithm corresponding to the particular task 98. In this instance, the controller 86 provides the operational codes (e.g., assembly language, source code of a programming language, object code, etc.) of the algorithm to the DT execution module 90 for execution.

Depending on the nature of the task 98, the DT execution module 90 may generate intermediate partial results 102 that are stored in the memory 88 or in a cache memory (not shown) within the DT execution module 90. In either case, when the DT execution module 90 completes execution of the partial task 98, it outputs one or more partial results 102. The partial results 102 may also be stored in memory 88.

If, when the controller 86 is interpreting whether capabilities of the DT execution module(s) 90 can support the partial task 98, the controller 86 determines that the DT execution module(s) 90 cannot adequately support the task 98 (e.g., does not have the right resources, does not have sufficient available resources, available resources would be too slow, etc.), it then determines whether the partial task 98 should be fully offloaded or partially offloaded.

If the controller 86 determines that the partial task 98 should be fully offloaded, it generates DST control information 178 and provides it to the DST client module 34. The DST control information 178 includes the partial task 98, memory storage information regarding the slice grouping 96, and distribution instructions. The distribution instructions instruct the DST client module 34 to divide the partial task 98 into sub-partial tasks 172, to divide the slice grouping 96 into sub-slice groupings 170, and identify other DST execution units. The DST client module 34 functions in a similar manner as the DST client module 34 of FIGS. 3-10 to produce the sub-partial tasks 172 and the sub-slice groupings 170 in accordance with the distribution instructions.

The DST client module 34 receives DST feedback 168 (e.g., sub-partial results), via the interface 169, from the DST execution units to which the task was offloaded. The DST client module 34 provides the sub-partial results to the DST execution unit, which processes the sub-partial results to produce the partial result(s) 102.

If the controller 86 determines that the partial task 98 should be partially offloaded, it determines what portion of the task 98 and/or slice grouping 96 should be processed locally and what should be offloaded. For the portion that is being locally processed, the controller 86 generates task control information 176 as previously discussed. For the portion that is being offloaded, the controller 86 generates DST control information 178 as previously discussed.

When the DST client module 34 receives DST feedback 168 (e.g., sub-partial results) from the DST executions units to which a portion of the task was offloaded, it provides the sub-partial results to the DT execution module 90. The DT execution module 90 processes the sub-partial results with the sub-partial results it created to produce the partial result(s) 102.

The memory 88 may be further utilized to retrieve one or more of stored slices 100, stored results 104, partial results 102 when the DT execution module 90 stores partial results 102 and/or results 104 in the memory 88. For example, when the partial task 98 includes a retrieval request, the controller 86 outputs the memory control 174 to the memory 88 to facilitate retrieval of slices 100 and/or results 104.

Figure 12:
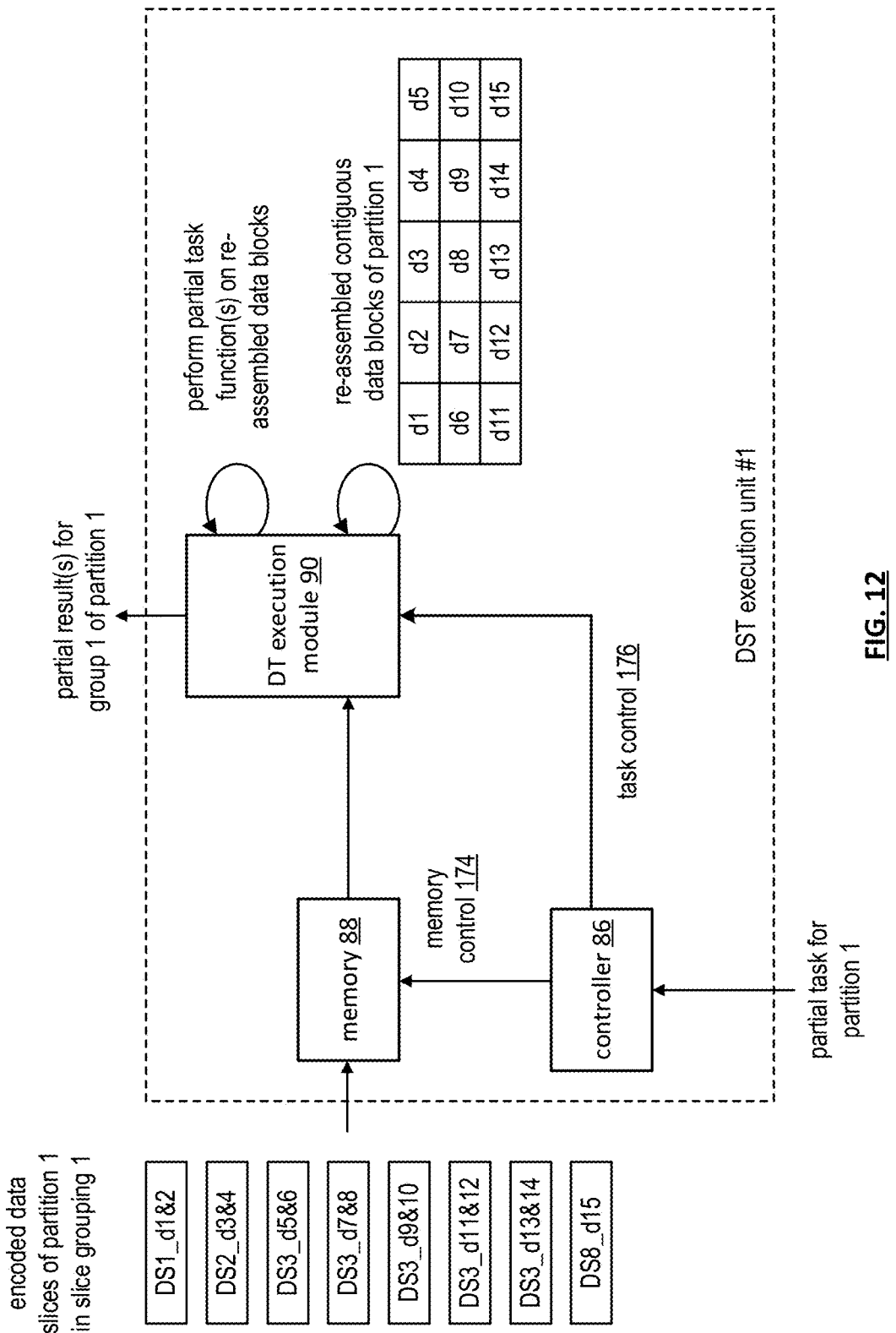
FIG. 12 is a schematic block diagram of an example of operation of a DST execution unit in accordance with the present invention.

FIG. 12 is a schematic block diagram of an example of operation of a distributed storage and task (DST) execution unit storing encoded data slices and executing a task thereon. To store the encoded data slices of a partition 1 of slice grouping 1, a controller 86 generates write commands as memory control information 174 such that the encoded slices are stored in desired locations (e.g., permanent or temporary) within memory 88.

Once the encoded slices are stored, the controller 86 provides task control information 176 to a distributed task (DT) execution module 90. As a first step of executing the task in accordance with the task control information 176, the DT execution module 90 retrieves the encoded slices from memory 88. The DT execution module 90 then reconstructs contiguous data blocks of a data partition. As shown for this example, reconstructed contiguous data blocks of data partition 1 include data blocks 1-15 (e.g., d1-d15).

With the contiguous data blocks reconstructed, the DT execution module 90 performs the task on the reconstructed contiguous data blocks. For example, the task may be to search the reconstructed contiguous data blocks for a particular word or phrase, identify where in the reconstructed contiguous data blocks the particular word or phrase occurred, and/or count the occurrences of the particular word or phrase on the reconstructed contiguous data blocks. The DST execution unit continues in a similar manner for the encoded data slices of other partitions in slice grouping 1. Note that with using the unity matrix error encoding scheme previously discussed, if the encoded data slices of contiguous data are uncorrupted, the decoding of them is a relatively straightforward process of extracting the data.

If, however, an encoded data slice of contiguous data is corrupted (or missing), it can be rebuilt by accessing other DST execution units that are storing the other encoded data slices of the set of encoded data slices of the corrupted encoded data slice. In this instance, the DST execution unit having the corrupted encoded data slices retrieves at least three encoded data slices (of contiguous data and of error coding data) in the set from the other DST execution units (recall for this example, the pillar width is 5 and the decode threshold is 3). The DST execution unit decodes the retrieved data slices using the DS error encoding parameters to recapture the corresponding data segment. The DST execution unit then re-encodes the data segment using the DS error encoding parameters to rebuild the corrupted encoded data slice. Once the encoded data slice is rebuilt, the DST execution unit functions as previously described.

Figure 13:
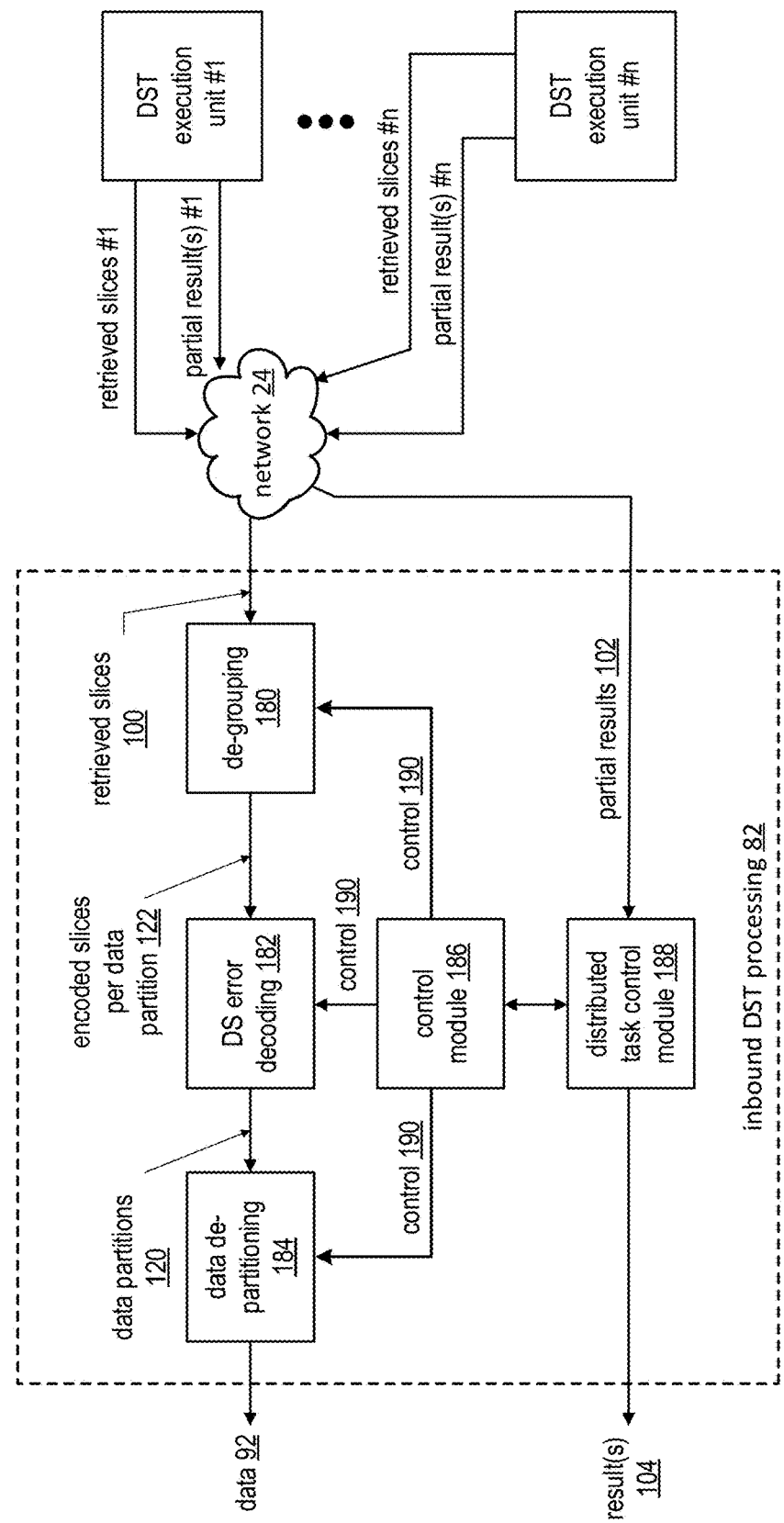
FIG. 13 is a schematic block diagram of an embodiment of an inbound distributed storage and/or task (DST) processing in accordance with the present invention.

FIG. 13 is a schematic block diagram of an embodiment of an inbound distributed storage and/or task (DST) processing section 82 of a DST client module coupled to DST execution units of a distributed storage and task network (DSTN) module via a network 24. The inbound DST processing section 82 includes a de-grouping module 180, a DS (dispersed storage) error decoding module 182, a data de-partitioning module 184, a control module 186, and a distributed task control module 188. Note that the control module 186 and/or the distributed task control module 188 may be separate modules from corresponding ones of outbound DST processing section or may be the same modules.

In an example of operation, the DST execution units have completed execution of corresponding partial tasks on the corresponding slice groupings to produce partial results 102. The inbound DST processing section 82 receives the partial results 102 via the distributed task control module 188. The inbound DST processing section 82 then processes the partial results 102 to produce a final result, or results 104. For example, if the task was to find a specific word or phrase within data, the partial results 102 indicate where in each of the prescribed portions of the data the corresponding DST execution units found the specific word or phrase. The distributed task control module 188 combines the individual partial results 102 for the corresponding portions of the data into a final result 104 for the data as a whole.

In another example of operation, the inbound DST processing section 82 is retrieving stored data from the DST execution units (i.e., the DSTN module). In this example, the DST execution units output encoded data slices 100 corresponding to the data retrieval requests. The de-grouping module 180 receives retrieved slices 100 and de-groups them to produce encoded data slices per data partition 122. The DS error decoding module 182 decodes, in accordance with DS error encoding parameters, the encoded data slices per data partition 122 to produce data partitions 120.

The data de-partitioning module 184 combines the data partitions 120 into the data 92. The control module 186 controls the conversion of retrieved slices 100 into the data 92 using control signals 190 to each of the modules. For instance, the control module 186 provides de-grouping information to the de-grouping module 180, provides the DS error encoding parameters to the DS error decoding module 182, and provides de-partitioning information to the data de-partitioning module 184.

Figure 14:
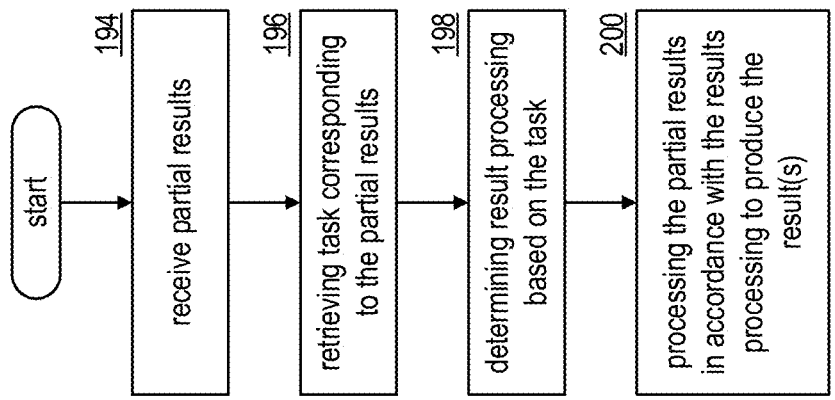
FIG. 14 is a logic diagram of an example of a method for inbound DST processing in accordance with the present invention.

FIG. 14 is a logic diagram of an example of a method that is executable by distributed storage and task (DST) client module regarding inbound DST processing. The method begins at step 194 where the DST client module receives partial results. The method continues at step 196 where the DST client module retrieves the task corresponding to the partial results. For example, the partial results include header information that identifies the requesting entity, which correlates to the requested task.

The method continues at step 198 where the DST client module determines result processing information based on the task. For example, if the task were to identify a particular word or phrase within the data, the result processing information would indicate to aggregate the partial results for the corresponding portions of the data to produce the final result. As another example, if the task were to count the occurrences of a particular word or phrase within the data, results of processing the information would indicate to add the partial results to produce the final results. The method continues at step 200 where the DST client module processes the partial results in accordance with the result processing information to produce the final result or results.

Figure 15:
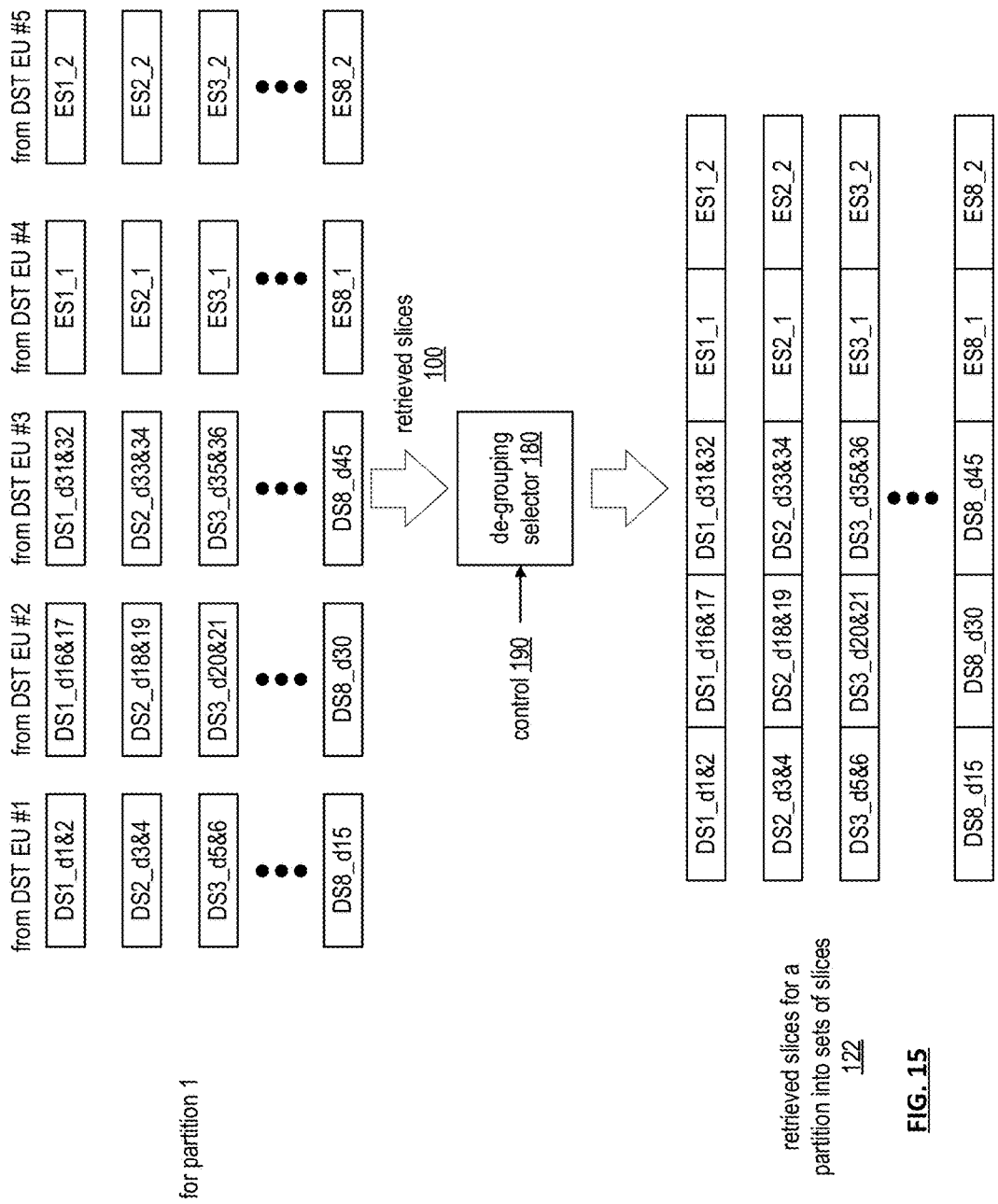
FIG. 15 is a diagram of an example of de-grouping selection processing of the inbound DST processing in accordance with the present invention.

FIG. 15 is a diagram of an example of de-grouping selection processing of an inbound distributed storage and task (DST) processing section of a DST client module. In general, this is an inverse process of the grouping module of the outbound DST processing section of FIG. 9. Accordingly, for each data partition (e.g., partition #1), the de-grouping module retrieves the corresponding slice grouping from the DST execution units (EU) (e.g., DST 1-5).

As shown, DST execution unit #1 provides a first slice grouping, which includes the first encoded slices of each of the sets of encoded slices (e.g., encoded data slices of contiguous data of data blocks 1-15); DST execution unit #2 provides a second slice grouping, which includes the second encoded slices of each of the sets of encoded slices (e.g., encoded data slices of contiguous data of data blocks 16-30); DST execution unit #3 provides a third slice grouping, which includes the third encoded slices of each of the sets of encoded slices (e.g., encoded data slices of contiguous data of data blocks 31-45); DST execution unit #4 provides a fourth slice grouping, which includes the fourth encoded slices of each of the sets of encoded slices (e.g., first encoded data slices of error coding (EC) data); and DST execution unit #5 provides a fifth slice grouping, which includes the fifth encoded slices of each of the sets of encoded slices (e.g., first encoded data slices of error coding (EC) data).

The de-grouping module de-groups the slice groupings (e.g., received slices 100) using a de-grouping selector 180 controlled by a control signal 190 as shown in the example to produce a plurality of sets of encoded data slices (e.g., retrieved slices for a partition into sets of slices 122). Each set corresponding to a data segment of the data partition.

Figure 16:
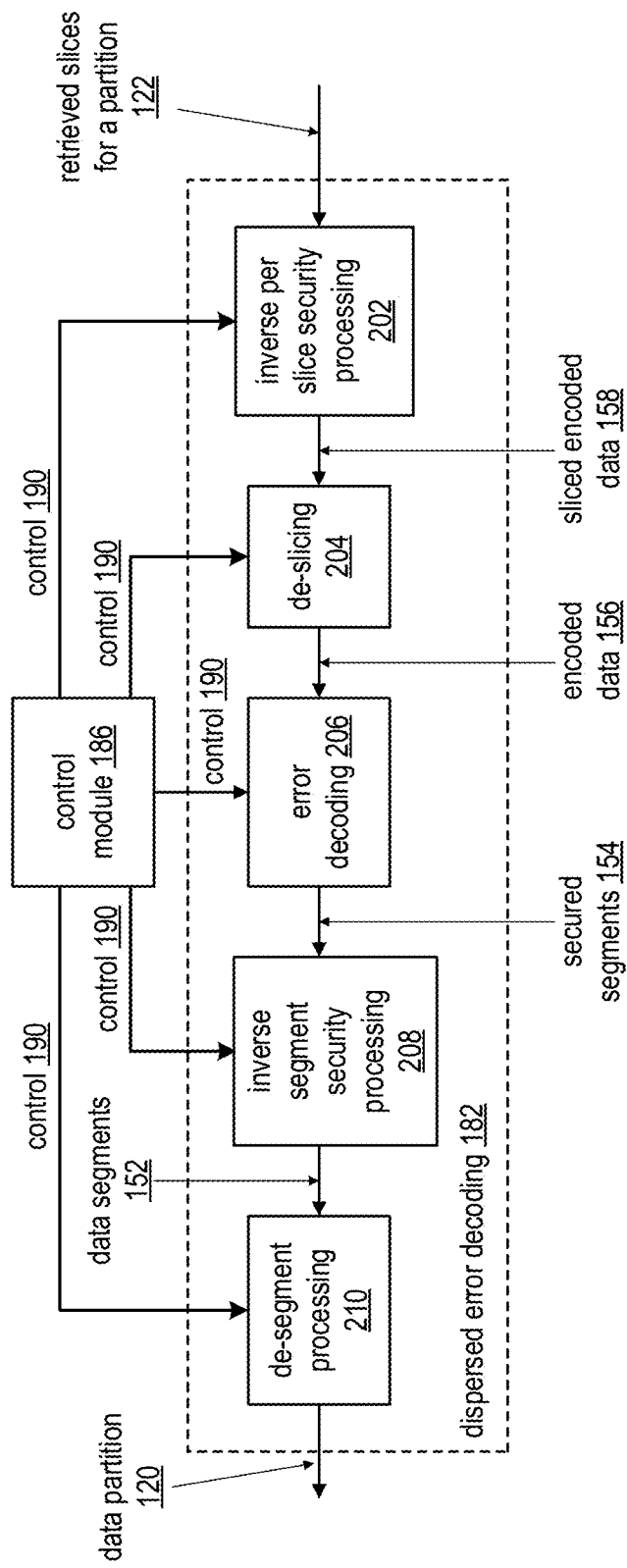
FIG. 16 is a schematic block diagram of an embodiment of a dispersed error decoding in accordance with the present invention.

FIG. 16 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, a de-segmenting processing module 210, and a control module 186.

In an example of operation, the inverse per slice security processing module 202, when enabled by the control module 186, unsecures each encoded data slice 122 based on slice de-security information received as control information 190 (e.g., the compliment of the slice security information discussed with reference to FIG. 6) received from the control module 186. The slice security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 122, it decrypts each verified encoded data slice, and decompresses each decrypted encoded data slice to produce slice encoded data 158. When the inverse per slice security processing module 202 is not enabled, it passes the encoded data slices 122 as the sliced encoded data 158 or is bypassed such that the retrieved encoded data slices 122 are provided as the sliced encoded data 158.

The de-slicing module 204 de-slices the sliced encoded data 158 into encoded data segments 156 in accordance with a pillar width of the error correction encoding parameters received as control information 190 from the control module 186. For example, if the pillar width is five, the de-slicing module 204 de-slices a set of five encoded data slices into an encoded data segment 156. The error decoding module 206 decodes the encoded data segments 156 in accordance with error correction decoding parameters received as control information 190 from the control module 186 to produce secure data segments 154. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments 154 based on segment security information received as control information 190 from the control module 186. The segment security information includes data decompression, decryption, de-watermarking, integrity check (e.g., CRC, etc.) verification, and/or any other type of digital security. For example, when the inverse segment security processing module 208 is enabled, it verifies integrity information (e.g., a CRC value) of each secure data segment 154, it decrypts each verified secured data segment, and decompresses each decrypted secure data segment to produce a data segment 152. When the inverse segment security processing module 208 is not enabled, it passes the decoded data segment 154 as the data segment 152 or is bypassed.

The de-segment processing module 210 receives the data segments 152 and receives de-segmenting information as control information 190 from the control module 186. The de-segmenting information indicates how the de-segment processing module 210 is to de-segment the data segments 152 into a data partition 120. For example, the de-segmenting information indicates how the rows and columns of data segments are to be rearranged to yield the data partition 120.

Figure 17:
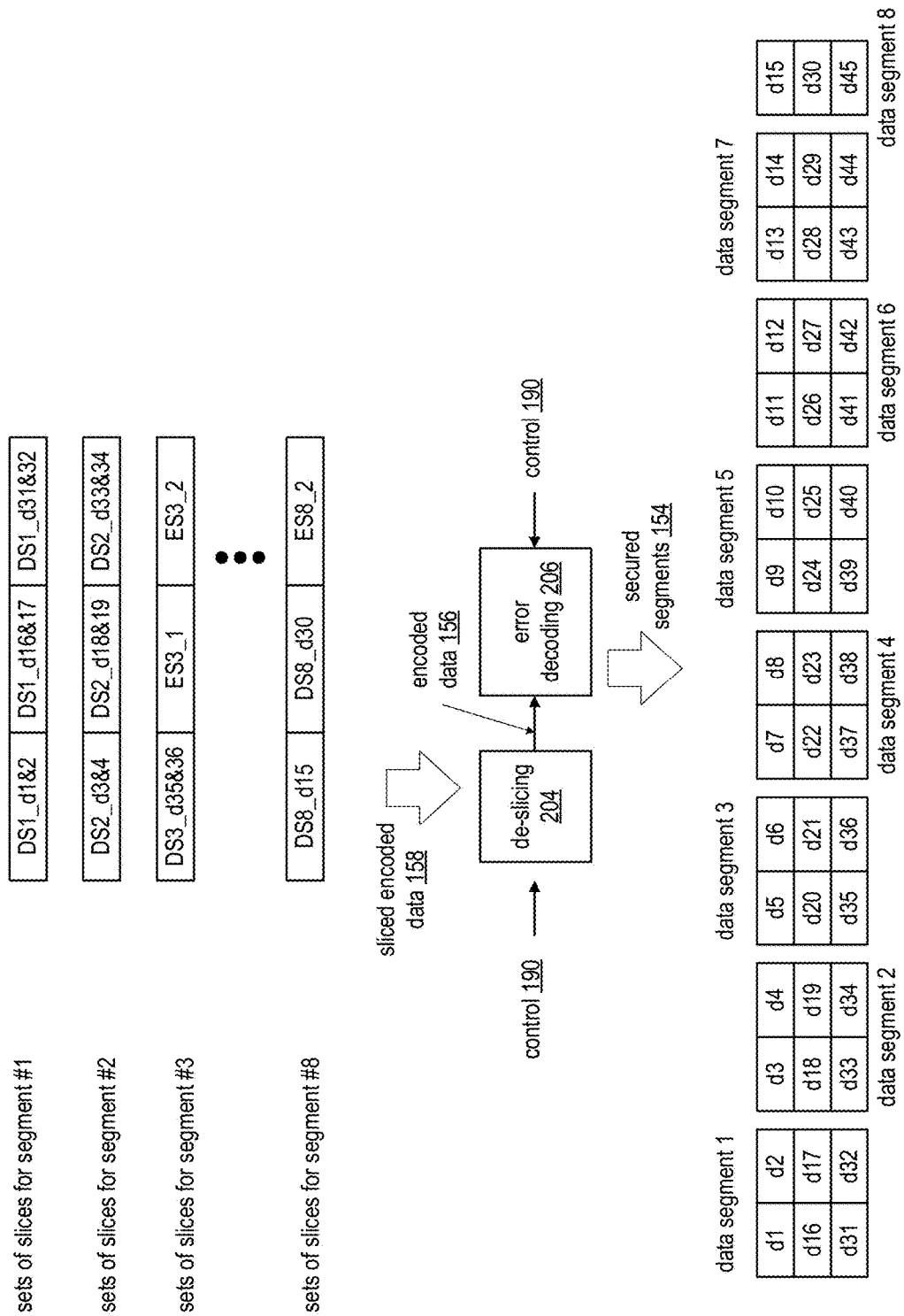
FIG. 17 is a diagram of an example of de-slicing and error decoding processing of the dispersed error decoding in accordance with the present invention.

FIG. 17 is a diagram of an example of de-slicing and error decoding processing of a dispersed error decoding module. A de-slicing module 204 receives at least a decode threshold number of encoded data slices 158 for each data segment in accordance with control information 190 and provides encoded data 156. In this example, a decode threshold is three. As such, each set of encoded data slices 158 is shown to have three encoded data slices per data segment. The de-slicing module 204 may receive three encoded data slices per data segment because an associated distributed storage and task (DST) client module requested retrieving only three encoded data slices per segment or selected three of the retrieved encoded data slices per data segment. As shown, which is based on the unity matrix encoding previously discussed with reference to FIG. 8, an encoded data slice may be a data-based encoded data slice (e.g., DS1_d1&d2) or an error code based encoded data slice (e.g., ES3_1).

An error decoding module 206 decodes the encoded data 156 of each data segment in accordance with the error correction decoding parameters of control information 190 to produce secured segments 154. In this example, data segment 1 includes 3 rows with each row being treated as one word for encoding. As such, data segment 1 includes three words: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

Figure 18:
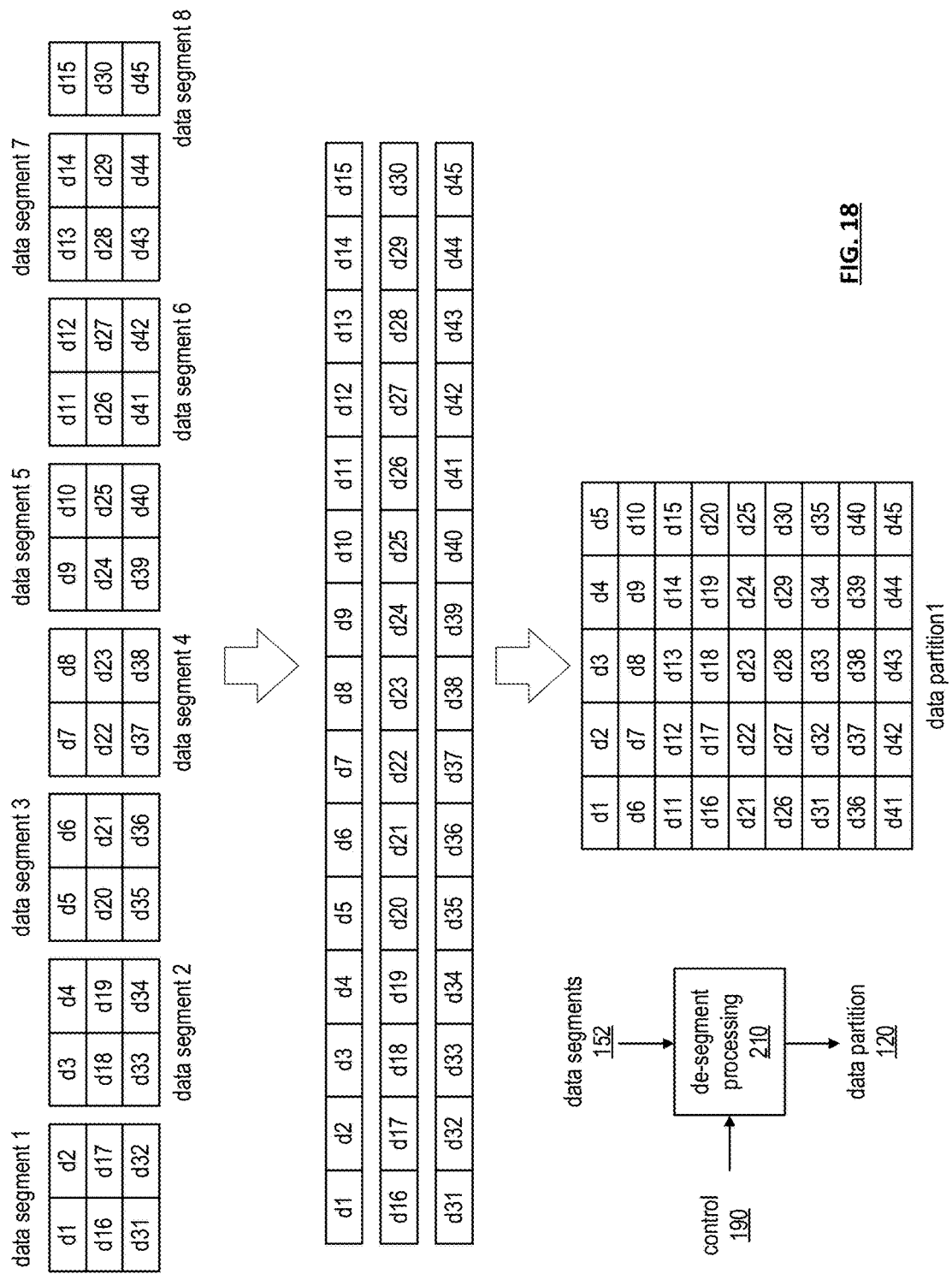
FIG. 18 is a diagram of an example of a de-segment processing of the dispersed error decoding in accordance with the present invention.

FIG. 18 is a diagram of an example of de-segment processing of an inbound distributed storage and task (DST) processing. In this example, a de-segment processing module 210 receives data segments 152 (e.g., 1-8) and rearranges the data blocks of the data segments into rows and columns in accordance with de-segmenting information of control information 190 to produce a data partition 120. Note that the number of rows is based on the decode threshold (e.g., 3 in this specific example) and the number of columns is based on the number and size of the data blocks.

The de-segmenting module 210 converts the rows and columns of data blocks into the data partition 120. Note that each data block may be of the same size as other data blocks or of a different size. In addition, the size of each data block may be a few bytes to megabytes of data.

Figure 19:
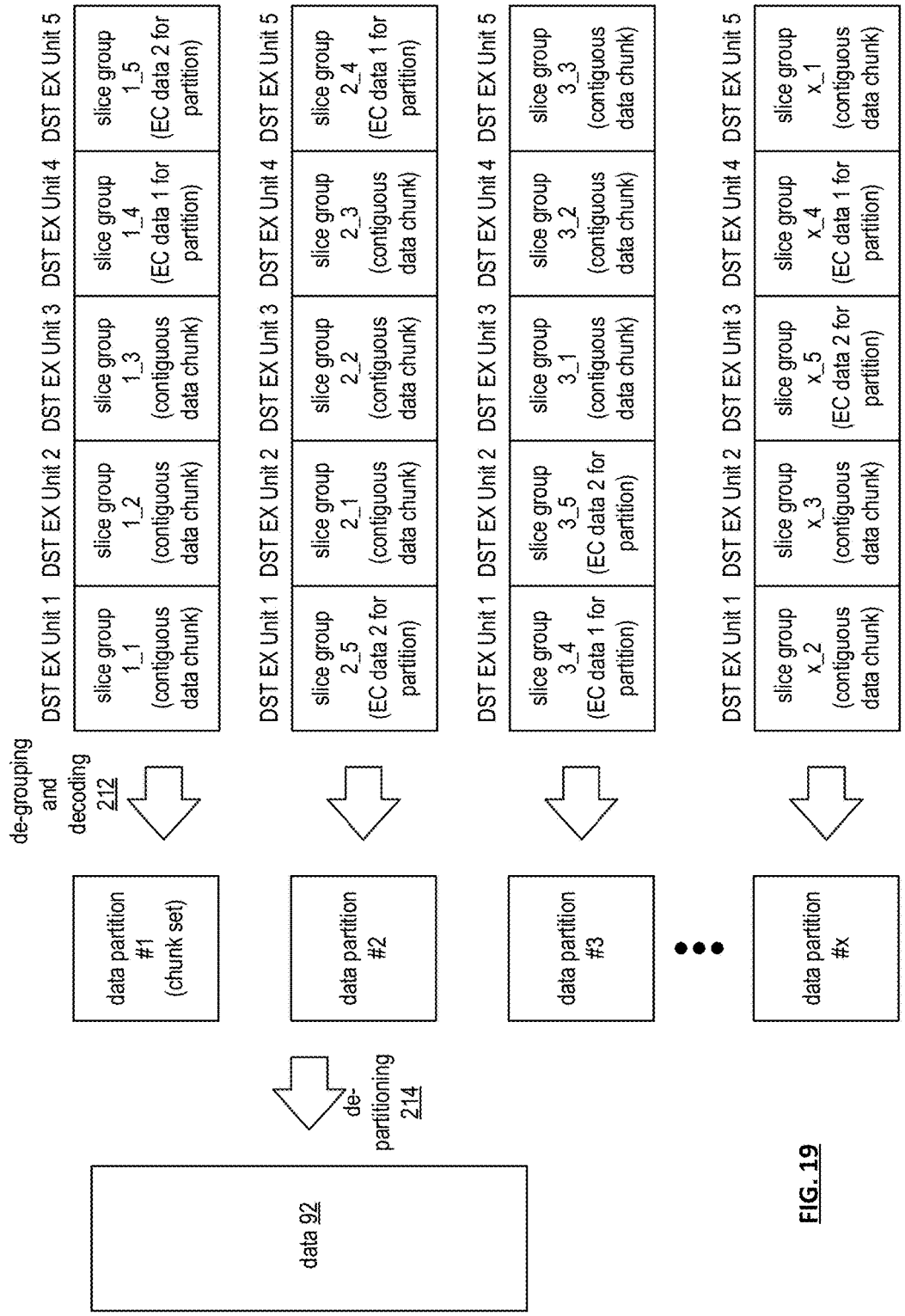
FIG. 19 is a diagram of an example of converting slice groups into data in accordance with the present invention.

FIG. 19 is a diagram of an example of converting slice groups into data 92 within an inbound distributed storage and task (DST) processing section. As shown, the data 92 is reconstructed from a plurality of data partitions (1-x, where x is an integer greater than 4). Each data partition (or chunk set of data) is decoded and re-grouped using a de-grouping and decoding function 212 and a de-partition function 214 from slice groupings as previously discussed. For a given data partition, the slice groupings (e.g., at least a decode threshold per data segment of encoded data slices) are received from DST execution units. From data partition to data partition, the ordering of the slice groupings received from the DST execution units may vary as discussed with reference to FIG. 10.

Figure 20:
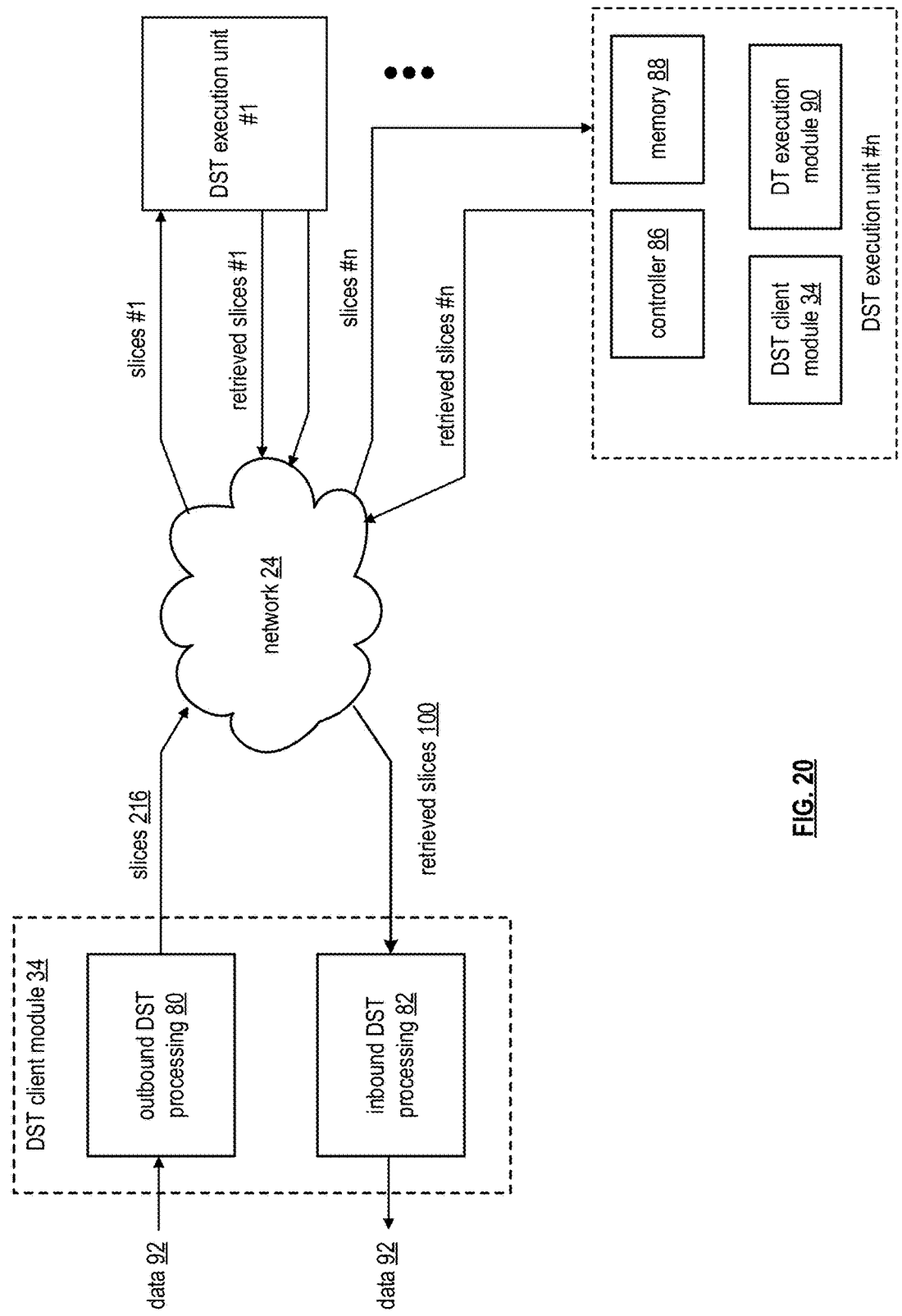
FIG. 20 is a diagram of an example of a distributed storage within the distributed computing system in accordance with the present invention.

FIG. 20 is a diagram of an example of a distributed storage and/or retrieval within the distributed computing system. The distributed computing system includes a plurality of distributed storage and/or task (DST) processing client modules 34 (one shown) coupled to a distributed storage and/or task processing network (DSTN) module, or multiple DSTN modules, via a network 24. The DST client module 34 includes an outbound DST processing section 80 and an inbound DST processing section 82. The DSTN module includes a plurality of DST execution units. Each DST execution unit includes a controller 86, memory 88, one or more distributed task (DT) execution modules 90, and a DST client module 34.

In an example of data storage, the DST client module 34 has data 92 that it desires to store in the DSTN module. The data 92 may be a file (e.g., video, audio, text, graphics, etc.), a data object, a data block, an update to a file, an update to a data block, etc. In this instance, the outbound DST processing module 80 converts the data 92 into encoded data slices 216 as will be further described with reference to FIGS. 21-23. The outbound DST processing module 80 sends, via the network 24, to the DST execution units for storage as further described with reference to FIG. 24.

In an example of data retrieval, the DST client module 34 issues a retrieve request to the DST execution units for the desired data 92. The retrieve request may address each DST executions units storing encoded data slices of the desired data, address a decode threshold number of DST execution units, address a read threshold number of DST execution units, or address some other number of DST execution units. In response to the request, each addressed DST execution unit retrieves its encoded data slices 100 of the desired data and sends them to the inbound DST processing section 82, via the network 24.

When, for each data segment, the inbound DST processing section 82 receives at least a decode threshold number of encoded data slices 100, it converts the encoded data slices 100 into a data segment. The inbound DST processing section 82 aggregates the data segments to produce the retrieved data 92.

Figure 21:
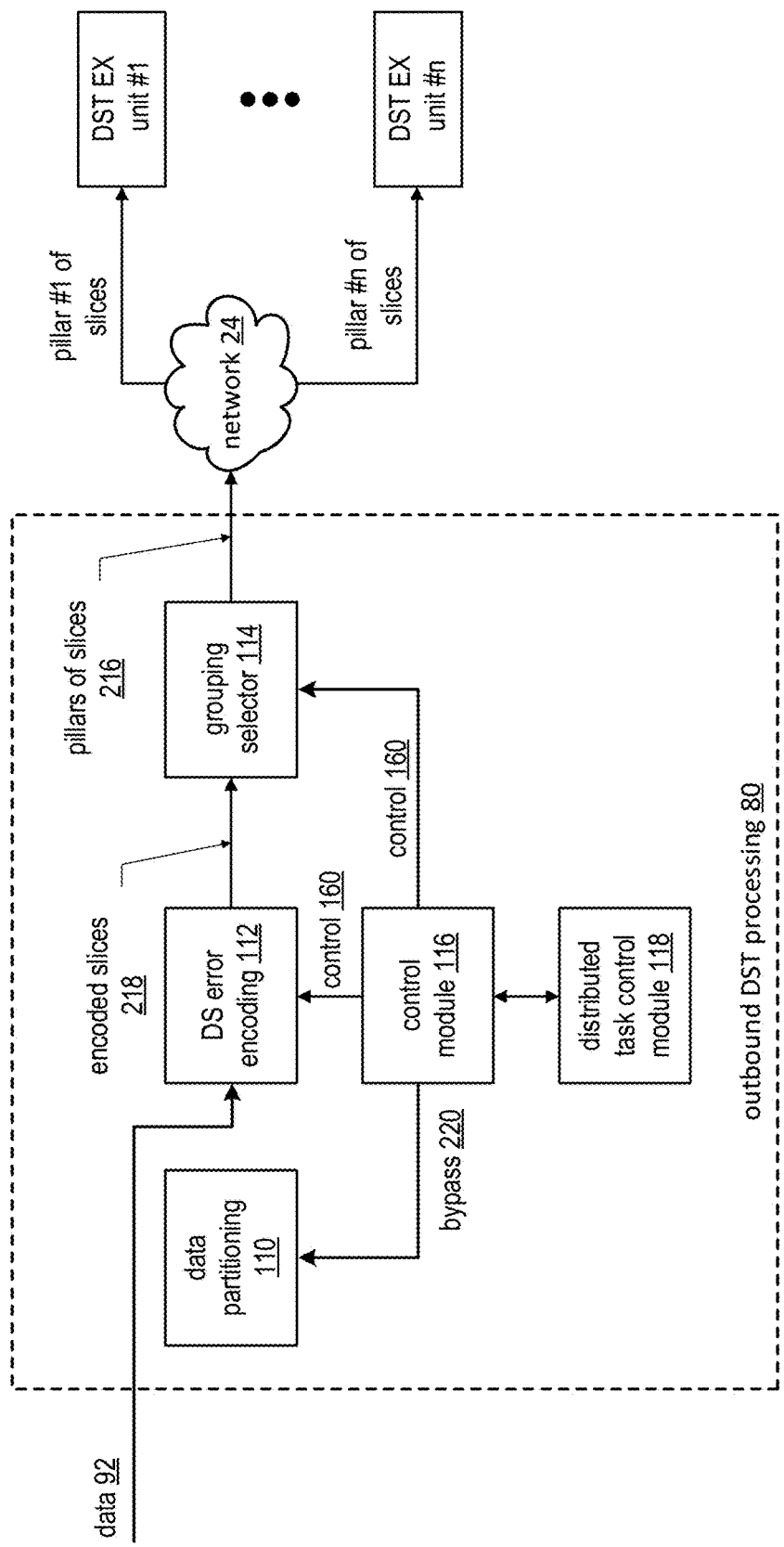
FIG. 21 is a schematic block diagram of an example of operation of outbound distributed storage and/or task (DST) processing for storing data in accordance with the present invention.

FIG. 21 is a schematic block diagram of an embodiment of an outbound distributed storage and/or task (DST) processing section 80 of a DST client module coupled to a distributed storage and task network (DSTN) module (e.g., a plurality of DST execution units) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 is by-passed such that data 92 is provided directly to the DS error encoding module 112. The control module 116 coordinates the by-passing of the data partitioning module 110 by outputting a bypass 220 message to the data partitioning module 110.

The DS error encoding module 112 receives the data 92 in a serial manner, a parallel manner, and/or a combination thereof. The DS error encoding module 112 DS error encodes the data in accordance with control information 160 from the control module 116 to produce encoded data slices 218. The DS error encoding includes segmenting the data 92 into data segments, segment security processing (e.g., encryption, compression, watermarking, integrity check (e.g., CRC, etc.)), error encoding, slicing, and/or per slice security processing (e.g., encryption, compression, watermarking, integrity check (e.g., CRC, etc.)). The control information 160 indicates which steps of the DS error encoding are active for the data 92 and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 218 of the data segments into pillars of slices 216. The number of pillars corresponds to the pillar width of the DS error encoding parameters. In this example, the distributed task control module 118 facilitates the storage request.

Figure 22:
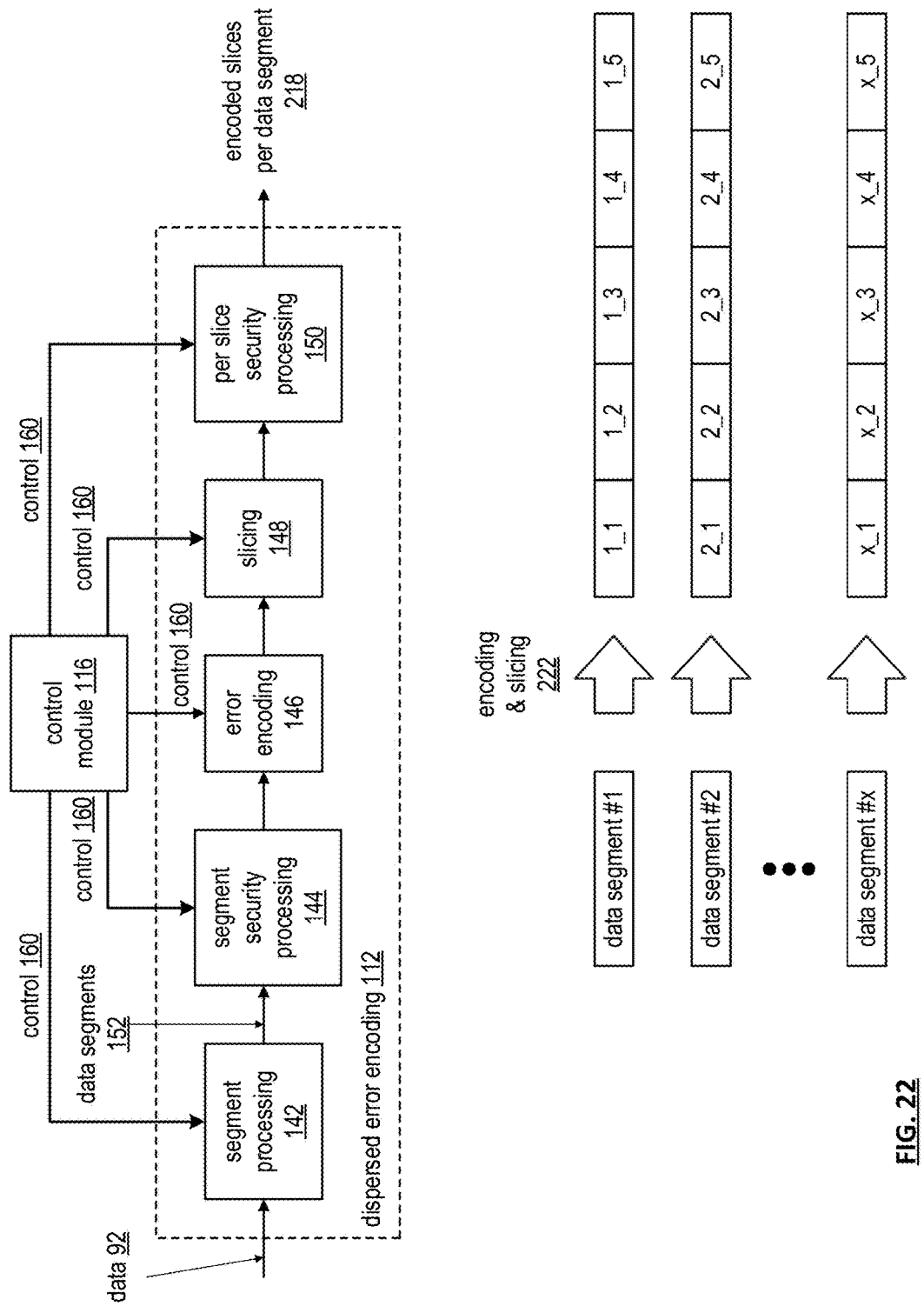
FIG. 22 is a schematic block diagram of an example of a dispersed error encoding for the example of FIG. 21 in accordance with the present invention.

FIG. 22 is a schematic block diagram of an example of a dispersed storage (DS) error encoding module 112 for the example of FIG. 21. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives data 92 and receives segmenting information as control information 160 from the control module 116. The segmenting information indicates how the segment processing module is to segment the data. For example, the segmenting information indicates the size of each data segment. The segment processing module 142 segments the data 92 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., CRC, etc.), and/or any other type of digital security. For example, when the segment security processing module 144 is enabled, it compresses a data segment 152, encrypts the compressed data segment, and generates a CRC value for the encrypted data segment to produce a secure data segment. When the segment security processing module 144 is not enabled, it passes the data segments 152 to the error encoding module 146 or is bypassed such that the data segments 152 are provided to the error encoding module 146.

The error encoding module 146 encodes the secure data segments in accordance with error correction encoding parameters received as control information 160 from the control module 116. The error correction encoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment to produce an encoded data segment.

The slicing module 148 slices the encoded data segment in accordance with a pillar width of the error correction encoding parameters. For example, if the pillar width is five, the slicing module slices an encoded data segment into a set of five encoded data slices. As such, for a plurality of data segments, the slicing module 148 outputs a plurality of sets of encoded data slices as shown within encoding and slicing function 222 as described.

The per slice security processing module 150, when enabled by the control module 116, secures each encoded data slice based on slice security information received as control information 160 from the control module 116. The slice security information includes data compression, encryption, watermarking, integrity check (e.g., CRC, etc.), and/or any other type of digital security. For example, when the per slice security processing module 150 is enabled, it may compress an encoded data slice, encrypt the compressed encoded data slice, and generate a CRC value for the encrypted encoded data slice to produce a secure encoded data slice tweaking. When the per slice security processing module 150 is not enabled, it passes the encoded data slices or is bypassed such that the encoded data slices 218 are the output of the DS error encoding module 112.

Figure 23:
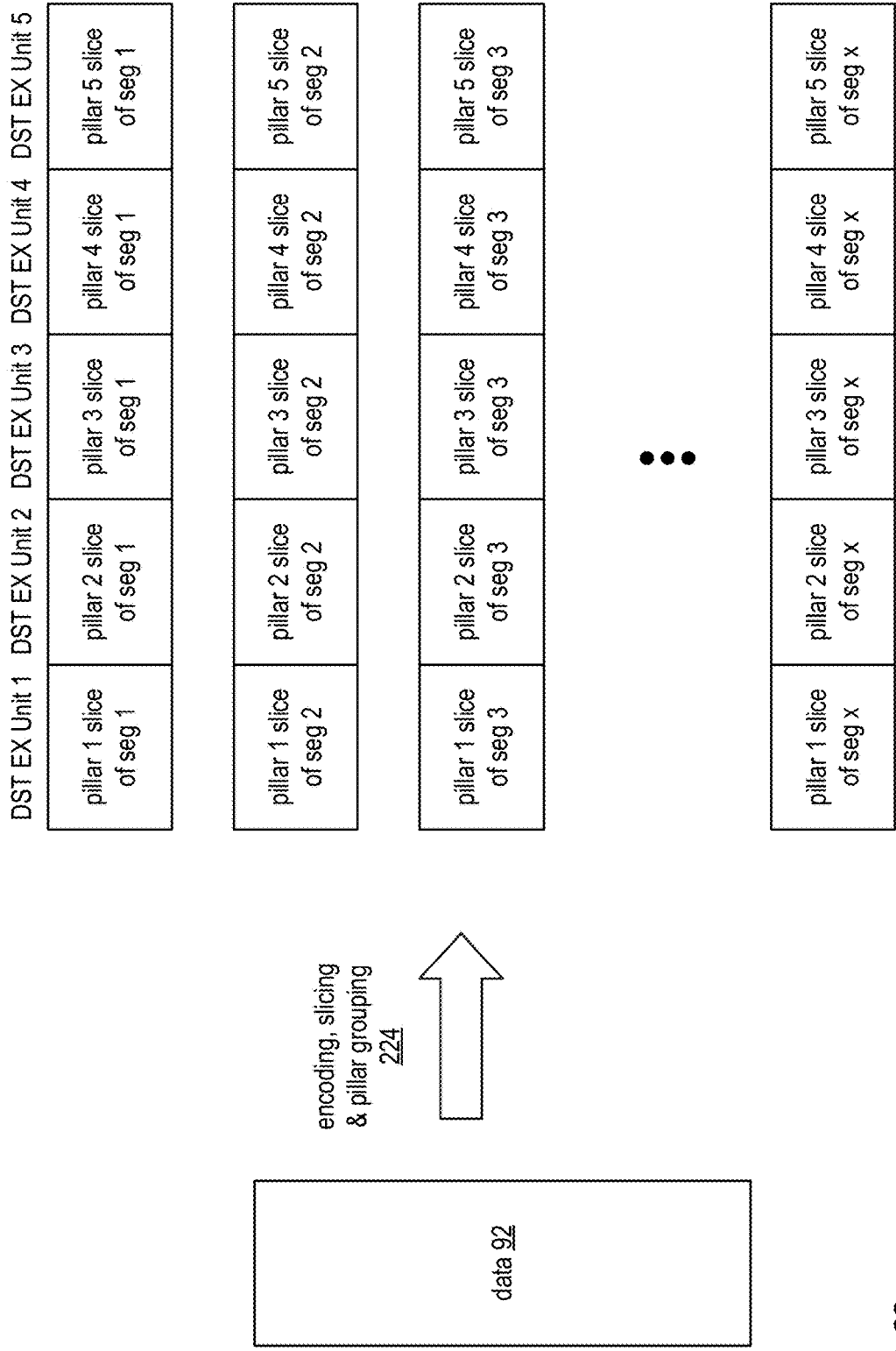
FIG. 23 is a diagram of an example of converting data into pillar slice groups for storage in accordance with the present invention.

FIG. 23 is a diagram of an example of converting data 92 into pillar slice groups utilizing encoding, slicing and pillar grouping function 224 for storage in memory of a distributed storage and task network (DSTN) module. As previously discussed the data 92 is encoded and sliced into a plurality of sets of encoded data slices; one set per data segment. The grouping selector module organizes the sets of encoded data slices into pillars of data slices. In this example, the DS error encoding parameters include a pillar width of 5 and a decode threshold of 3. As such, for each data segment, 5 encoded data slices are created.

The grouping selector module takes the first encoded data slice of each of the sets and forms a first pillar, which may be sent to the first DST execution unit. Similarly, the grouping selector module creates the second pillar from the second slices of the sets; the third pillar from the third slices of the sets; the fourth pillar from the fourth slices of the sets; and the fifth pillar from the fifth slices of the set.

FIG. 24 is a schematic block diagram of an embodiment of a distributed storage and/or task (DST) execution unit that includes an interface 169, a controller 86, memory 88, one or more distributed task (DT) execution modules 90, and a DST client module 34. A computing core 26 may be utilized to implement the one or more DT execution modules 90 and the DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a pillar of slices 216, the DST execution unit receives, via interface 169, a pillar of slices 216 (e.g., pillar #1 slices). The memory 88 stores the encoded data slices 216 of the pillar of slices in accordance with memory control information 174 it receives from the controller 86. The controller 86 (e.g., a processing module, a CPU, etc.) generates the memory control information 174 based on distributed storage information (e.g., user information (e.g., user ID, distributed storage permissions, data access permission, etc.), vault information (e.g., virtual memory assigned to user, user group, etc.), etc.). Similarly, when retrieving slices, the DST execution unit receives, via interface 169, a slice retrieval request. The memory 88 retrieves the slice in accordance with memory control information 174 it receives from the controller 86. The memory 88 outputs the slice 100, via the interface 169, to a requesting entity.

Figure 25:
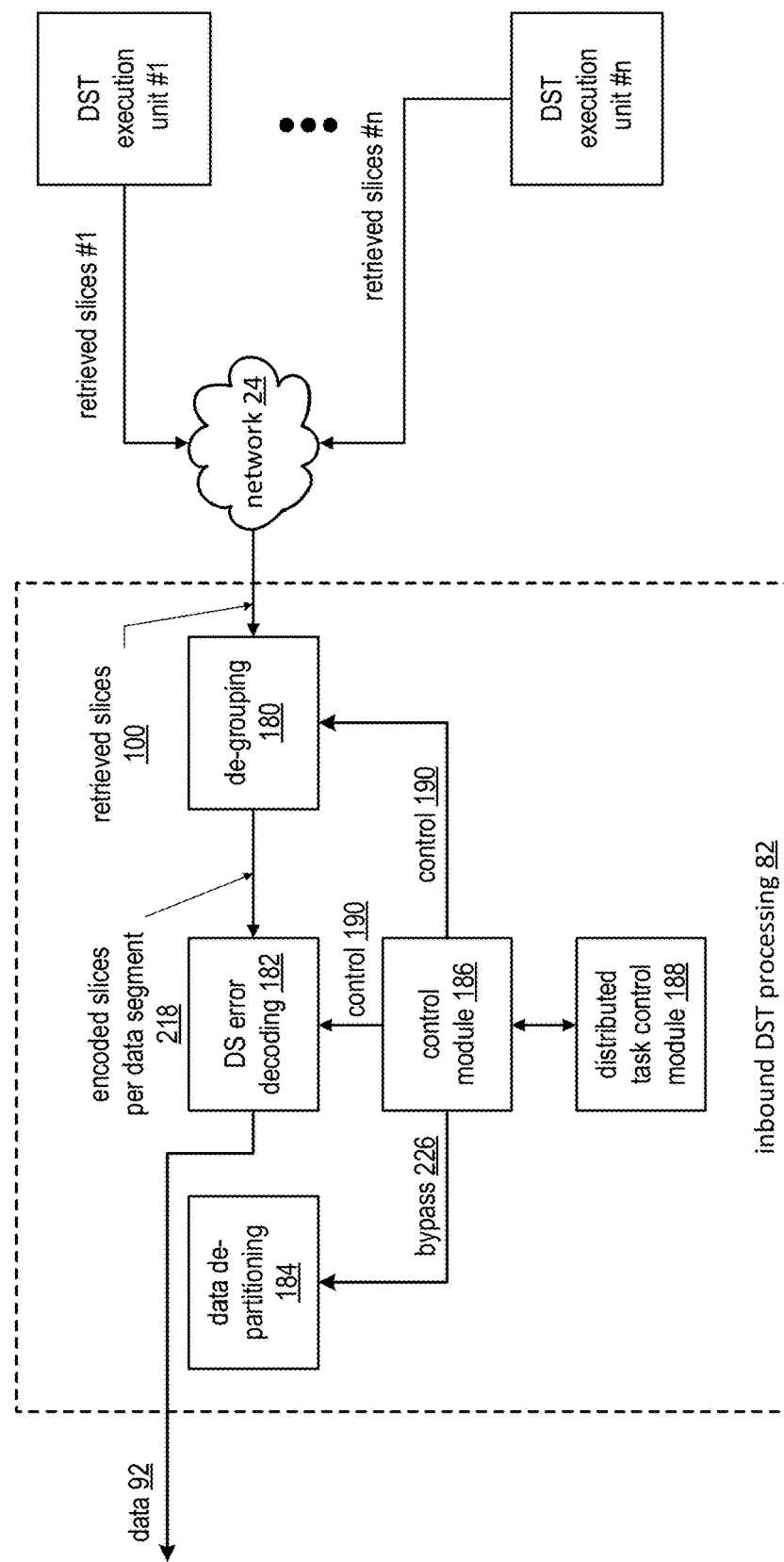
FIG. 25 is a schematic block diagram of an example of operation of inbound distributed storage and/or task (DST) processing for retrieving dispersed error encoded data in accordance with the present invention.

FIG. 25 is a schematic block diagram of an example of operation of an inbound distributed storage and/or task (DST) processing section 82 for retrieving dispersed error encoded data 92. The inbound DST processing section 82 includes a de-grouping module 180, a dispersed storage (DS) error decoding module 182, a data de-partitioning module 184, a control module 186, and a distributed task control module 188. Note that the control module 186 and/or the distributed task control module 188 may be separate modules from corresponding ones of an outbound DST processing section or may be the same modules.

In an example of operation, the inbound DST processing section 82 is retrieving stored data 92 from the DST execution units (i.e., the DSTN module). In this example, the DST execution units output encoded data slices corresponding to data retrieval requests from the distributed task control module 188. The de-grouping module 180 receives pillars of slices 100 and de-groups them in accordance with control information 190 from the control module 186 to produce sets of encoded data slices 218. The DS error decoding module 182 decodes, in accordance with the DS error encoding parameters received as control information 190 from the control module 186, each set of encoded data slices 218 to produce data segments, which are aggregated into retrieved data 92. The data de-partitioning module 184 is by-passed in this operational mode via a bypass signal 226 of control information 190 from the control module 186.

Figure 26:
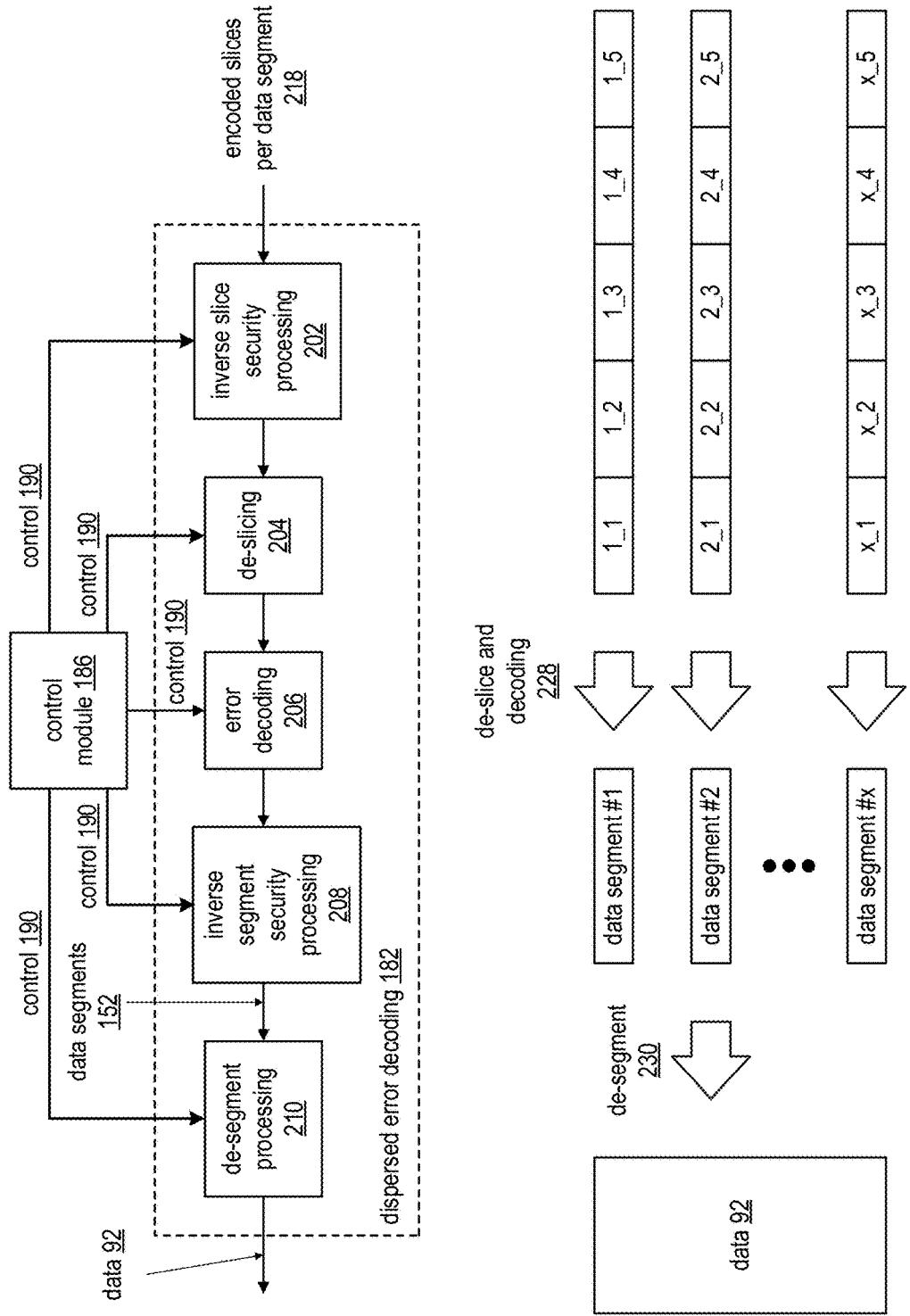
FIG. 26 is a schematic block diagram of an example of a dispersed error decoding for the example of FIG. 25 in accordance with the present invention.

FIG. 26 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, and a de-segmenting processing module 210. The dispersed error decoding module 182 is operable to de-slice and decode encoded slices per data segment 218 utilizing a de-slicing and decoding function 228 to produce a plurality of data segments that are de-segmented utilizing a de-segment function 230 to recover data 92.

In an example of operation, the inverse per slice security processing module 202, when enabled by the control module 186 via control information 190, unsecures each encoded data slice 218 based on slice de-security information (e.g., the compliment of the slice security information discussed with reference to FIG. 6) received as control information 190 from the control module 186. The slice de-security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 218, it decrypts each verified encoded data slice, and decompresses each decrypted encoded data slice to produce slice encoded data. When the inverse per slice security processing module 202 is not enabled, it passes the encoded data slices 218 as the sliced encoded data or is bypassed such that the retrieved encoded data slices 218 are provided as the sliced encoded data.

The de-slicing module 204 de-slices the sliced encoded data into encoded data segments in accordance with a pillar width of the error correction encoding parameters received as control information 190 from a control module 186. For example, if the pillar width is five, the de-slicing module de-slices a set of five encoded data slices into an encoded data segment. Alternatively, the encoded data segment may include just three encoded data slices (e.g., when the decode threshold is 3).

The error decoding module 206 decodes the encoded data segments in accordance with error correction decoding parameters received as control information 190 from the control module 186 to produce secure data segments. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments based on segment security information received as control information 190 from the control module 186. The segment security information includes data decompression, decryption, de-watermarking, integrity check (e.g., CRC, etc.) verification, and/or any other type of digital security. For example, when the inverse segment security processing module is enabled, it verifies integrity information (e.g., a CRC value) of each secure data segment, it decrypts each verified secured data segment, and decompresses each decrypted secure data segment to produce a data segment 152. When the inverse segment security processing module 208 is not enabled, it passes the decoded data segment 152 as the data segment or is bypassed. The de-segmenting processing module 210 aggregates the data segments 152 into the data 92 in accordance with control information 190 from the control module 186.

Figure 27:
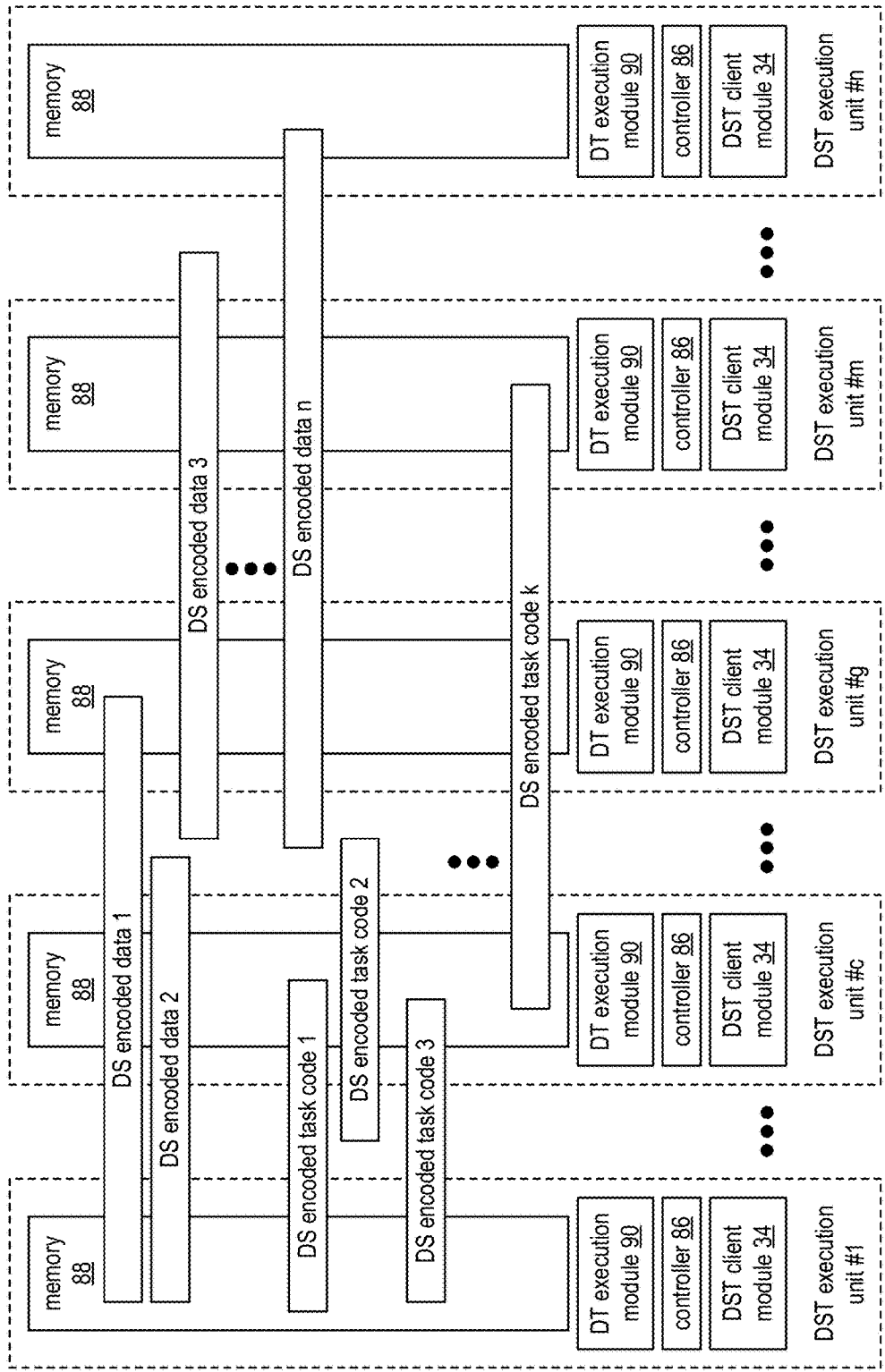
FIG. 27 is a schematic block diagram of an example of a distributed storage and task processing network (DSTN) module storing a plurality of data and a plurality of task codes in accordance with the present invention.

FIG. 27 is a schematic block diagram of an example of a distributed storage and task processing network (DSTN) module that includes a plurality of distributed storage and task (DST) execution units (#1 through #n, where, for example, n is an integer greater than or equal to three). Each of the DST execution units includes a DST client module 34, a controller 86, one or more DT (distributed task) execution modules 90, and memory 88.

In this example, the DSTN module stores, in the memory of the DST execution units, a plurality of DS (dispersed storage) encoded data (e.g., 1 through n, where n is an integer greater than or equal to two) and stores a plurality of DS encoded task codes (e.g., 1 through k, where k is an integer greater than or equal to two). The DS encoded data may be encoded in accordance with one or more examples described with reference to FIGS. 3-19 (e.g., organized in slice groupings) or encoded in accordance with one or more examples described with reference to FIGS. 20-26 (e.g., organized in pillar groups). The data that is encoded into the DS encoded data may be of any size and/or of any content. For example, the data may be one or more digital books, a copy of a company's emails, a large-scale Internet search, a video security file, one or more entertainment video files (e.g., television programs, movies, etc.), data files, and/or any other large amount of data (e.g., greater than a few Terabytes).

The tasks that are encoded into the DS encoded task code may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. The tasks may be encoded into the DS encoded task code in accordance with one or more examples described with reference to FIGS. 3-19 (e.g., organized in slice groupings) or encoded in accordance with one or more examples described with reference to FIGS. 20-26 (e.g., organized in pillar groups).

In an example of operation, a DST client module of a user device or of a DST processing unit issues a DST request to the DSTN module. The DST request may include a request to retrieve stored data, or a portion thereof, may include a request to store data that is included with the DST request, may include a request to perform one or more tasks on stored data, may include a request to perform one or more tasks on data included with the DST request, etc. In the cases where the DST request includes a request to store data or to retrieve data, the client module and/or the DSTN module processes the request as previously discussed with reference to one or more of FIGS. 3-19 (e.g., slice groupings) and/or 20-26 (e.g., pillar groupings). In the case where the DST request includes a request to perform one or more tasks on data included with the DST request, the DST client module and/or the DSTN module process the DST request as previously discussed with reference to one or more of FIGS. 3-19.

In the case where the DST request includes a request to perform one or more tasks on stored data, the DST client module and/or the DSTN module processes the DST request as will be described with reference to one or more of FIGS. 28-39. In general, the DST client module identifies data and one or more tasks for the DSTN module to execute upon the identified data. The DST request may be for a one-time execution of the task or for an on-going execution of the task. As an example of the latter, as a company generates daily emails, the DST request may be to daily search new emails for inappropriate content and, if found, record the content, the email sender(s), the email recipient(s), email routing information, notify human resources of the identified email, etc.

Figure 28:
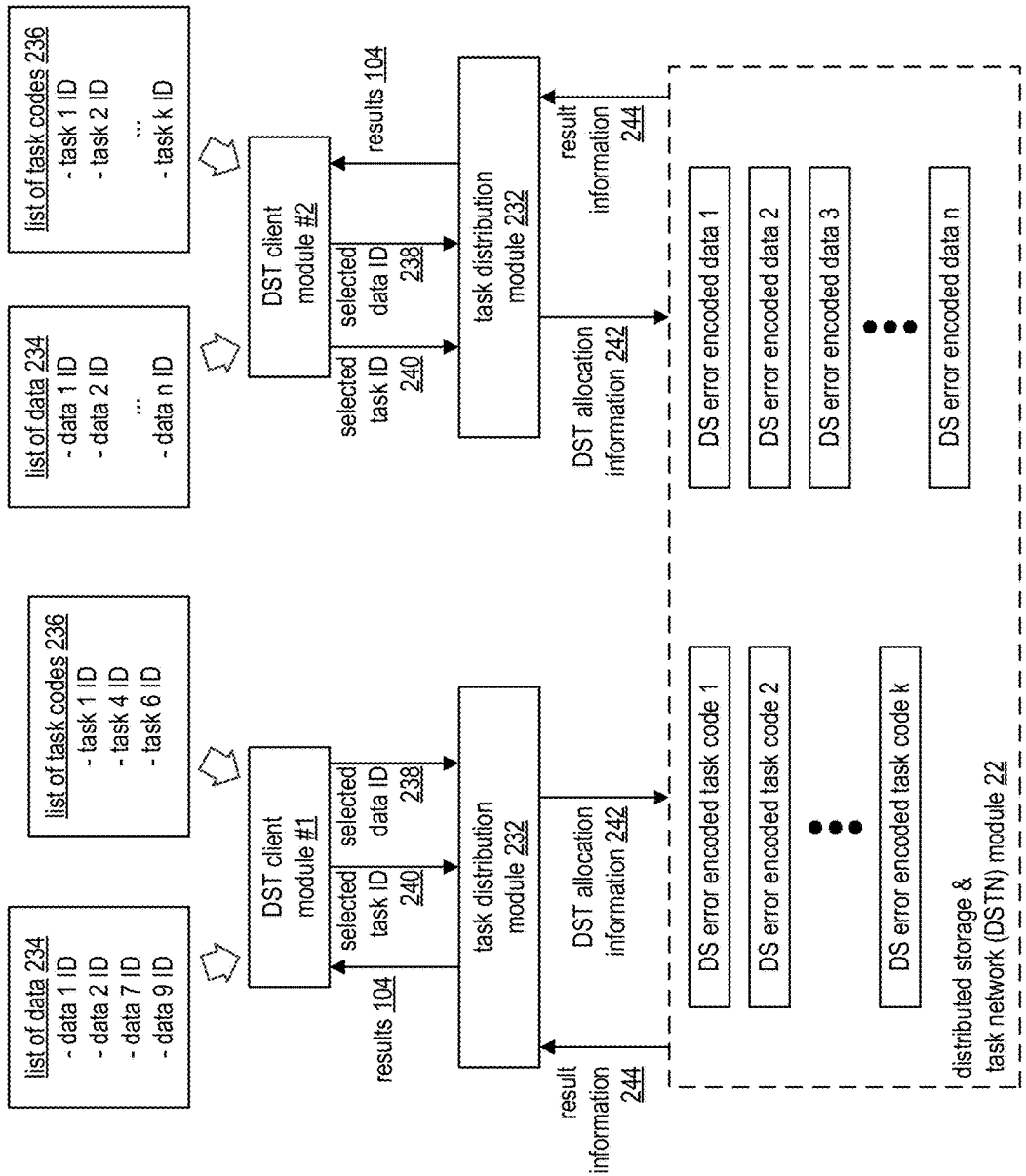
FIG. 28 is a schematic block diagram of an example of the distributed computing system performing tasks on stored data in accordance with the present invention.

FIG. 28 is a schematic block diagram of an example of a distributed computing system performing tasks on stored data. In this example, two distributed storage and task (DST) client modules 1-2 are shown: the first may be associated with a user device and the second may be associated with a DST processing unit or a high priority user device (e.g., high priority clearance user, system administrator, etc.). Each DST client module includes a list of stored data 234 and a list of tasks codes 236. The list of stored data 234 includes one or more entries of data identifying information, where each entry identifies data stored in the DSTN module 22. The data identifying information (e.g., data ID) includes one or more of a data file name, a data file directory listing, DSTN addressing information of the data, a data object identifier, etc. The list of tasks 236 includes one or more entries of task code identifying information, when each entry identifies task codes stored in the DSTN module 22. The task code identifying information (e.g., task ID) includes one or more of a task file name, a task file directory listing, DSTN addressing information of the task, another type of identifier to identify the task, etc.

As shown, the list of data 234 and the list of tasks 236 are each smaller in number of entries for the first DST client module than the corresponding lists of the second DST client module. This may occur because the user device associated with the first DST client module has fewer privileges in the distributed computing system than the device associated with the second DST client module. Alternatively, this may occur because the user device associated with the first DST client module serves fewer users than the device associated with the second DST client module and is restricted by the distributed computing system accordingly. As yet another alternative, this may occur through no restraints by the distributed computing system, it just occurred because the operator of the user device associated with the first DST client module has selected fewer data and/or fewer tasks than the operator of the device associated with the second DST client module.

In an example of operation, the first DST client module selects one or more data entries 238 and one or more tasks 240 from its respective lists (e.g., selected data ID and selected task ID). The first DST client module sends its selections to a task distribution module 232. The task distribution module 232 may be within a stand-alone device of the distributed computing system, may be within the user device that contains the first DST client module, or may be within the DSTN module 22.

Regardless of the task distribution module's location, it generates DST allocation information 242 from the selected task ID 240 and the selected data ID 238. The DST allocation information 242 includes data partitioning information, task execution information, and/or intermediate result information. The task distribution module 232 sends the DST allocation information 242 to the DSTN module 22. Note that one or more examples of the DST allocation information will be discussed with reference to one or more of FIGS. 29-39.

The DSTN module 22 interprets the DST allocation information 242 to identify the stored DS encoded data (e.g., DS error encoded data 2) and to identify the stored DS error encoded task code (e.g., DS error encoded task code 1). In addition, the DSTN module 22 interprets the DST allocation information 242 to determine how the data is to be partitioned and how the task is to be partitioned. The DSTN module 22 also determines whether the selected DS error encoded data 238 needs to be converted from pillar grouping to slice grouping. If so, the DSTN module 22 converts the selected DS error encoded data into slice groupings and stores the slice grouping DS error encoded data by overwriting the pillar grouping DS error encoded data or by storing it in a different location in the memory of the DSTN module 22 (i.e., does not overwrite the pillar grouping DS encoded data).

The DSTN module 22 partitions the data and the task as indicated in the DST allocation information 242 and sends the portions to selected DST execution units of the DSTN module 22. Each of the selected DST execution units performs its partial task(s) on its slice groupings to produce partial results. The DSTN module 22 collects the partial results from the selected DST execution units and provides them, as result information 244, to the task distribution module. The result information 244 may be the collected partial results, one or more final results as produced by the DSTN module 22 from processing the partial results in accordance with the DST allocation information 242, or one or more intermediate results as produced by the DSTN module 22 from processing the partial results in accordance with the DST allocation information 242.

The task distribution module 232 receives the result information 244 and provides one or more final results 104 therefrom to the first DST client module. The final result(s) 104 may be result information 244 or a result(s) of the task distribution module's processing of the result information 244.

In concurrence with processing the selected task of the first DST client module, the distributed computing system may process the selected task(s) of the second DST client module on the selected data(s) of the second DST client module. Alternatively, the distributed computing system may process the second DST client module's request subsequent to, or preceding, that of the first DST client module. Regardless of the ordering and/or parallel processing of the DST client module requests, the second DST client module provides its selected data 238 and selected task 240 to a task distribution module 232. If the task distribution module 232 is a separate device of the distributed computing system or within the DSTN module, the task distribution modules 232 coupled to the first and second DST client modules may be the same module. The task distribution module 232 processes the request of the second DST client module in a similar manner as it processed the request of the first DST client module.

Figure 29:
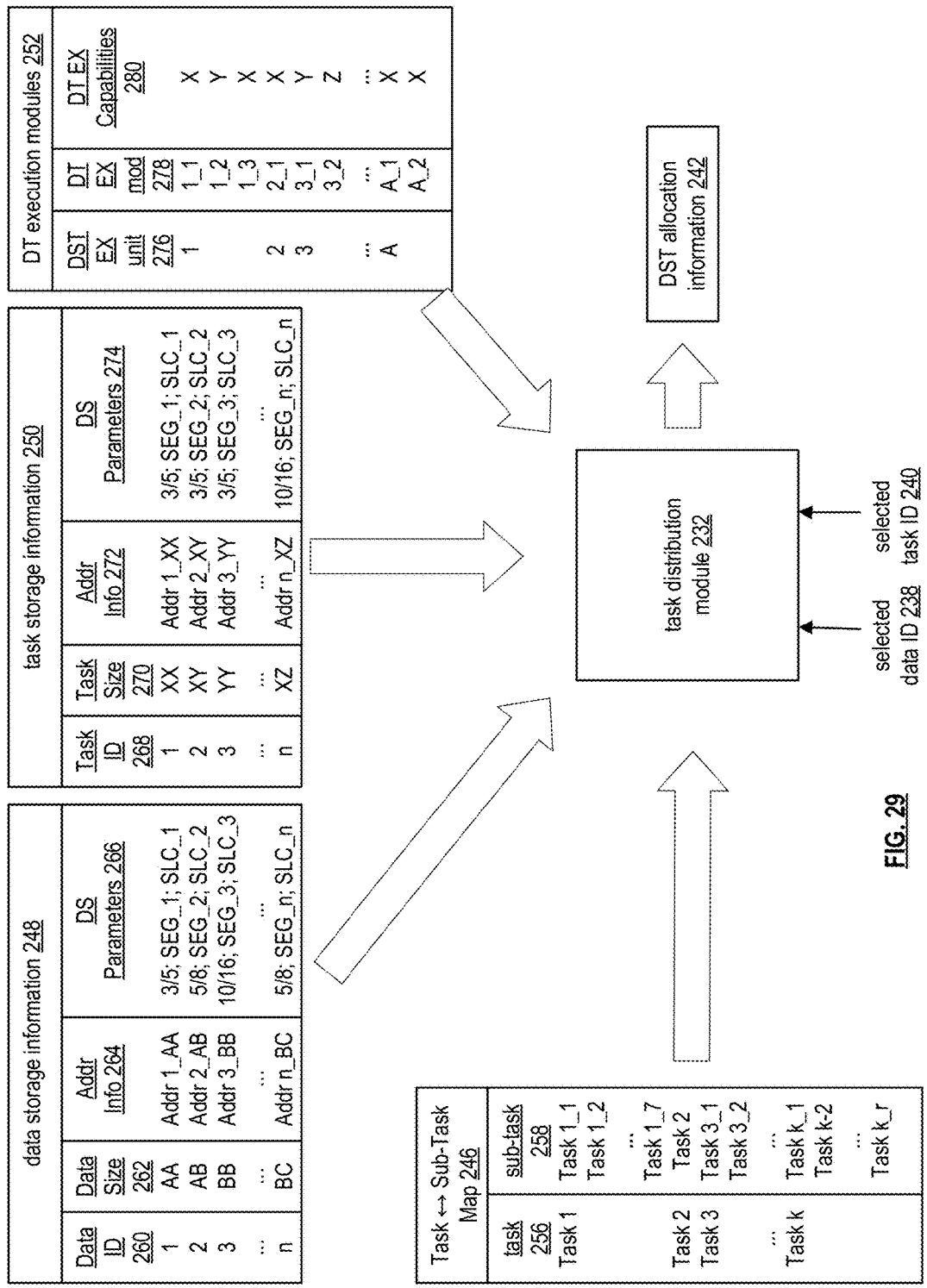
FIG. 29 is a schematic block diagram of an embodiment of a task distribution module facilitating the example of FIG. 28 in accordance with the present invention.

FIG. 29 is a schematic block diagram of an embodiment of a task distribution module 232 facilitating the example of FIG. 28. The task distribution module 232 includes a plurality of tables it uses to generate distributed storage and task (DST) allocation information 242 for selected data and selected tasks received from a DST client module. The tables include data storage information 248, task storage information 250, distributed task (DT) execution module information 252, and task ⇔ sub-task mapping information 246.

The data storage information table 248 includes a data identification (ID) field 260, a data size field 262, an addressing information field 264, distributed storage (DS) information 266, and may further include other information regarding the data, how it is stored, and/or how it can be processed. For example, DS encoded data #1 has a data ID of 1, a data size of AA (e.g., a byte size of a few Terabytes or more), addressing information of Addr_1_AA, and DS parameters of 3/5; SEG_1; and SLC_1. In this example, the addressing information may be a virtual address corresponding to the virtual address of the first storage word (e.g., one or more bytes) of the data and information on how to calculate the other addresses, may be a range of virtual addresses for the storage words of the data, physical addresses of the first storage word or the storage words of the data, may be a list of slice names of the encoded data slices of the data, etc. The DS parameters may include identity of an error encoding scheme, decode threshold/pillar width (e.g., 3/5 for the first data entry), segment security information (e.g., SEG_1), per slice security information (e.g., SLC_1), and/or any other information regarding how the data was encoded into data slices.

The task storage information table 250 includes a task identification (ID) field 268, a task size field 270, an addressing information field 272, distributed storage (DS) information 274, and may further include other information regarding the task, how it is stored, and/or how it can be used to process data. For example, DS encoded task #2 has a task ID of 2, a task size of XY, addressing information of Addr_2_XY, and DS parameters of 3/5; SEG_2; and SLC_2. In this example, the addressing information may be a virtual address corresponding to the virtual address of the first storage word (e.g., one or more bytes) of the task and information on how to calculate the other addresses, may be a range of virtual addresses for the storage words of the task, physical addresses of the first storage word or the storage words of the task, may be a list of slices names of the encoded slices of the task code, etc. The DS parameters may include identity of an error encoding scheme, decode threshold/pillar width (e.g., 3/5 for the first data entry), segment security information (e.g., SEG_2), per slice security information (e.g., SLC_2), and/or any other information regarding how the task was encoded into encoded task slices. Note that the segment and/or the per-slice security information include a type of encryption (if enabled), a type of compression (if enabled), watermarking information (if enabled), and/or an integrity check scheme (if enabled).

The task ⇔ sub-task mapping information table 246 includes a task field 256 and a sub-task field 258. The task field 256 identifies a task stored in the memory of a distributed storage and task network (DSTN) module and the corresponding sub-task fields 258 indicates whether the task includes sub-tasks and, if so, how many and if any of the sub-tasks are ordered. In this example, the task ⇔ sub-task mapping information table 246 includes an entry for each task stored in memory of the DSTN module (e.g., task 1 through task k). In particular, this example indicates that task 1 includes 7 sub-tasks; task 2 does not include sub-tasks, and task k includes r number of sub-tasks (where r is an integer greater than or equal to two).

The DT execution module table 252 includes a DST execution unit ID field 276, a DT execution module ID field 278, and a DT execution module capabilities field 280. The DST execution unit ID field 276 includes the identity of DST units in the DSTN module. The DT execution module ID field 278 includes the identity of each DT execution unit in each DST unit. For example, DST unit 1 includes three DT executions modules (e.g., 1_1, 1_2, and 1_3). The DT execution capabilities field 280 includes identity of the capabilities of the corresponding DT execution unit. For example, DT execution module 1_1 includes capabilities X, where X includes one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.), and/or any information germane to executing one or more tasks.

From these tables, the task distribution module 232 generates the DST allocation information 242 to indicate where the data is stored, how to partition the data, where the task is stored, how to partition the task, which DT execution units should perform which partial task on which data partitions, where and how intermediate results are to be stored, etc. If multiple tasks are being performed on the same data or different data, the task distribution module factors such information into its generation of the DST allocation information.

Figure 30:
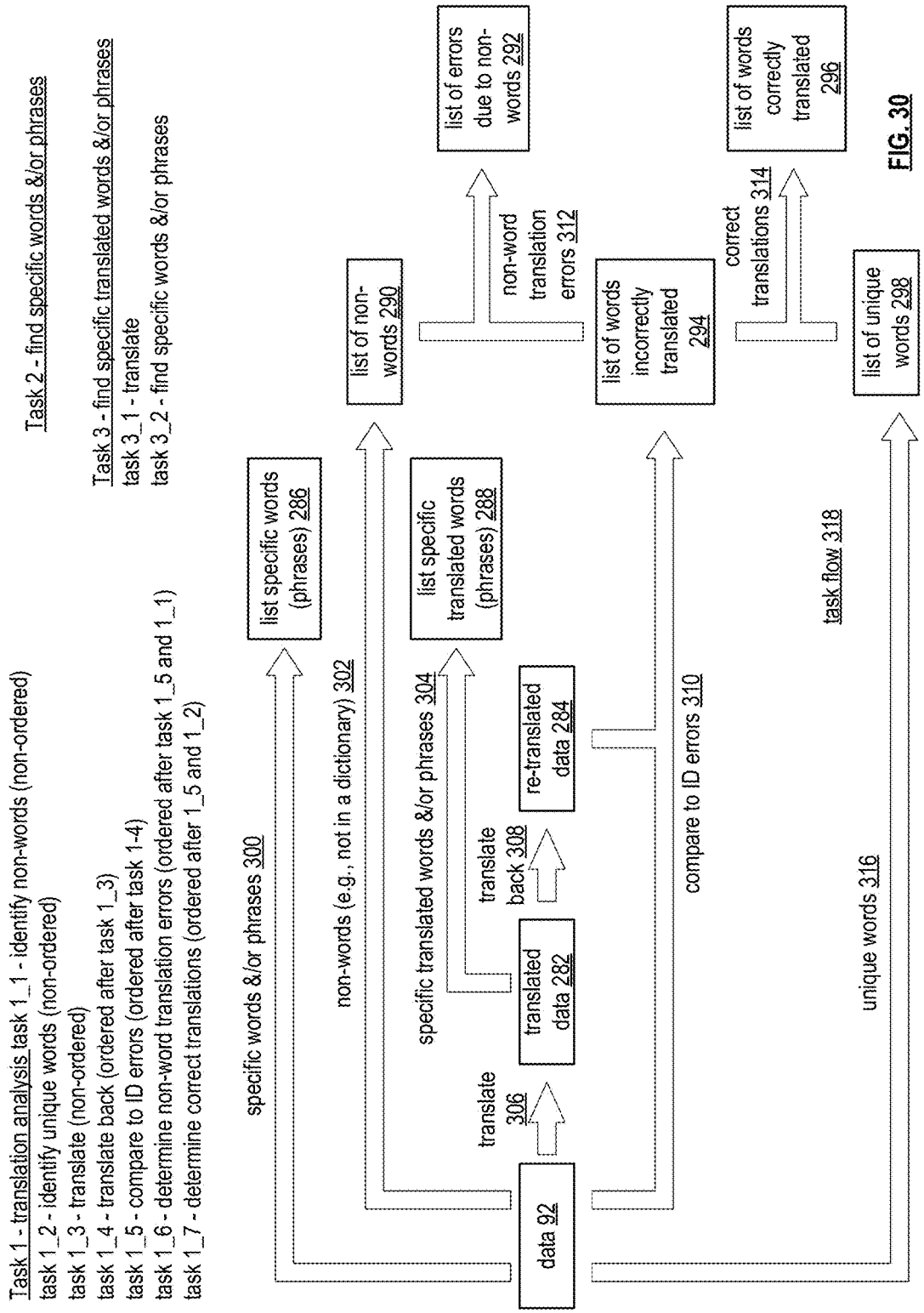
FIG. 30 is a diagram of a specific example of the distributed computing system performing tasks on stored data in accordance with the present invention.

FIG. 30 is a diagram of a specific example of a distributed computing system performing tasks on stored data as a task flow 318. In this example, selected data 92 is data 2 and selected tasks are tasks 1, 2, and 3. Task 1 corresponds to analyzing translation of data from one language to another (e.g., human language or computer language); task 2 corresponds to finding specific words and/or phrases in the data; and task 3 corresponds to finding specific translated words and/or phrases in translated data.

In this example, task 1 includes 7 sub-tasks: task 1_1—identify non-words (non-ordered); task 1_2—identify unique words (non-ordered); task 1_3—translate (non-ordered); task 1_4—translate back (ordered after task 1_3); task 1_5—compare to ID errors (ordered after task 1-4); task 1_6—determine non-word translation errors (ordered after task 1_5 and 1_1); and task 1_7—determine correct translations (ordered after 1_5 and 1_2). The sub-task further indicates whether they are an ordered task (i.e., are dependent on the outcome of another task) or non-order (i.e., are independent of the outcome of another task). Task 2 does not include sub-tasks and task 3 includes two sub-tasks: task 3_1 translate; and task 3_2 find specific word or phrase in translated data.

In general, the three tasks collectively are selected to analyze data for translation accuracies, translation errors, translation anomalies, occurrence of specific words or phrases in the data, and occurrence of specific words or phrases on the translated data. Graphically, the data 92 is translated 306 into translated data 282; is analyzed for specific words and/or phrases 300 to produce a list of specific words and/or phrases 286; is analyzed for non-words 302 (e.g., not in a reference dictionary) to produce a list of non-words 290; and is analyzed for unique words 316 included in the data 92 (i.e., how many different words are included in the data) to produce a list of unique words 298. Each of these tasks is independent of each other and can therefore be processed in parallel if desired.

The translated data 282 is analyzed (e.g., sub-task 3_2) for specific translated words and/or phrases 304 to produce a list of specific translated words and/or phrases 288. The translated data 282 is translated back 308 (e.g., sub-task 1_4) into the language of the original data to produce re-translated data 284. These two tasks are dependent on the translate task (e.g., task 1_3) and thus must be ordered after the translation task, which may be in a pipelined ordering or a serial ordering. The re-translated data 284 is then compared 310 with the original data 92 to find words and/or phrases that did not translate (one way and/or the other) properly to produce a list of incorrectly translated words 294. As such, the comparing task (e.g., sub-task 1_5) 310 is ordered after the translation 306 and re-translation tasks 308 (e.g., sub-tasks 1_3 and 1_4).

The list of words incorrectly translated 294 is compared 312 to the list of non-words 290 to identify words that were not properly translated because the words are non-words to produce a list of errors due to non-words 292. In addition, the list of words incorrectly translated 294 is compared 314 to the list of unique words 298 to identify unique words that were properly translated to produce a list of correctly translated words 296. The comparison may also identify unique words that were not properly translated to produce a list of unique words that were not properly translated. Note that each list of words (e.g., specific words and/or phrases, non-words, unique words, translated words and/or phrases, etc.,) may include the word and/or phrase, how many times it is used, where in the data it is used, and/or any other information requested regarding a word and/or phrase.

Figure 31:
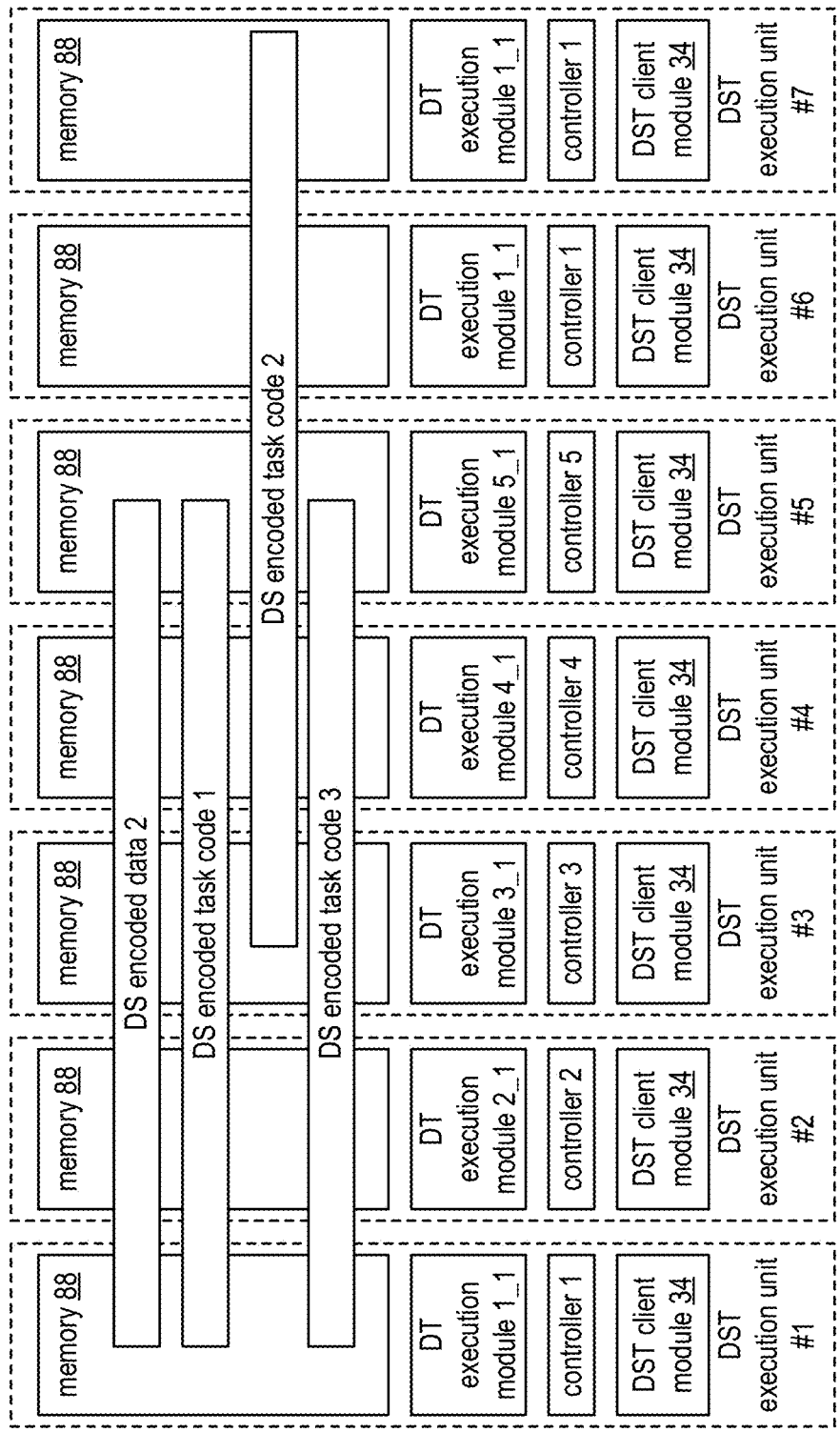
FIG. 31 is a schematic block diagram of an example of a distributed storage and task processing network (DSTN) module storing data and task codes for the example of FIG. 30 in accordance with the present invention.

FIG. 31 is a schematic block diagram of an example of a distributed storage and task processing network (DSTN) module storing data and task codes for the example of FIG. 30. As shown, DS encoded data 2 is stored as encoded data slices across the memory (e.g., stored in memories 88) of DST execution units 1-5; the DS encoded task code 1 (of task 1) and DS encoded task 3 are stored as encoded task slices across the memory of DST execution units 1-5; and DS encoded task code 2 (of task 2) is stored as encoded task slices across the memory of DST execution units 3-7. As indicated in the data storage information table and the task storage information table of FIG. 29, the respective data/task has DS parameters of 3/5 for decode threshold/pillar width; hence spanning the memory of five DST execution units.

FIG. 32 is a diagram of an example of distributed storage and task (DST) allocation information 242 for the example of FIG. 30. The DST allocation information 242 includes data partitioning information 320, task execution information 322, and intermediate result information 324. The data partitioning information 320 includes the data identifier (ID), the number of partitions to split the data into, address information for each data partition, and whether the DS encoded data has to be transformed from pillar grouping to slice grouping. The task execution information 322 includes tabular information having a task identification field 326, a task ordering field 328, a data partition field ID 330, and a set of DT execution modules 332 to use for the distributed task processing per data partition. The intermediate result information 324 includes tabular information having a name ID field 334, an ID of the DST execution unit assigned to process the corresponding intermediate result 336, a scratch pad storage field 338, and an intermediate result storage field 340.

Continuing with the example of FIG. 30, where tasks 1-3 are to be distributedly performed on data 2, the data partitioning information includes the ID of data 2. In addition, the task distribution module determines whether the DS encoded data 2 is in the proper format for distributed computing (e.g., was stored as slice groupings). If not, the task distribution module indicates that the DS encoded data 2 format needs to be changed from the pillar grouping format to the slice grouping format, which will be done by the DSTN module. In addition, the task distribution module determines the number of partitions to divide the data into (e.g., 2_1 through 2_z) and addressing information for each partition.

The task distribution module generates an entry in the task execution information section for each sub-task to be performed. For example, task 1_1 (e.g., identify non-words on the data) has no task ordering (i.e., is independent of the results of other sub-tasks), is to be performed on data partitions 2_1 through 2_z by DT execution modules 1_1, 2_1, 3_1, 4_1, and 5_1. For instance, DT execution modules 1_1, 2_1, 3_1, 4_1, and 5_1 search for non-words in data partitions 2_1 through 2_z to produce task 1_1 intermediate results (R1-1, which is a list of non-words). Task 1_2 (e.g., identify unique words) has similar task execution information as task 1_1 to produce task 1_2 intermediate results (R1-2, which is the list of unique words).

Task 1_3 (e.g., translate) includes task execution information as being non-ordered (i.e., is independent), having DT execution modules 1_1, 2_1, 3_1, 4_1, and 5_1 translate data partitions 2_1 through 2_4 and having DT execution modules 1_2, 2_2, 3_2, 4_2, and 5_2 translate data partitions 2_5 through 2_z to produce task 1_3 intermediate results (R1-3, which is the translated data). In this example, the data partitions are grouped, where different sets of DT execution modules perform a distributed sub-task (or task) on each data partition group, which allows for further parallel processing.

Task 1_4 (e.g., translate back) is ordered after task 1_3 and is to be executed on task 1_3's intermediate result (e.g., R1-3_1) (e.g., the translated data). DT execution modules 1_1, 2_1, 3_1, 4_1, and 5_1 are allocated to translate back task 1_3 intermediate result partitions R1-3_1 through R1-3_4 and DT execution modules 1_2, 2_2, 6_1, 7_1, and 7_2 are allocated to translate back task 1_3 intermediate result partitions R1-3_5 through R1-3_z to produce task 1-4 intermediate results (R1-4, which is the translated back data).

Task 1_5 (e.g., compare data and translated data to identify translation errors) is ordered after task 1_4 and is to be executed on task 1_4's intermediate results (R4-1) and on the data. DT execution modules 1_1, 2_1, 3_1, 4_1, and 5_1 are allocated to compare the data partitions (2_1 through 2_z) with partitions of task 1-4 intermediate results partitions R1-4_1 through R1-4_z to produce task 1_5 intermediate results (R1-5, which is the list words translated incorrectly).

Task 1_6 (e.g., determine non-word translation errors) is ordered after tasks 1_1 and 1_5 and is to be executed on tasks 1_1's and 1_5's intermediate results (R1-1 and R1-5). DT execution modules 1_1, 2_1, 3_1, 4_1, and 5_1 are allocated to compare the partitions of task 1_1 intermediate results (R1-1_1 through R1-1_z) with partitions of task 1-5 intermediate results partitions (R1-5_1 through R1-5_z) to produce task 1_6 intermediate results (R1-6, which is the list translation errors due to non-words).

Task 1_7 (e.g., determine words correctly translated) is ordered after tasks 1_2 and 1_5 and is to be executed on tasks 1_2's and 1_5's intermediate results (R1-1 and R1-5). DT execution modules 1_2, 2_2, 3_2, 4_2, and 5_2 are allocated to compare the partitions of task 1_2 intermediate results (R1-2_1 through R1-2_z) with partitions of task 1-5 intermediate results partitions (R1-5_1 through R1-5_z) to produce task 1_7 intermediate results (R1-7, which is the list of correctly translated words).

Task 2 (e.g., find specific words and/or phrases) has no task ordering (i.e., is independent of the results of other sub-tasks), is to be performed on data partitions 2_1 through 2_z by DT execution modules 3_1, 4_1, 5_1, 6_1, and 7_1. For instance, DT execution modules 3_1, 4_1, 5_1, 6_1, and 7_1 search for specific words and/or phrases in data partitions 2_1 through 2_z to produce task 2 intermediate results (R2, which is a list of specific words and/or phrases).

Task 3_2 (e.g., find specific translated words and/or phrases) is ordered after task 1_3 (e.g., translate) is to be performed on partitions R1-3_1 through R1-3_z by DT execution modules 1_2, 2_2, 3_2, 4_2, and 5_2. For instance, DT execution modules 1_2, 2_2, 3_2, 4_2, and 5_2 search for specific translated words and/or phrases in the partitions of the translated data (R1-3_1 through R1-3_z) to produce task 3_2 intermediate results (R3-2, which is a list of specific translated words and/or phrases).

For each task, the intermediate result information indicates which DST unit is responsible for overseeing execution of the task and, if needed, processing the partial results generated by the set of allocated DT execution units. In addition, the intermediate result information indicates a scratch pad memory for the task and where the corresponding intermediate results are to be stored. For example, for intermediate result R1-1 (the intermediate result of task 1_1), DST unit 1 is responsible for overseeing execution of the task 1_1 and coordinates storage of the intermediate result as encoded intermediate result slices stored in memory of DST execution units 1-5. In general, the scratch pad is for storing non-DS encoded intermediate results and the intermediate result storage is for storing DS encoded intermediate results.

FIGS. 33-38 are schematic block diagrams of the distributed storage and task network (DSTN) module performing the example of FIG. 30. In FIG. 33, the DSTN module accesses the data 92 and partitions it into a plurality of partitions 1-z in accordance with distributed storage and task network (DST) allocation information. For each data partition, the DSTN identifies a set of its DT (distributed task) execution modules 90 to perform the task (e.g., identify non-words (i.e., not in a reference dictionary) within the data partition) in accordance with the DST allocation information. From data partition to data partition, the set of DT execution modules 90 may be the same, different, or a combination thereof (e.g., some data partitions use the same set while other data partitions use different sets).

For the first data partition, the first set of DT execution modules (e.g., 1_1, 2_1, 3_1, 4_1, and 5_1 per the DST allocation information of FIG. 32) executes task 1_1 to produce a first partial result 102 of non-words found in the first data partition. The second set of DT execution modules (e.g., 1_1, 2_1, 3_1, 4_1, and 5_1 per the DST allocation information of FIG. 32) executes task 1_1 to produce a second partial result 102 of non-words found in the second data partition. The sets of DT execution modules (as per the DST allocation information) perform task 1_1 on the data partitions until the "z" set of DT execution modules performs task 1_1 on the "zth" data partition to produce a "zth" partial result 102 of non-words found in the "zth" data partition.

As indicated in the DST allocation information of FIG. 32, DST execution unit 1 is assigned to process the first through "zth" partial results to produce the first intermediate result (R1-1), which is a list of non-words found in the data. For instance, each set of DT execution modules 90 stores its respective partial result in the scratchpad memory of DST execution unit 1 (which is identified in the DST allocation or may be determined by DST execution unit 1). A processing module of DST execution 1 is engaged to aggregate the first through "zth" partial results to produce the first intermediate result (e.g., R1_1). The processing module stores the first intermediate result as non-DS error encoded data in the scratchpad memory or in another section of memory of DST execution unit 1.

DST execution unit 1 engages its DST client module to slice grouping based DS error encode the first intermediate result (e.g., the list of non-words). To begin the encoding, the DST client module determines whether the list of non-words is of a sufficient size to partition (e.g., greater than a Terabyte). If yes, it partitions the first intermediate result (R1-1) into a plurality of partitions (e.g., R1-1_1 through R1-1_m). If the first intermediate result is not of sufficient size to partition, it is not partitioned.

For each partition of the first intermediate result, or for the first intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 34, the DSTN module is performing task 1_2 (e.g., find unique words) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_2 in accordance with the DST allocation information. From data partition to data partition, the set of DT execution modules may be the same, different, or a combination thereof. For the data partitions, the allocated set of DT execution modules executes task 1_2 to produce a partial results (e.g., $1^{st}$ through "zth") of unique words found in the data partitions.

As indicated in the DST allocation information of FIG. 32, DST execution unit 1 is assigned to process the first through "zth" partial results 102 of task 1_2 to produce the second intermediate result (R1-2), which is a list of unique words found in the data 92. The processing module of DST execution 1 is engaged to aggregate the first through "zth" partial results of unique words to produce the second intermediate result. The processing module stores the second intermediate result as non-DS error encoded data in the scratchpad memory or in another section of memory of DST execution unit 1.

DST execution unit 1 engages its DST client module to slice grouping based DS error encode the second intermediate result (e.g., the list of non-words). To begin the encoding, the DST client module determines whether the list of unique words is of a sufficient size to partition (e.g., greater than a Terabyte). If yes, it partitions the second intermediate result (R1-2) into a plurality of partitions (e.g., R1-2_1 through R1-2_m). If the second intermediate result is not of sufficient size to partition, it is not partitioned.

For each partition of the second intermediate result, or for the second intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 35, the DSTN module is performing task 1_3 (e.g., translate) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_3 in accordance with the DST allocation information (e.g., DT execution modules 1_1, 2_1, 3_1, 4_1, and 5_1 translate data partitions 2_1 through 2_4 and DT execution modules 1_2, 2_2, 3_2, 4_2, and 5_2 translate data partitions 2_5 through 2_z). For the data partitions, the allocated set of DT execution modules 90 executes task 1_3 to produce partial results 102 (e.g., $1^{st}$ through "zth") of translated data.

As indicated in the DST allocation information of FIG. 32, DST execution unit 2 is assigned to process the first through "zth" partial results of task 1_3 to produce the third intermediate result (R1-3), which is translated data. The processing module of DST execution 2 is engaged to aggregate the first through "zth" partial results of translated data to produce the third intermediate result. The processing module stores the third intermediate result as non-DS error encoded data in the scratchpad memory or in another section of memory of DST execution unit 2.

DST execution unit 2 engages its DST client module to slice grouping based DS error encode the third intermediate result (e.g., translated data). To begin the encoding, the DST client module partitions the third intermediate result (R1-3) into a plurality of partitions (e.g., R1-3_1 through R1-3_y). For each partition of the third intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is further shown in FIG. 35, the DSTN module is performing task 1_4 (e.g., retranslate) on the translated data of the third intermediate result. To begin, the DSTN module accesses the translated data (from the scratchpad memory or from the intermediate result memory and decodes it) and partitions it into a plurality of partitions in accordance with the DST allocation information. For each partition of the third intermediate result, the DSTN identifies a set of its DT execution modules 90 to perform task 1_4 in accordance with the DST allocation information (e.g., DT execution modules 1_1, 2_1, 3_1, 4_1, and 5_1 are allocated to translate back partitions R1-3_1 through R1-3_4 and DT execution modules 1_2, 2_2, 6_1, 7_1, and 7_2 are allocated to translate back partitions R1-3_5 through R1-3_z). For the partitions, the allocated set of DT execution modules executes task 1_4 to produce partial results 102 (e.g., $1^{st}$ through "zth") of re-translated data.

As indicated in the DST allocation information of FIG. 32, DST execution unit 3 is assigned to process the first through "zth" partial results of task 1_4 to produce the fourth intermediate result (R1-4), which is retranslated data. The processing module of DST execution 3 is engaged to aggregate the first through "zth" partial results of retranslated data to produce the fourth intermediate result. The processing module stores the fourth intermediate result as non-DS error encoded data in the scratchpad memory or in another section of memory of DST execution unit 3.

DST execution unit 3 engages its DST client module to slice grouping based DS error encode the fourth intermediate result (e.g., retranslated data). To begin the encoding, the DST client module partitions the fourth intermediate result (R1-4) into a plurality of partitions (e.g., R1-4_1 through R1-4_z). For each partition of the fourth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

Figure 36:
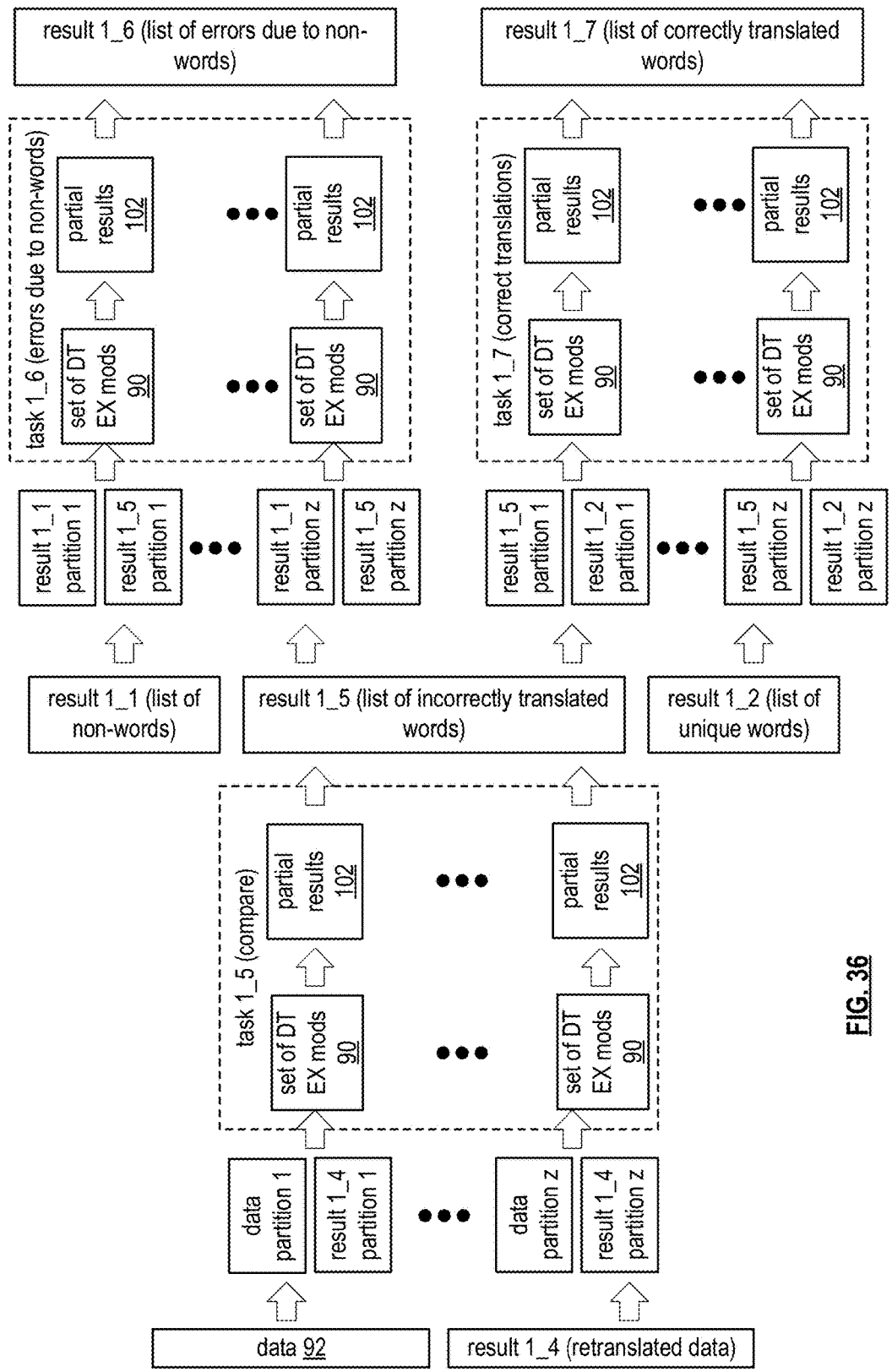

In FIG. 36, a distributed storage and task network (DSTN) module is performing task 1_5 (e.g., compare) on data 92 and retranslated data of FIG. 35. To begin, the DSTN module accesses the data 92 and partitions it into a plurality of partitions in accordance with the DST allocation information or it may use the data partitions of task 1_1 if the partitioning is the same. The DSTN module also accesses the retranslated data from the scratchpad memory, or from the intermediate result memory and decodes it, and partitions it into a plurality of partitions in accordance with the DST allocation information. The number of partitions of the retranslated data corresponds to the number of partitions of the data.

For each pair of partitions (e.g., data partition 1 and retranslated data partition 1), the DSTN identifies a set of its DT execution modules 90 to perform task 1_5 in accordance with the DST allocation information (e.g., DT execution modules 1_1, 2_1, 3_1, 4_1, and 5_1). For each pair of partitions, the allocated set of DT execution modules executes task 1_5 to produce partial results 102 (e.g., $1^{st}$ through "zth") of a list of incorrectly translated words and/or phrases.

As indicated in the DST allocation information of FIG. 32, DST execution unit 1 is assigned to process the first through "zth" partial results of task 1_5 to produce the fifth intermediate result (R1-5), which is the list of incorrectly translated words and/or phrases. In particular, the processing module of DST execution 1 is engaged to aggregate the first through "zth" partial results of the list of incorrectly translated words and/or phrases to produce the fifth intermediate result. The processing module stores the fifth intermediate result as non-DS error encoded data in the scratchpad memory or in another section of memory of DST execution unit 1.

DST execution unit 1 engages its DST client module to slice grouping based DS error encode the fifth intermediate result. To begin the encoding, the DST client module partitions the fifth intermediate result (R1-5) into a plurality of partitions (e.g., R1-5_1 through R1-5_z). For each partition of the fifth intermediate result, the DST client module uses the DS error encoding parameters of the data (e.g., DS parameters of data 2, which includes 3/5 decode threshold/ pillar width ratio) to produce slice groupings. The slice groupings are stored in the intermediate result memory (e.g., allocated memory in the memories of DST execution units 1-5 per the DST allocation information).

As is further shown in FIG. 36, the DSTN module is performing task 1_6 (e.g., translation errors due to non-words) on the list of incorrectly translated words and/or phrases (e.g., the fifth intermediate result R1-5) and the list of non-words (e.g., the first intermediate result R1-1). To begin, the DSTN module accesses the lists and partitions them into a corresponding number of partitions.

For each pair of partitions (e.g., partition R1-1_1 and partition R1-5_1), the DSTN identifies a set of its DT execution modules 90 to perform task 1_6 in accordance with the DST allocation information (e.g., DT execution modules 1_1, 2_1, 3_1, 4_1, and 5_1). For each pair of partitions, the allocated set of DT execution modules executes task 1_6 to produce partial results 102 (e.g., $1^{st}$ through "zth") of a list of incorrectly translated words and/or phrases due to non-words.

As indicated in the DST allocation information of FIG. 32, DST execution unit 2 is assigned to process the first through "zth" partial results of task 1_6 to produce the sixth intermediate result (R1-6), which is the list of incorrectly translated words and/or phrases due to non-words. In particular, the processing module of DST execution 2 is engaged to aggregate the first through "zth" partial results of the list of incorrectly translated words and/or phrases due to non-words to produce the sixth intermediate result. The processing module stores the sixth intermediate result as non-DS error encoded data in the scratchpad memory or in another section of memory of DST execution unit 2.

DST execution unit 2 engages its DST client module to slice grouping based DS error encode the sixth intermediate result. To begin the encoding, the DST client module partitions the sixth intermediate result (R1-6) into a plurality of partitions (e.g., R1-6_1 through R1-6_z). For each partition of the sixth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is still further shown in FIG. 36, the DSTN module is performing task 1_7 (e.g., correctly translated words and/or phrases) on the list of incorrectly translated words and/or phrases (e.g., the fifth intermediate result R1-5) and the list of unique words (e.g., the second intermediate result R1-2). To begin, the DSTN module accesses the lists and partitions them into a corresponding number of partitions.

For each pair of partitions (e.g., partition R1-2_1 and partition R1-5_1), the DSTN identifies a set of its DT execution modules 90 to perform task 1_7 in accordance with the DST allocation information (e.g., DT execution modules 1_2, 2_2, 3_2, 4_2, and 5_2). For each pair of partitions, the allocated set of DT execution modules executes task 1_7 to produce partial results 102 (e.g., $1^{st}$ through "zth") of a list of correctly translated words and/or phrases.

As indicated in the DST allocation information of FIG. 32, DST execution unit 3 is assigned to process the first through "zth" partial results of task 1_7 to produce the seventh intermediate result (R1-7), which is the list of correctly translated words and/or phrases. In particular, the processing module of DST execution 3 is engaged to aggregate the first through "zth" partial results of the list of correctly translated words and/or phrases to produce the seventh intermediate result. The processing module stores the seventh intermediate result as non-DS error encoded data in the scratchpad memory or in another section of memory of DST execution unit 3.

DST execution unit 3 engages its DST client module to slice grouping based DS error encode the seventh intermediate result. To begin the encoding, the DST client module partitions the seventh intermediate result (R1-7) into a plurality of partitions (e.g., R1-7_1 through R1-7_z). For each partition of the seventh intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

In FIG. 37, the distributed storage and task network (DSTN) module is performing task 2 (e.g., find specific words and/or phrases) on the data 92. To begin, the DSTN module accesses the data and partitions it into a plurality of partitions 1-z in accordance with the DST allocation information or it may use the data partitions of task 1_1 if the partitioning is the same. For each data partition, the DSTN identifies a set of its DT execution modules 90 to perform task 2 in accordance with the DST allocation information. From data partition to data partition, the set of DT execution modules may be the same, different, or a combination thereof. For the data partitions, the allocated set of DT execution modules executes task 2 to produce partial results 102 (e.g., $1^{st}$ through "zth") of specific words and/or phrases found in the data partitions.

As indicated in the DST allocation information of FIG. 32, DST execution unit 7 is assigned to process the first through "zth" partial results of task 2 to produce task 2 intermediate result (R2), which is a list of specific words and/or phrases found in the data. The processing module of DST execution 7 is engaged to aggregate the first through "zth" partial results of specific words and/or phrases to produce the task 2 intermediate result. The processing module stores the task 2 intermediate result as non-DS error encoded data in the scratchpad memory or in another section of memory of DST execution unit 7.

DST execution unit 7 engages its DST client module to slice grouping based DS error encode the task 2 intermediate result. To begin the encoding, the DST client module determines whether the list of specific words and/or phrases is of a sufficient size to partition (e.g., greater than a Terabyte). If yes, it partitions the task 2 intermediate result (R2) into a plurality of partitions (e.g., R2_1 through R2_m). If the task 2 intermediate result is not of sufficient size to partition, it is not partitioned.

For each partition of the task 2 intermediate result, or for the task 2 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, and 7).

In FIG. 38, the distributed storage and task network (DSTN) module is performing task 3 (e.g., find specific translated words and/or phrases) on the translated data (R1-3). To begin, the DSTN module accesses the translated data (from the scratchpad memory or from the intermediate result memory and decodes it) and partitions it into a plurality of partitions in accordance with the DST allocation information. For each partition, the DSTN identifies a set of its DT execution modules to perform task 3 in accordance with the DST allocation information. From partition to partition, the set of DT execution modules may be the same, different, or a combination thereof. For the partitions, the allocated set of DT execution modules 90 executes task 3 to produce partial results 102 (e.g., $1^{st}$ through "zth") of specific translated words and/or phrases found in the data partitions.

As indicated in the DST allocation information of FIG. 32, DST execution unit 5 is assigned to process the first through "zth" partial results of task 3 to produce task 3 intermediate result (R3), which is a list of specific translated words and/or phrases found in the translated data. In particular, the processing module of DST execution 5 is engaged to aggregate the first through "zth" partial results of specific translated words and/or phrases to produce the task 3 intermediate result. The processing module stores the task 3 intermediate result as non-DS error encoded data in the scratchpad memory or in another section of memory of DST execution unit 7.

DST execution unit 5 engages its DST client module to slice grouping based DS error encode the task 3 intermediate result. To begin the encoding, the DST client module determines whether the list of specific translated words and/or phrases is of a sufficient size to partition (e.g., greater than a Terabyte). If yes, it partitions the task 3 intermediate result (R3) into a plurality of partitions (e.g., R3_1 through R3_*m*). If the task 3 intermediate result is not of sufficient size to partition, it is not partitioned.

For each partition of the task 3 intermediate result, or for the task 3 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, 5, and 7).

FIG. 39 is a diagram of an example of combining result information into final results 104 for the example of FIG. 30. In this example, the result information includes the list of specific words and/or phrases found in the data (task 2 intermediate result), the list of specific translated words and/or phrases found in the data (task 3 intermediate result), the list of non-words found in the data (task 1 first intermediate result R1-1), the list of unique words found in the data (task 1 second intermediate result R1-2), the list of translation errors due to non-words (task 1 sixth intermediate result R1-6), and the list of correctly translated words and/or phrases (task 1 seventh intermediate result R1-7). The task distribution module provides the result information to the requesting DST client module as the results 104.

Figure 40A:
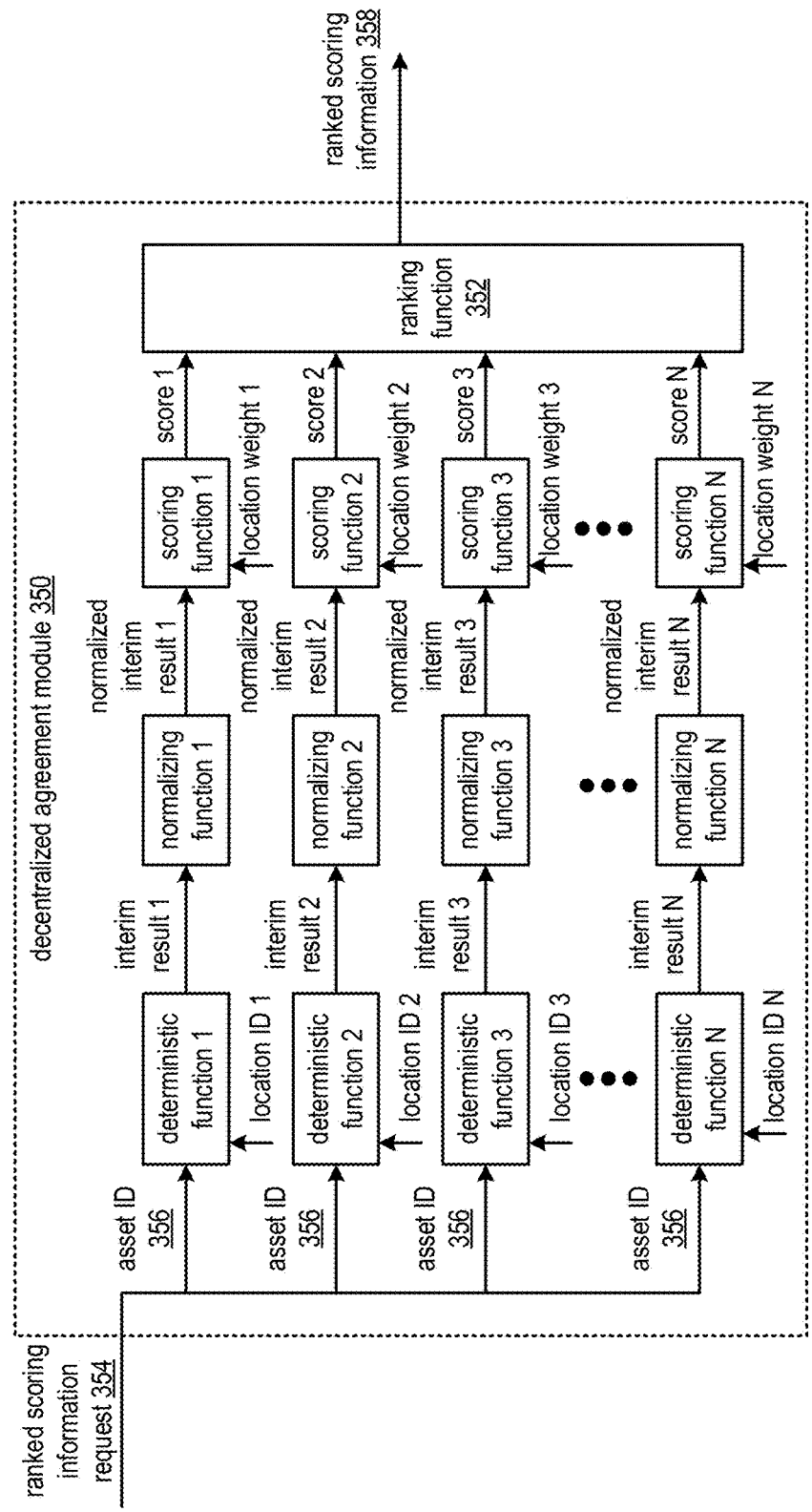
FIG. 40A is a schematic block diagram of an embodiment of a decentralized agreement module in accordance with the present invention.

FIG. 40A is a schematic block diagram of an embodiment of a decentralized agreement module 350 that includes a set of deterministic functions 1-N, a set of normalizing functions 1-N, a set of scoring functions 1-N, and a ranking function 352. Each of the deterministic function, the normalizing function, the scoring function, and the ranking function 352, may be implemented utilizing the processing module 84 of FIG. 3. The decentralized agreement module 350 may be implemented utilizing any module and/or unit of a dispersed storage network (DSN). For example, the decentralized agreement module is implemented utilizing the distributed storage and task (DST) client module 34 of FIG. 1.

The decentralized agreement module 350 functions to receive a ranked scoring information request 354 and to generate ranked scoring information 358 based on the ranked scoring information request 354 and other information. The ranked scoring information request 354 includes one or more of an asset identifier (ID) 356 of an asset associated with the request, an asset type indicator, one or more location identifiers of locations associated with the DSN, one or more corresponding location weights, and a requesting entity ID. The asset includes any portion of data associated with the DSN including one or more asset types including a data object, a data record, an encoded data slice, a data segment, a set of encoded data slices, and a plurality of sets of encoded data slices. As such, the asset ID 356 of the asset includes one or more of a data name, a data record identifier, a source name, a slice name, and a plurality of sets of slice names.

Each location of the DSN includes an aspect of a DSN resource. Examples of locations include one or more of a storage unit, a memory device of the storage unit, a site, a storage pool of storage units, a pillar index associated with each encoded data slice of a set of encoded data slices generated by an information dispersal algorithm (IDA), a DST client module 34 of FIG. 1, a DST processing unit 16 of FIG. 1, a DST integrity processing unit 20 of FIG. 1, a DSTN managing unit 18 of FIG. 1, a user device 12 of FIG. 1, and a user device 14 of FIG. 1.

Each location is associated with a location weight based on one or more of a resource prioritization of utilization scheme and physical configuration of the DSN. The location weight includes an arbitrary bias which adjusts a proportion of selections to an associated location such that a probability that an asset will be mapped to that location is equal to the location weight divided by a sum of all location weights for all locations of comparison. For example, each storage pool of a plurality of storage pools is associated with a location weight based on storage capacity. For instance, storage pools with more storage capacity are associated with higher location weights than others. The other information may include a set of location identifiers and a set of location weights associated with the set of location identifiers. For example, the other information includes location identifiers and location weights associated with a set of memory devices of a storage unit when the requesting entity utilizes the decentralized agreement module 350 to produce ranked scoring information 358 with regards to selection of a memory device of the set of memory devices for accessing a particular encoded data slice (e.g., where the asset ID includes a slice name of the particular encoded data slice).

The decentralized agreement module 350 outputs substantially identical ranked scoring information for each ranked scoring information request that includes substantially identical content of the ranked scoring information request. For example, a first requesting entity issues a first ranked scoring information request to the decentralized agreement module 350 and receives first ranked scoring information. A second requesting entity issues a second ranked scoring information request to the decentralized agreement module and receives second ranked scoring information. The second ranked scoring information is substantially the same as the first ranked scoring information when the second ranked scoring information request is substantially the same as the first ranked scoring information request.

As such, two or more requesting entities may utilize the decentralized agreement module 350 to determine substantially identical ranked scoring information. As a specific example, the first requesting entity selects a first storage pool of a plurality of storage pools for storing a set of encoded data slices utilizing the decentralized agreement module 350 and the second requesting entity identifies the first storage pool of the plurality of storage pools for retrieving the set of encoded data slices utilizing the decentralized agreement module 350.

In an example of operation, the decentralized agreement module 350 receives the ranked scoring information request 354. Each deterministic function performs a deterministic function on a combination and/or concatenation (e.g., add, append, interleave) of the asset ID 356 of the ranked scoring information request 354 and an associated location ID of the set of location IDs to produce an interim result. The deterministic function includes at least one of a hashing function, a hash-based message authentication code function, a mask generating function, a cyclic redundancy code function, hashing module of a number of locations, consistent hashing, rendezvous hashing, and a sponge function. As a specific example, deterministic function 2 appends a location ID 2 of a storage pool 2 to a source name as the asset ID to produce a combined value and performs the mask generating function on the combined value to produce interim result 2.

With a set of interim results 1-N, each normalizing function performs a normalizing function on a corresponding interim result to produce a corresponding normalized interim result. The performing of the normalizing function includes dividing the interim result by a number of possible permutations of the output of the deterministic function to produce the normalized interim result. For example, normalizing function 2 performs the normalizing function on the interim result 2 to produce a normalized interim result 2.

With a set of normalized interim results 1-N, each scoring function performs a scoring function on a corresponding normalized interim result to produce a corresponding score. The performing of the scoring function includes dividing an associated location weight by a negative log of the normalized interim result. For example, scoring function 2 divides location weight 2 of the storage pool 2 (e.g., associated with location ID 2) by a negative log of the normalized interim result 2 to produce a score 2.

With a set of scores 1-N, the ranking function 352 performs a ranking function on the set of scores 1-N to generate the ranked scoring information 358. The ranking function includes rank ordering each score with other scores of the set of scores 1-N, where a highest score is ranked first. As such, a location associated with the highest score may be considered a highest priority location for resource utilization (e.g., accessing, storing, retrieving, etc., the given asset of the request). Having generated the ranked scoring information 358, the decentralized agreement module 350 outputs the ranked scoring information 358 to the requesting entity.

Figure 40B:
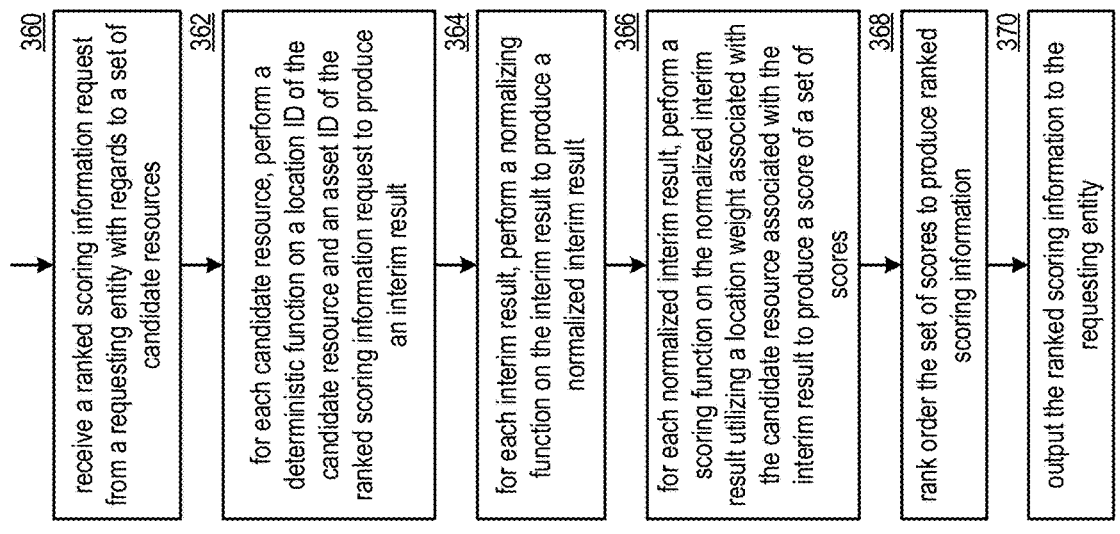
FIG. 40B is a flowchart illustrating an example of selecting a resource in accordance with the present invention.

FIG. 40B is a flowchart illustrating an example of selecting a resource. The method begins or continues at step 360 where a processing module (e.g., of a decentralized agreement module) receives a ranked scoring information request from a requesting entity with regards to a set of candidate resources. For each candidate resource, the method continues at step 362 where the processing module performs a deterministic function on a location identifier (ID) of the candidate resource and an asset ID of the ranked scoring information request to produce an interim result. As a specific example, the processing module combines the asset ID and the location ID of the candidate resource to produce a combined value and performs a hashing function on the combined value to produce the interim result.

For each interim result, the method continues at step 364 where the processing module performs a normalizing function on the interim result to produce a normalized interim result. As a specific example, the processing module obtains a permutation value associated with the deterministic function (e.g., maximum number of permutations of output of the deterministic function) and divides the interim result by the permutation value to produce the normalized interim result (e.g., with a value between 0 and 1).

For each normalized interim result, the method continues at step 366 where the processing module performs a scoring function on the normalized interim result utilizing a location weight associated with the candidate resource associated with the interim result to produce a score of a set of scores. As a specific example, the processing module divides the location weight by a negative log of the normalized interim result to produce the score.

The method continues at step 368 where the processing module rank orders the set of scores to produce ranked scoring information (e.g., ranking a highest value first). The method continues at step 370 where the processing module outputs the ranked scoring information to the requesting entity. The requesting entity may utilize the ranked scoring information to select one location of a plurality of locations.

Figure 41A:
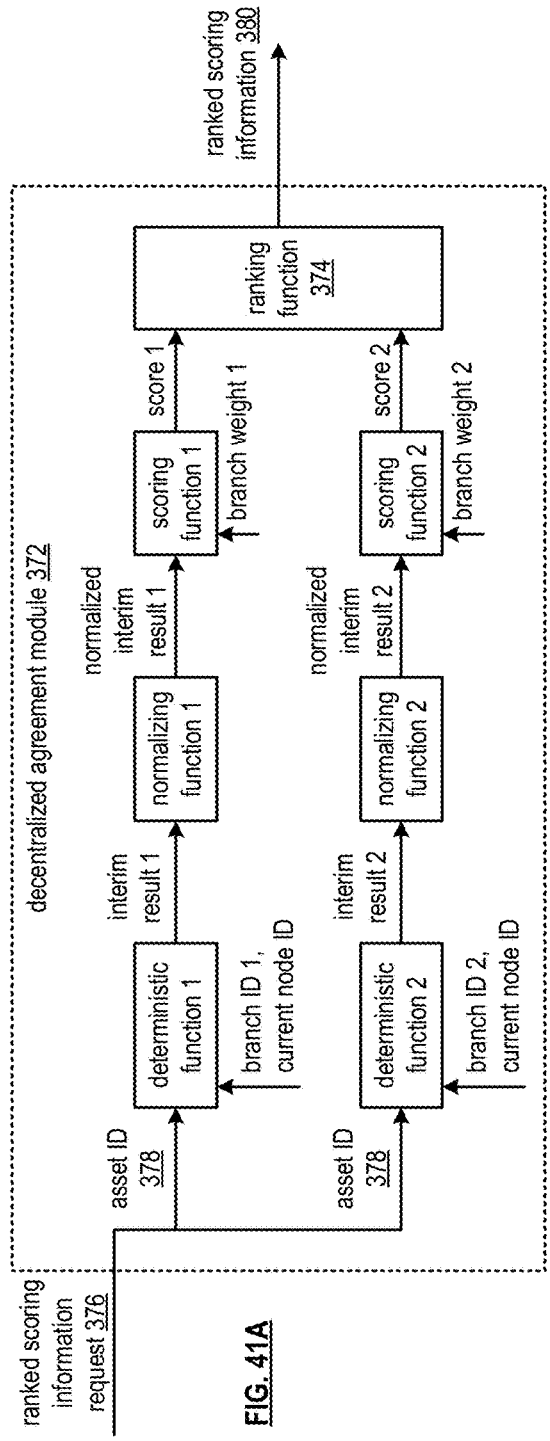
FIG. 41A is a schematic block diagram of another embodiment of a decentralized agreement module in accordance with the present invention.

FIG. 41A is a schematic block diagram of another embodiment of a decentralized agreement module 372 that includes a first and second deterministic function of FIG. 40A, a first and second normalizing function of FIG. 40A, a first and second scoring function of FIG. 40A, and a ranking function 374. The ranking function 374 may be implemented utilizing the ranking function 352 of FIG. 40A.

In an example of operation, each deterministic function functions to combined and/or concatenate a branch identifier (ID), an asset ID 378 of a ranked scoring information request 376, and a current node ID to produce a combined value and to perform the deterministic function of FIG. 40A on the combined value to produce an interim result. Each normalizing function performs the normalizing function of FIG. 40A on each interim result to produce normalized interim results.

Each scoring function performs a scoring function on an associated normalized interim result using an associated branch weight to produce a corresponding score. The scoring function includes dividing the branch weight by a negative log of the normalized interim result to produce the score.

The ranking function 374 performs the ranking function of FIG. 40A on the scores to produce ranked scoring information 380. The ranked scoring information 380 indicates a highest score ranked first where a first ranked location may be considered a highest priority branch to continue an analysis until reaching a lowest level of nodes of a location tree structure that are associated with a location of a high score for accessing a DSN resource utilizing the given asset of the ranked scoring information request. The location tree structure is discussed in greater detail with reference to FIG. 41B.

Figure 41B:
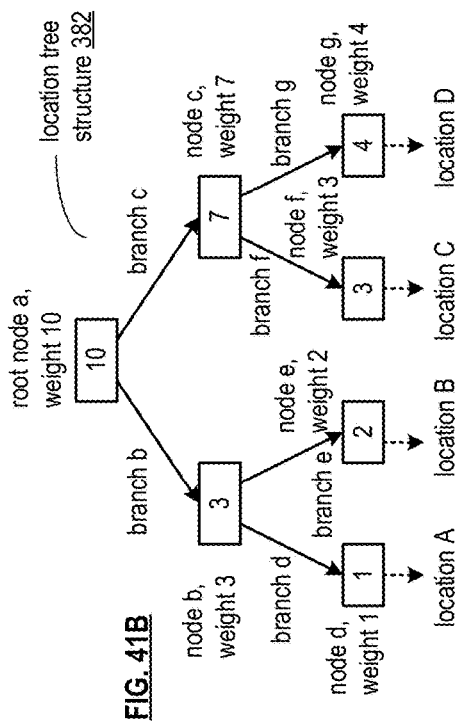
FIG. 41B is a diagram of an embodiment of a location tree structure in accordance with the present invention.

FIG. 41B is a diagram of an embodiment of a location tree structure 382 utilized to represent locations and associated location weights of a dispersed storage network (DSN). The location tree structure 382 includes a root node connected by one or more branches to next level nodes which may be connected by one or more further branches to one or more further nodes etc., until a lowest level of nodes. Nodes of the lowest level are associated with unique locations of a dispersed storage network (DSN) (e.g., a set of storage units, a set of memory devices, a set of storage pools, a set of sites, a set of processing units, etc.). A sum of location weights of each of the lowest level nodes produces a total location weight of the location tree structure, represented within the root node. In an example, the location tree structure 382 includes a root node a with branch b to node b and branch c to node c. Node b represents location weight 3 of lowest level nodes d and e via branches d and e respectively. Node d is associated with location A and node e is associated with location B. Node c represents location weight 7 of lowest level nodes f and g via branches f and g respectively. Node f is associated with location C and node g is associated with location D.

The location tree structure 382 may be utilized in combination with the decentralized agreement module 372 of FIG. 41A in a recursive manner to traverse down the location tree structure 382 to identify a location associated with a highest score. In an example of operation, the decentralized agreement module receives a ranked scoring information request from a requesting entity, where the request includes an asset ID. Having received the asset ID, the decentralized agreement module obtains the location tree structure 382 associated with the ranked scoring information request. The obtaining includes at least one of performing a lookup, receiving, and identifying based on the asset ID. For example, when receiving the ranked scoring information request that includes an asset ID associated with storage pool selection, the decentralized agreement module identifies a corresponding location tree structure associated with storage pool selection as the location tree structure 382.

Having obtained the location tree structure 382, the decentralized agreement module performs steps of a method, where an initial step includes entering a loop, where for two or more branches at each level of the location tree descending from the root node from a current node associated with each loop, performs the deterministic function on an associated branch ID, the asset ID, and a current node ID of the current node to produce a corresponding interim result. For example, the decentralized agreement module performs deterministic functions for branches b and c to produce interim results 1 and 2 when the current node is the root node a.

For each interim result, the decentralized agreement module performs the normalizing function on the interim results to produce normalized interim results. For each normalized interim result, the decentralized agreement module performs the scoring function on the normalized interim result utilizing a branch weight associated with the normalized interim result to produce a score of a set of scores. The branch weight includes a sum of all location weights of all nodes extending from an associated branch. For example, the decentralized agreement module divides a branch weight of 3 of branch b by a negative log of the normalized interim result for branch b to produce score 1 and divides a branch weight of 7 by a negative log of the normalized interim result for branch c to produce score 2.

Having produced the scores, for each normalized interim result, the decentralized agreement module performs the ranking function to rank order the set of scores by associated location a deed to produce ranked scoring information to identify a next branch or location associated with a high score. The decentralized agreement module continues the loop when identifying a next branch. The decentralized agreement module exits the loop when identifying the location and outputs the ranked scoring information to the requesting entity (e.g., identifying a location associated with a highest score).

Figure 41C:
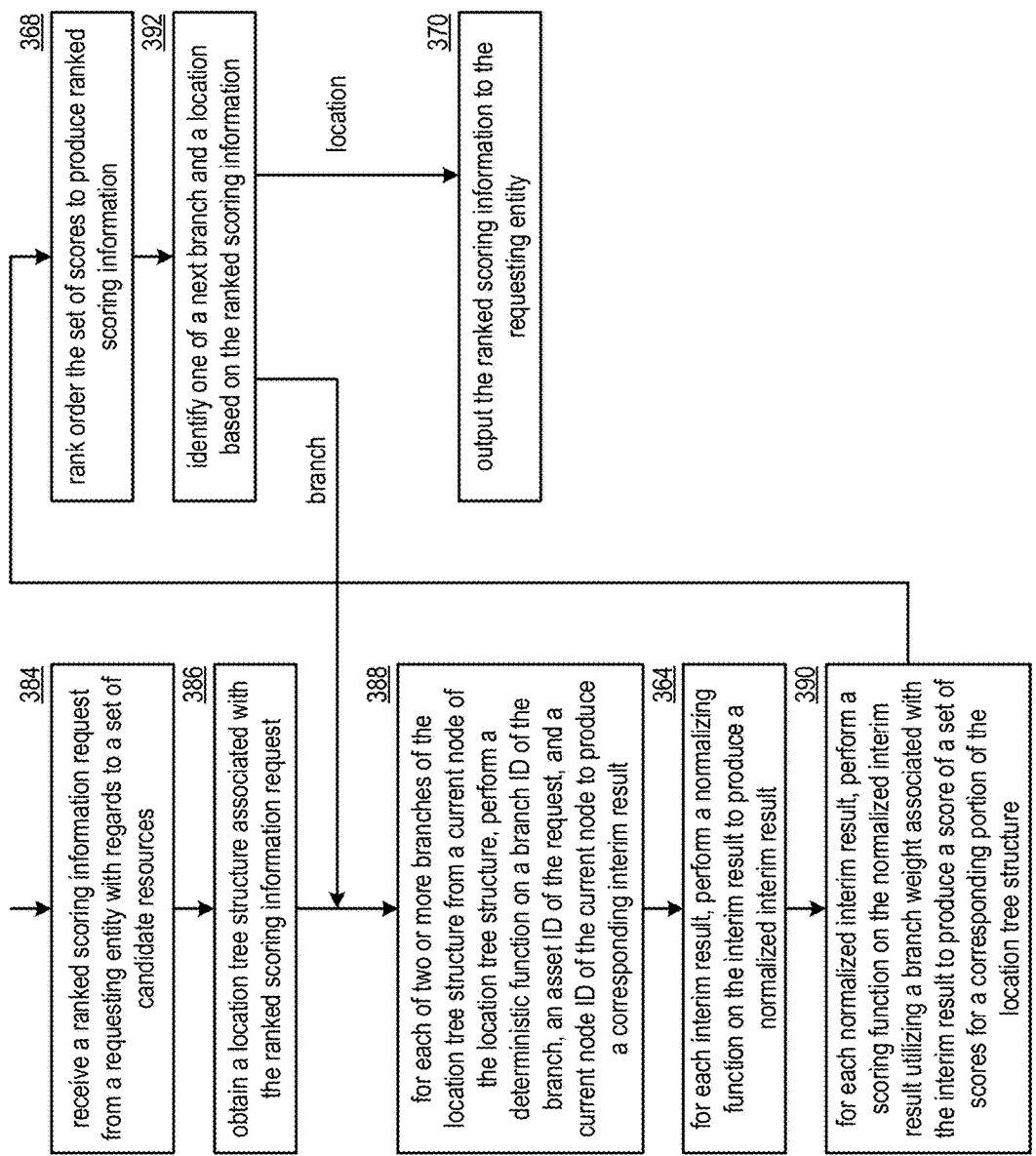
FIG. 41C is a flowchart illustrating another example of selecting a resource in accordance with the present invention.

FIG. 41C is a flowchart illustrating another example of selecting a resource, which include similar steps to FIG. 40B. The method begins or continues at step 384 where a processing module (e.g., of a distributed storage and task (DST) client module) receives a ranked scoring information request from a requesting entity with regards to a set of candidate resources. The ranked scoring information request includes an asset ID and may further include identity of a location tree structure associated with the asset ID.

The method continues at step 386 where the processing module obtains a location tree structure associated with the ranked scoring information request. The obtaining includes at least one of retrieving, issuing a query, and receiving a query response. For example, the processing module accesses a dispersed hierarchical index stored within a dispersed storage network (DSN) based on an asset type of the asset ID to identify and recover the location tree structure from DSN memory.

For each of two or more branches of the location tree structure from a current node of the location tree structure, the method continues at step 388 where the processing module performs a deterministic function on a branch ID of the branch, the asset ID of the request, and a current node ID of the current node to produce a corresponding interim result. For example, the processing module combines the branch ID, the asset ID, and the current node ID to produce a combined value and performs a sponge function on the combined value to produce the interim result. For each interim result, the method continues with step 364 of FIG. 40B where the processing module performs a normalizing function on the interim result to produce a normalized interim result.

For each normalized interim result, the method continues at step 390 where the processing module performs a scoring function on the normalized interim result utilizing a branch weight associated with the interim result to produce a score of a set of scores for a corresponding portion of the location tree structure. For example, the processing module divides a corresponding branch weight by a negative log of the normalized interim result to produce the score. The method continues with step 368 of FIG. 40B where the processing module rank orders the set of scores to produce ranked scoring information.

The method continues at step 392 where the processing module identifies one of a next branch and a location based on the ranked scoring information. For example, the processing module identifies a highest score and an associated branch or location. As another example, the processing module identifies scores that compare favorably to a score threshold level (e.g., scores greater than the score threshold level). The method loops back to step 388 when identifying the next branch. The method continues to step 370 of FIG. 40B when identifying the location. The method continues with step 370 of FIG. 40B where the processing module outputs the ranked scoring information to the requesting entity when identifying the location.

Figure 42A:
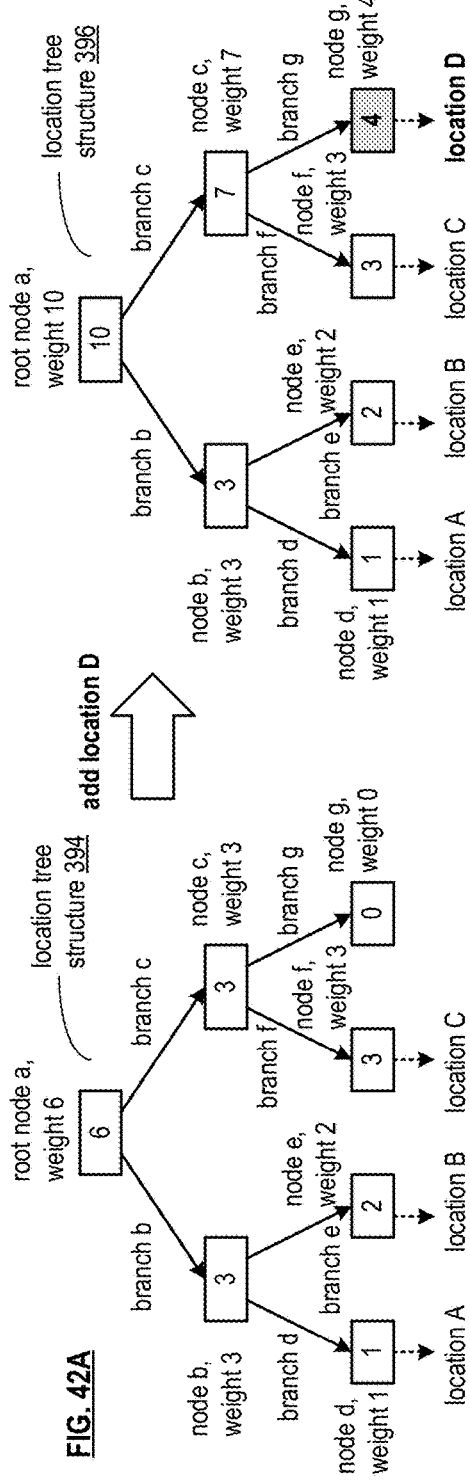
FIG. 42A is a diagram of another embodiment of a location tree structure illustrating an example of modifying a resource pool in accordance with the present invention.

FIG. 42A is a diagram of another embodiment of a location tree structure 394 illustrating an example of modifying a resource pool. In particular, FIG. 42A illustrates an example of adding a new location D utilizing a modifying approach that includes reserving a node. Prior to the modifying, the location tree structure 394 includes lowest level nodes d-f that are associated with locations A, B, and C of a dispersed storage network (DSN) and a reserved node g that is not associated with a location and is associated with a zero location weight.

When modifying the resource pool to include the new location D, the reserved node of the location tree structure is associated with the location D and a location weight of 4 is associated with the node g. Having associated the location weight of 4, parent nodes are updated to include the additional location weight. For example, a prior location weight of node c is updated from 3 to 7 to include the additional location weight of 4 and root node 1 is updated from 6 to 10 to include the additional location weight of updated node c.

When updating the total location weight of an updated location tree structure 396, a proportionate number of associated assets of the locations may be migrated from locations A-C to location D. A maximum stability property is maintained by not moving assets between locations A-C. For example, 4 of every 10 assets are migrated from each of the locations A-C to the location D. For instance, a decentralized agreement function may be utilized to identify the assets for migration utilizing identifiers of the assets, previous location weights, and the updated location weights.

Figure 42B:
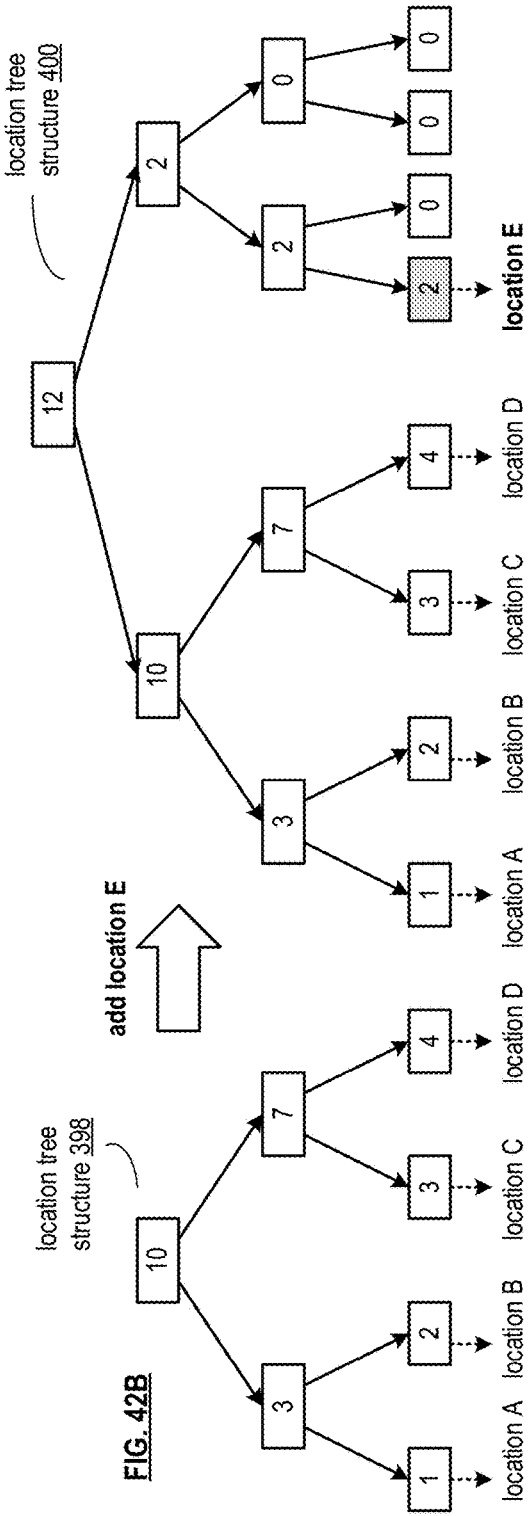
FIG. 42B is a diagram of another embodiment of a location tree structure illustrating another example of modifying a resource pool in accordance with the present invention.

FIG. 42B is a diagram of another embodiment of a location tree structure 398 illustrating another example of modifying a resource pool. In particular, FIG. 42B illustrates an example of adding a new location E utilizing another modifying approach that includes adding branches and further reserved nodes. When updating, a new root node is generated, and one or more new node levels and associated branches are generated to traverse from the new root node to a new node associated with the new location E. The new root node becomes a parent node to the previous root node. Additional reserved nodes may be added to support subsequent expansion.

When updating, a location weight of the new location is added to a previous total location weight of the location tree structure prior to updating to produce a new total location weight of an updated location tree structure. For example, a new total location weight of 12 results when adding the new location E with a location weight of 2 to the previous total location weight of 10.

When updating the total location weight of the location tree structure 398 to produce an updated location tree structure 400, a proportionate number of associated assets of the locations may be migrated from locations A-D to location E. A maximum stability property is maintained by not moving assets between locations A-D. For example, 2 of every 12 assets are migrated from each of the locations A-D to the location E. For instance, a decentralized agreement function may be utilized to identify the assets for migration utilizing identifiers of the assets, previous location weights, and the updated location weights.

Figure 42C:
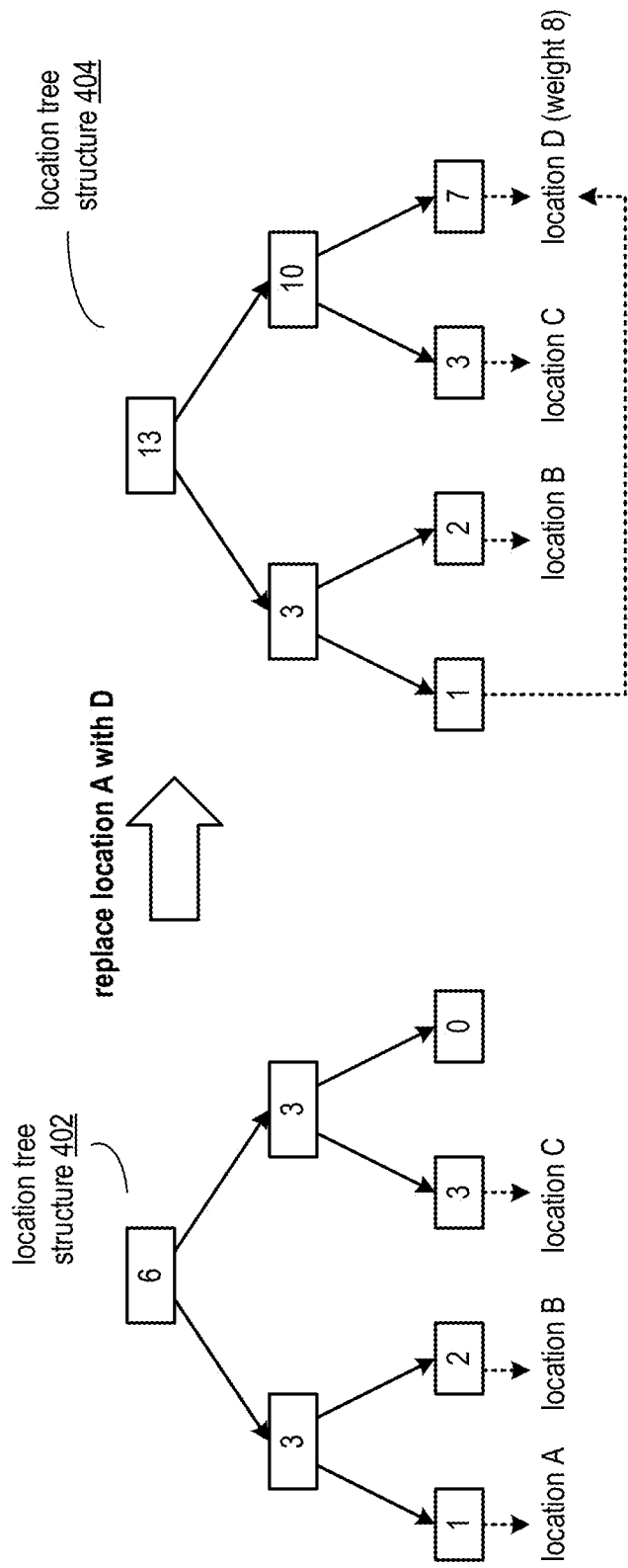
FIG. 42C is a diagram of another embodiment of a location tree structure illustrating another example of modifying a resource pool in accordance with the present invention.

FIG. 42C is a diagram of another embodiment of a location tree structure 402 illustrating another example of modifying a resource pool. In particular, FIG. 42C illustrates an example of replacing location A with a new location D utilizing yet another modifying approach that includes utilizing a reserved node and mapping a previous node to the utilized reserve note. When updating, the reserve node is selected and associated with the new location D with a location weight of 8.

Location weight associated with the reserved node is updated to include the location weight of the new location minus the location weight of the node being replaced. For example, the reserved node associated with location D is updated from 0 to 7 when the location weight of location D is 8 and the location weight of location A was 1. The node previously associated with location A is now associated with the new location D. The total location weight of a resulting updated location tree structure 404 is updated to include the location weight of the location minus the location weight of the location being replaced. For instance, the total location weight is updated from 6 to 13.

All assets associated with location A are migrated to location D. a proportionate number of other assets associated with locations B and C are migrated to location D. For example, 7 of 13 assets associated with locations B and C are migrated to location D.

Figure 42D:
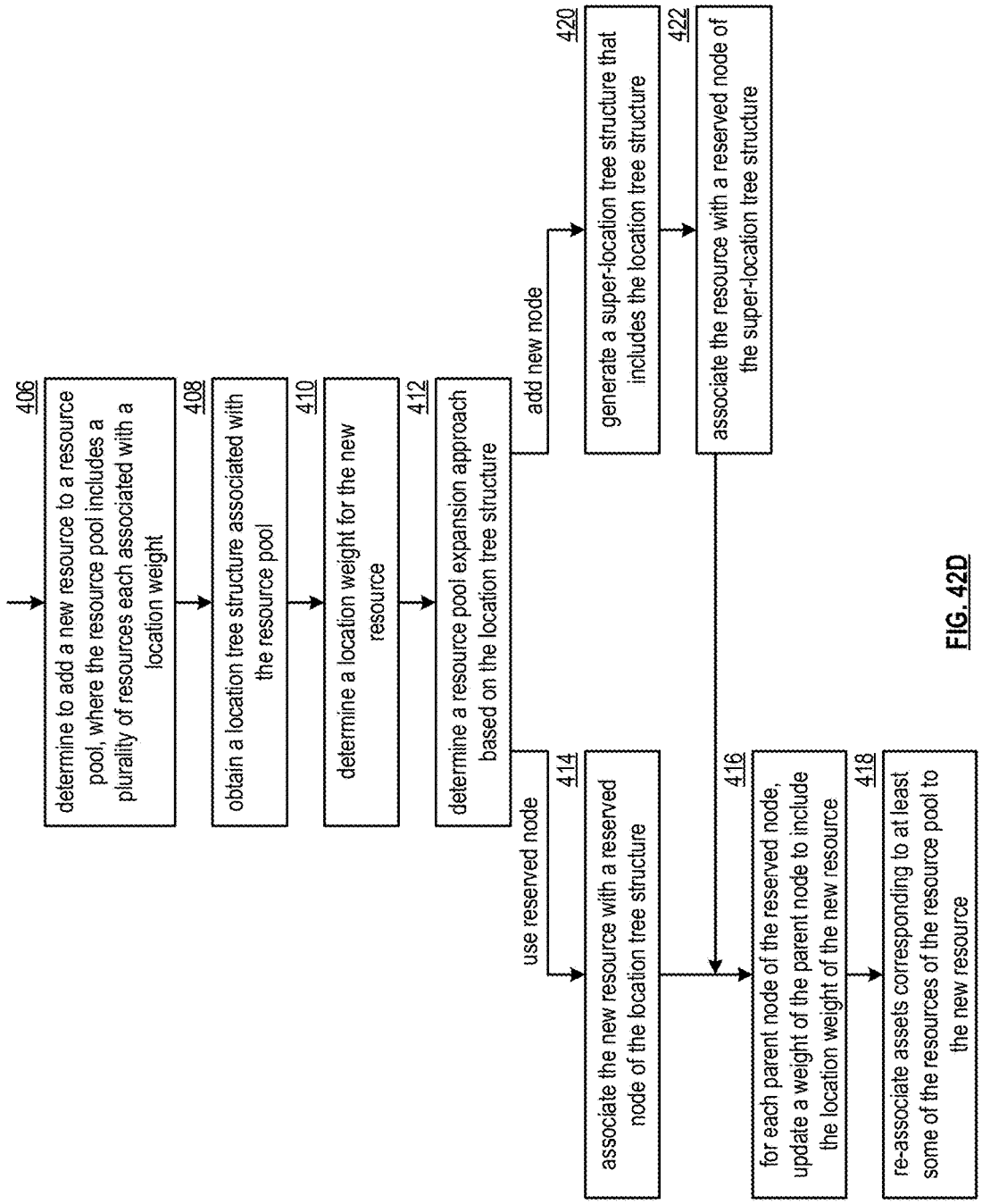
FIG. 42D is a flowchart illustrating an example of modifying a resource pool in accordance of the present invention.

FIG. 42D is a flowchart illustrating an example of modifying a resource pool. The method begins or continues at step 406 where a processing module (e.g., of a distributed storage and task (DST) client module) determines to add a new resource to a resource pool, where the resource pool includes a plurality of resources each associated with a location weight. The determining may be based on one or more of a resource utilization level, a resource schedule, a request, and a predetermination.

The method continues at step 408 where the processing module obtains a location tree structure associated with a resource pool. For example, the processing module accesses a dispersed storage network (DSN) memory to recover the location tree structure based on identity of the resource pool. The method continues at step 410 where the processing module determines a location weight for the new resource. The determining may be based on one or more of capabilities of the resource, capabilities of resources of the resource pool, location weights of each of the resources of the resource pool, a request, and a predetermination.

The method continues at step 412 where the processing module determines a resource pool expansion approach based on the location tree structure. For example, the processing module indicates to utilize an existing node of the location tree structure when a reserved node is available. As another example, the processing module indicates to add a new node when the reserve node is not available. The method branches to step 420 when the approach includes adding a new node. The method continues to step 414 when the approach includes using the reserved node.

The method continues at step 414 where the processing module associates the new resource with a reserve node of the location tree structure when using the reserve node. For example, the processing module selects the reserve node, updates the node to point to the new resource, and updates the node from a zero location weight to the location weight for the new resource.

For each parent node of the reserved node, the method continues at step 416 where the processing module updates a weight of the parent node to include the location weight of the new resource. Alternatively, or in addition to, the processing module may associate the new resource with a node associated with a resource being replaced. The updating includes adding the weight of the parent node to the location weight of the new resource to produce an updated weight of the parent node.

The method continues at step 418 where the processing module re-associates assets (e.g., resource objects) corresponding to at least some of the resources of the resource pool to the new resource. For example, the processing module migrates a proportionate number of the assets from the resources to the new resource. When replacing a resource, the processing module migrates assets of the resource being replaced to the new resource.

When the resource pool expansion approach includes the adding the new node, the method continues at step 420 where the processing module generates a super-location tree structure that includes the location tree structure. For example, the processing module generates one or more reserve nodes, generates one or more parent nodes, generates a new root node to include connectivity to a root node of the location tree structure and to at least one newly generated parent node. The method continues at step 422 where the processing module associates the resource with a reserved node of the super-location tree structure. For example, the processing module selects the reserve node, updates the selected reserve node to point to the new resource, and updates the node from a zero weight to the location weight for the new resource. The method branches to step 416.

FIGS. 43A through 43D are a schematic block diagram of an embodiment of a dispersed storage network (DSN) that includes the distributed storage and task (DST) processing unit 16 of FIG. 1, the network 24 of FIG. 1, and the distributed storage and task network (DSTN) module 22 of FIG. 1. The DST processing unit 16 includes a decentralized agreement module 430 and the DST client module 34 of FIG. 1. The decentralized agreement module 430 may be implemented utilizing the decentralized agreement module 350 of FIG. 40A. The DSTN module 22 includes a plurality of DST execution (EX) unit pools 1-P. Each DST execution unit pool includes a plurality of N DST execution units. Each DST execution unit includes a plurality of memories 1-M. Each DST execution unit may be implemented utilizing the DST execution unit 36 of FIG. 1. Each DST execution unit may be implemented at one site of S sites per storage pool. Each DST execution unit may be associated with at least one pillar of N pillars associated with an information dispersal algorithm (IDA). Each site may not include every pillar and a given pillar may be implemented at more than one site. Hereafter, a DST execution unit may be interchangeably referred to as a storage unit, a set of DST execution units may be interchangeably referred to as a set of storage units, and the DSTN module 22 may be interchangeably referred to as a DSN memory.

The DSN functions to access the DSN memory. The accessing may include one or more of receiving data access requests 432, selecting resources of at least one DST execution unit pool for data access, utilizing the selected DST execution unit pool for the data access, and issuing a data access response based on the data access. The selecting of the resources includes utilizing a decentralized agreement function of the decentralized agreement module 430, where a plurality of locations are ranked against each other for each of one or more resource levels. The selecting may include selecting one storage pool of the plurality of storage pools, selecting DST execution units at various sites of the plurality of sites, selecting a memory of the plurality of memories for each DST execution unit, and selecting combinations of memories, DST execution units, sites, pillars, and storage pools.

Figure 43A:
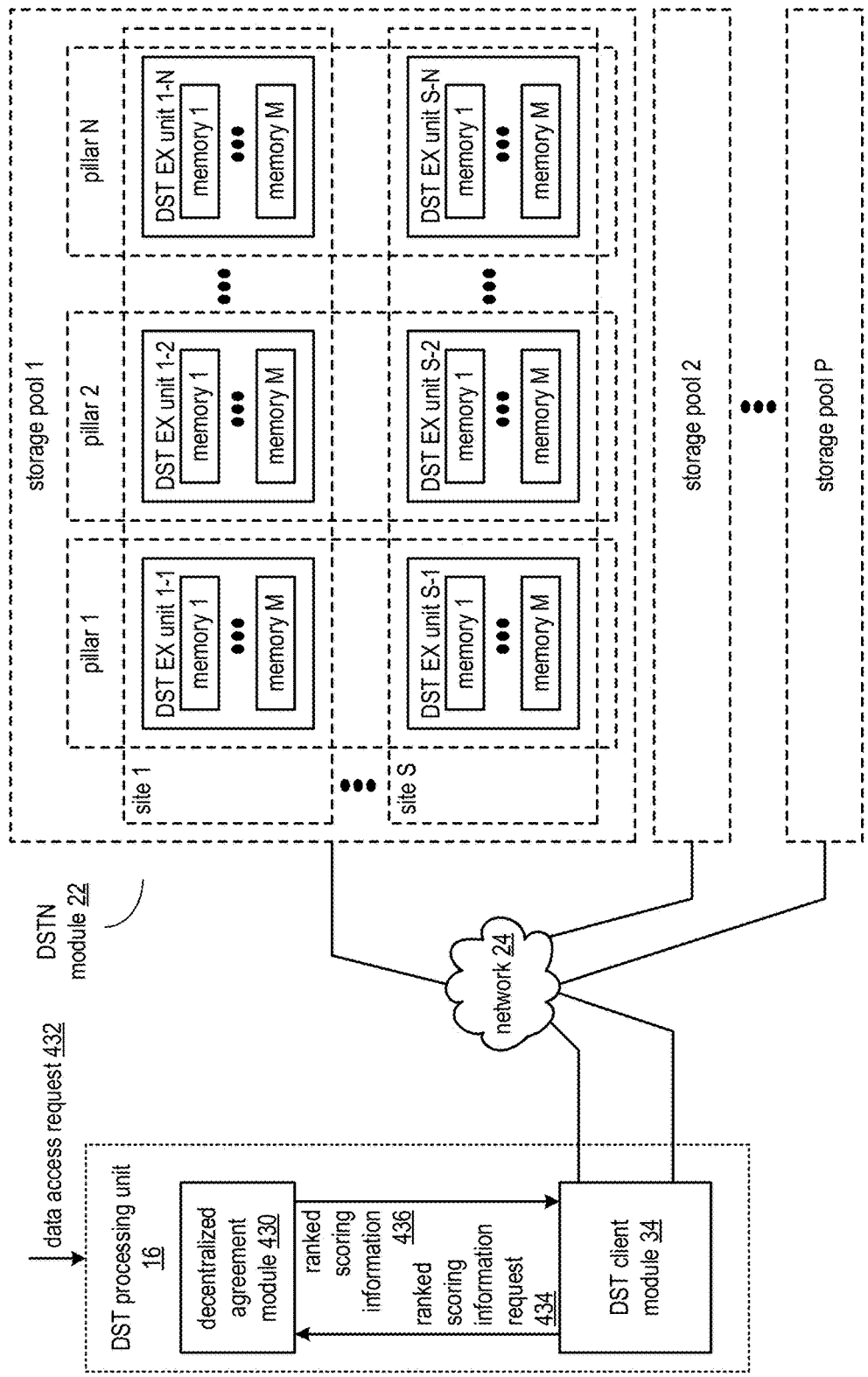
FIGS. 43A and 43D are a schematic block diagram of an embodiment of a dispersed storage network (DSN) in accordance with the present invention.

FIG. 43A illustrates steps of an example of operation of the accessing where the DST processing unit 16 receives a DSN access request regarding at least one data segment of a data object. For example, the DST client module 34 receives the data access request 432 from a requesting entity, where the data access request 432 includes at least one of a store data request, a retrieve data request, a delete data request, a data name, and a requesting entity identifier (ID).

Having received the data access request 432, the DST client module 34 determines a DSN address associated with the data access request 432. The DSN address includes at least one of a source name (e.g., including a vault identifier and an object number associated with a data name of the data object), a data segment identifier (ID) of the at least one data segment, a set of slice names associated with the at least one data segment, and a plurality of sets of slice names associated with a plurality of sets of encoded data slices associated with storage of the data object. The determining includes at least one of generating (e.g., for the store data request) and retrieving (e.g., from a DSN directory) based on the data name (e.g., for the retrieve data request). For example, the DST client module 34 utilizes the data name to perform a lookup in the DSN directory to identify an associated source name as the DSN address.

Having determined the DSN address, the DST client module 34 performs a scoring function using one or more properties of the DSN access request (e.g., an associated address) and one or more properties of DSN memory of the DSN (e.g., identifiers of entities of a resource level, weighting factor of the entities) to produce a storage scoring resultant, where the DSN memory includes the plurality of storage units that are logically arranged into the plurality of storage pools.

As a specific example of the performing the scoring function, the DST client module 34 selects the resource level (e.g., storage pool level, storage unit level, memory device level, default may include the storage pool level, etc.), selects the one or more properties of the DSN memory from a plurality of properties of the DSN memory based on the selected resource level, calculates, based on the selected resource level, a plurality of storage values based on the one or more properties of the DSN access request and the one or more properties of DSN memory, and performs a ranking function of the plurality of storage values to produce the storage scoring resultant. For instance, the DST client module 34 selects the storage pool level, selects identifiers and weighting factors of the storage pools 1-P (e.g., interprets system registry information), issues a ranked scoring information request 434 to the decentralized agreement module 430, where the ranked scoring information request 434 includes the DSN address, and the identifiers and weighting factors of the storage pools 1-P, and receives, from the decentralized agreement module 430, ranked scoring information 436 that includes the plurality of storage values in a ranked ordered fashion to produce the storage scoring resultant.

Having produced the storage scoring resultant, the DST client module 34 utilizes the storage scoring resultant to identify a set of storage units of the plurality of storage units affiliated with a given storage pool of the plurality of storage pools. For example, the DST client module 34 interprets the ranked scoring information 436 to identify a highest storage value of the plurality of storage values, where the high storage value is associated with at least one set of storage units of the storage pool 1. The method to produce the storage scoring resultant is discussed in greater detail with reference to FIGS. 43B-C.

Figure 43B:
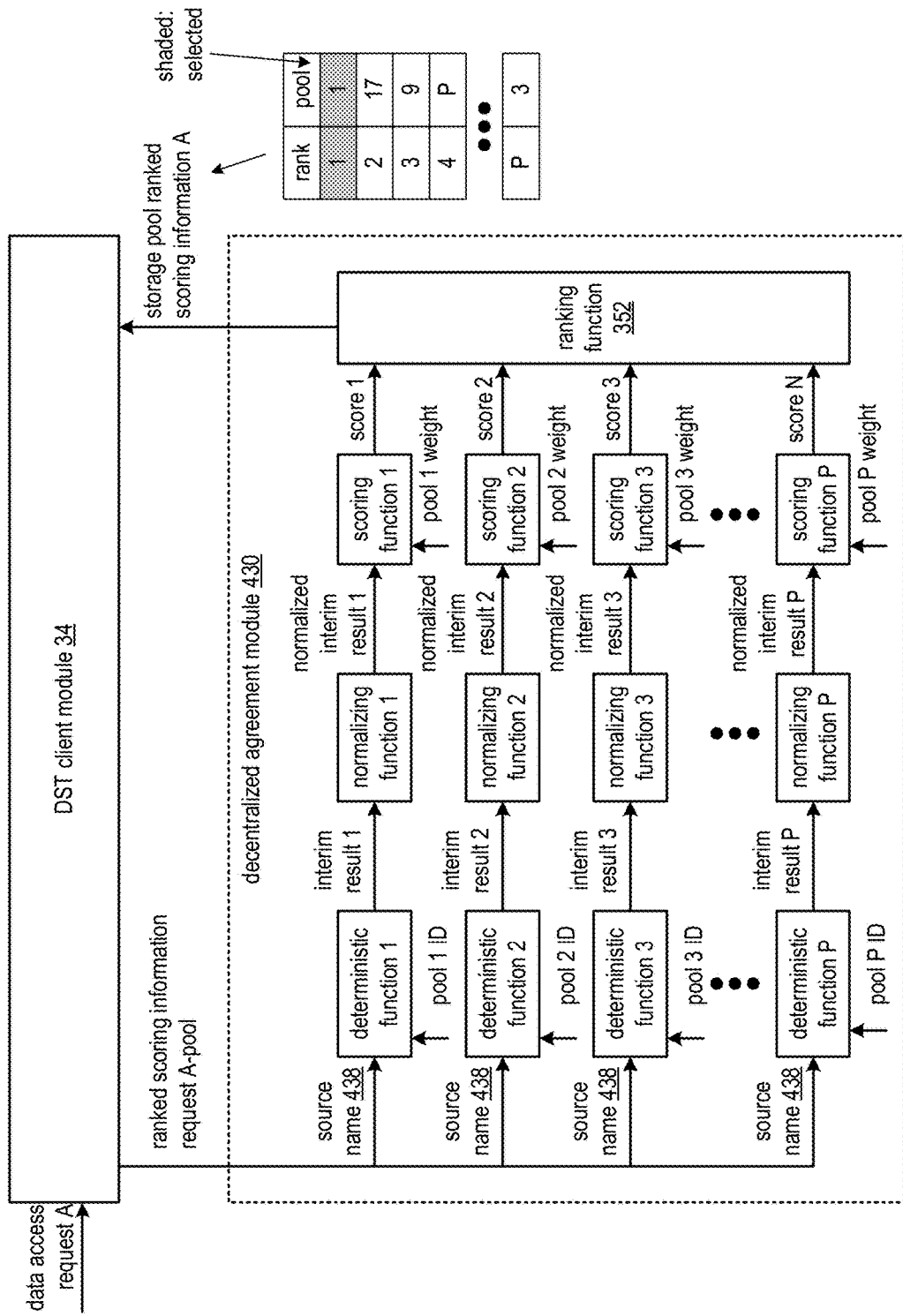
FIGS. 43B and 43C are a schematic block diagram of another embodiment of a distributed storage and task (DST) processing unit in accordance with the present invention.

FIG. 43B is a schematic block diagram of an embodiment of the distributed storage and task (DST) processing unit 16 of FIG. 43A that includes the DST client module 34 of FIG. 43A and the decentralized agreement module 430 of FIG. 43A. The decentralized agreement module 430 of FIG. 43B includes a plurality of deterministic functions 1-P, a plurality of normalizing functions 1-P, a plurality scoring functions 1-P, and the ranking function 352 of FIG. 40A. Each deterministic function may be implemented utilizing the deterministic function of the decentralized agreement module 350 of FIG. 40A. Each normalizing function may be implemented utilizing the normalizing function of the decentralized agreement module 350 of FIG. 40A. Each scoring function may be implemented utilizing the scoring function of the decentralized agreement module 350 of FIG. 40A.

FIG. 43B illustrates further steps of the example of operation of the accessing where the DST client module 34 receives a data access request A and selects a storage pool level indication as the resource level. Having selected the storage pool level, the DST client module 34 selects a storage pool identifier and a storage pool weighting factor for each of the plurality of storage pools 1-P to produce a plurality of storage pool identifiers and a plurality of storage pool weighting factors, where the one or more properties of DSN memory includes the plurality of storage pool identifiers and the plurality of storage pool weighting factors. For instance, the DST client module 34 accesses the system registry information to extract the storage pool identifiers and storage pool weighting factors.

Having produced the storage pool identifiers and storage pool weighting factors, the DST client module 34 selects a source name 438 of the DSN access request A as the one or more properties of the DSN access request. Having selected the source name 438, the DST client module 34 issues a ranked scoring information request A for the storage pool level to the decentralized agreement module 430, where the request includes the source name 438, the identifiers of the storage pools 1-P, and the weighting factors of the storage pools 1-P.

Having received the ranked scoring information request A, the decentralized agreement module 430 performs a series of functions on the source name 438 based on the plurality of storage pool identifiers and the plurality of storage pool weighting factors to produce a plurality of storage values. A series of the series of functions includes one or more of a deterministic function of the source name 438 and one of the storage pool identifiers to produce an interim result, a normalizing function of the interim result to produce a normalized interim result, and a scoring function of the normalized interim result and a corresponding one of the storage pool weighting factors to produce a storage value of the plurality of storage values. For example, deterministic function 1 performs a mask generating function on a concatenation of the source name 438 and the storage pool 1 ID to produce interim result 1, normalizing function 1 performs a normalizing function by dividing the interim result 1 by a number of possible permutations of the output of the deterministic function 1 to produce a normalized interim result 1, and the scoring function 1 performs a scoring function by dividing pool 1 weight by a negative log of the normalized interim result 1 to produce a score 1, etc.

Having produced the plurality of storage values, the decentralized agreement module 430 performs a ranking function of the plurality of storage value to produce storage pool ranked scoring information A that includes the storage scoring resultant. For example, the ranking function 352 rank orders scores 1-N along with storage pool identifiers by score value to produce the storage pool ranked scoring information A. For instance, the storage pool ranked scoring information A indicates that storage pool 1 is associated with a highest ranking (e.g., 1) and as such, the storage pool 1 is to be considered a highest priority location for accessing the data object.

Figure 43C:
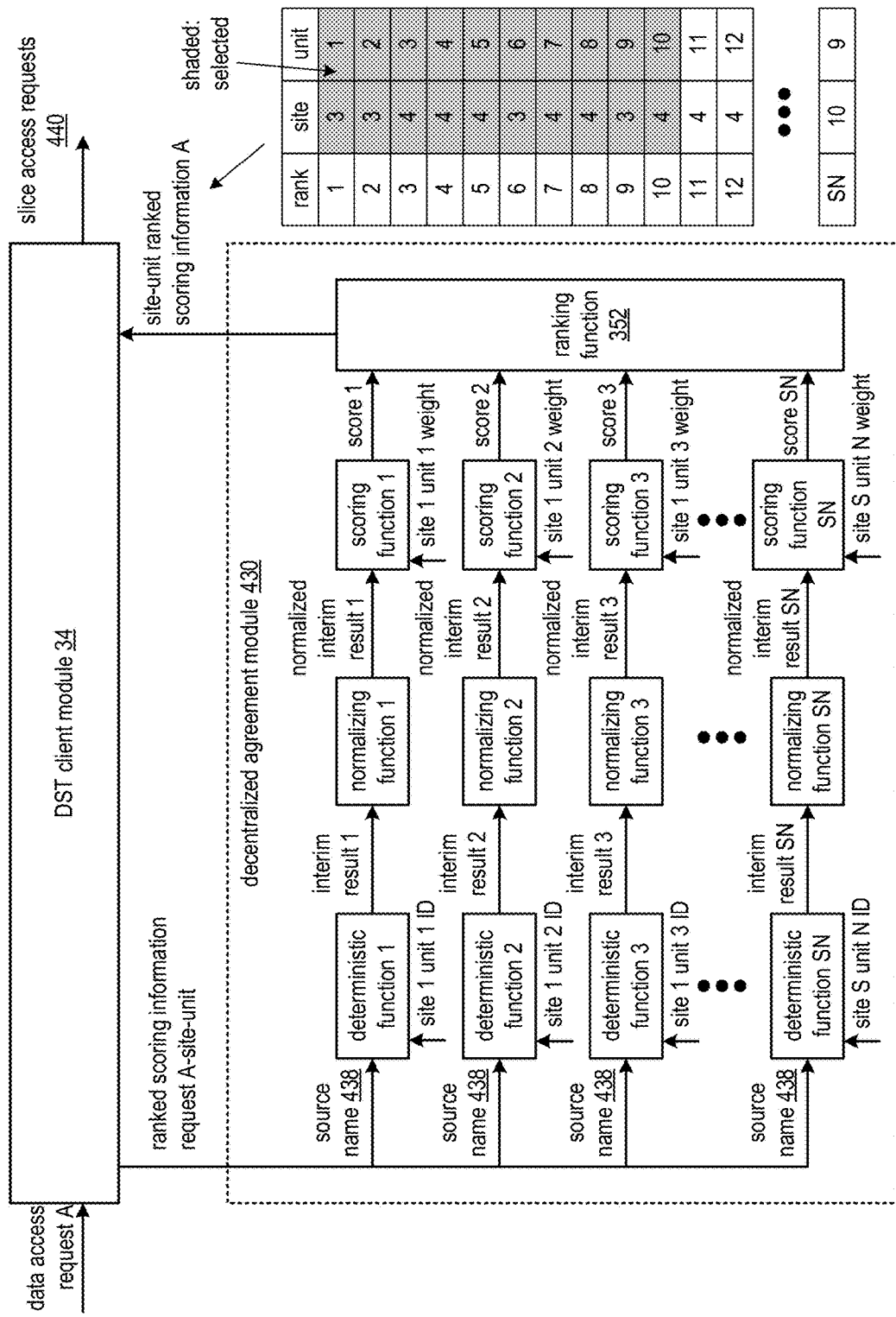

FIG. 43C is a schematic block diagram of an embodiment of the distributed storage and task (DST) processing unit 16 of FIG. 43A that includes the DST client module 34 of FIG. 43A and the decentralized agreement module 430 of FIG. 43A. The decentralized agreement module 430 of FIG. 43C includes a plurality of deterministic functions 1-SN, a plurality of normalizing functions 1-SN, a plurality scoring functions 1-SN, and the ranking function 352 of FIG. 40A. Each deterministic function may be implemented utilizing the deterministic function of the decentralized agreement module 350 of FIG. 40A. Each normalizing function may be implemented utilizing the normalizing function of the decentralized agreement module 350 of FIG. 40A. Each scoring function may be implemented utilizing the scoring function of the decentralized agreement module 350 of FIG. 40A.

FIG. 43C illustrates further steps of the example of operation of the accessing where the DST client module 34 selects a storage unit level indication (e.g., a site-unit level) as a resource level. Having selected the storage unit level indication, the DST client module 34 selects a storage site-storage unit identifier and a storage site-storage weighting factor for each of the plurality of storage units to produce a plurality of storage site-storage unit identifiers (e.g., SN in number for S sites and N units per site) and a plurality of storage site-storage unit weighting factors, where the one or more properties of DSN memory includes the plurality of storage site-storage unit identifiers and the plurality of storage site-storage unit weighting factors. Having selected the identifiers and weighting factors, the DST client module 34 selects the source name 438 of the DSN access request as the one or more properties of the DSN access request. Having selected the source name 438, the DST client module 34 issues a ranked scoring information request A for site-units to decentralized agreement module 430.

The decentralized agreement module 430 performs a series of functions on the source name 438 based on the plurality of storage site-storage unit identifiers and the plurality of storage site-storage unit weighting factors to produce a plurality of storage values (e.g., scores 1-SN). For example, for each combination of site and storage unit (e.g., SN number), a deterministic function performs a hashing type deterministic function on an identifier of the combination of a site in the storage unit concatenated with the source name 438 to produce an interim result, the normalizing function performs the normalizing function on the interim result to produce a normalized interim result, the scoring function performs a scoring function on the normalized interim result and the weight associated with the combination of the site and the storage unit to produce a score of the plurality of storage values (e.g., scores 1-SN).

Having produced the plurality of storage values, the decentralized agreement module 430 performs a ranking function of the plurality of storage values to produce the storage scoring resultant. For example, the ranking function 352 ranks scores associated with sites and units by score to produce site-unit ranked scoring information A. For instance, the ranking function 352 produces the storage scoring resultant that indicates that a decode threshold number of highest ranked site unit combinations includes a unit 1 at site 3, a unit 2 at site 3, a unit 3 at site 4, a unit 4 at site number 4, a unit 5 at site 4, a unit 6 at site 3, a unit 7 at site 4, a unit 8 at site 4, a unit 9 at site 3, and a unit 10 at site 4. Having produced the storage scoring resultant, the decentralized agreement module 430 sends the storage scoring resultant to the DST client module 34.

Having received the storage scoring resultant, the DST client module 34 utilizes the storage scoring resultant to identify a set of storage units of the plurality of storage units affiliated with a given storage pool of the plurality of storage pools and a set of access requests 440 to the set of storage units regarding the DSN access request. For example, the DST client module 34 identifies the highest ranked decode threshold number of site-units, generates the set of access requests 440, and sends the set of access request 440 to the identified set of storage units.

Figure 43D:
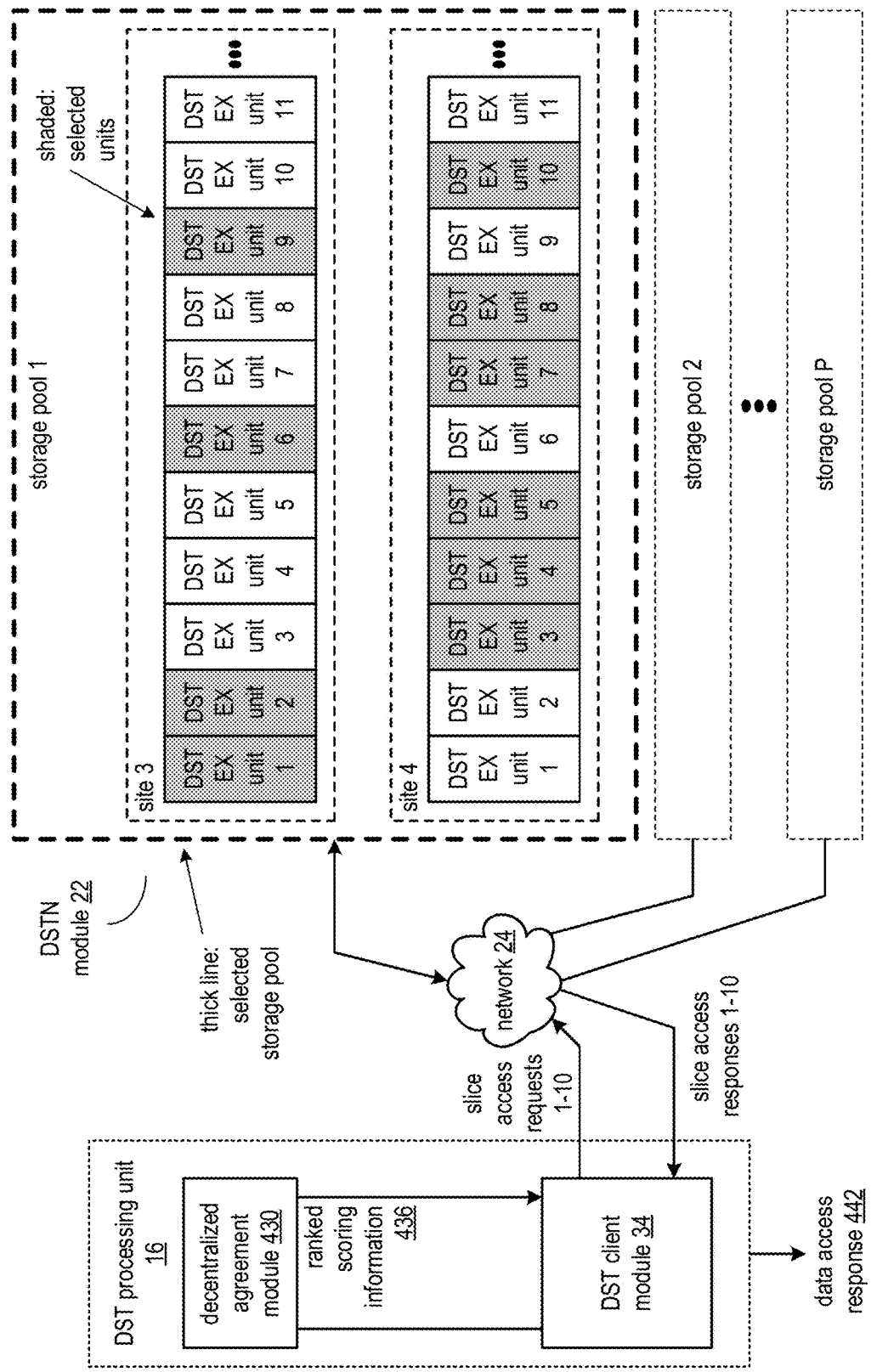

FIG. 43D illustrates further steps of the example of operation of the accessing where, the DST processing unit 16, when the storage scoring resultant identifies a pillar width number of storage units, utilizes one or more properties of storage units in the pillar width number of storage units to identify at least a decode threshold number of storage units. For example, the DST client module 34 rank orders the scores of the storage scoring resultant and identifies the decode threshold number of storage units associated with highest scores. Having identified the at least a decode threshold number of storage units, the DST client module 34 uses the decode threshold number of storage units as the set of storage units. For example, the DST client module 34 sends the set of access requests to the set of storage units regarding the DSN access request, where the set of storage units includes the decode threshold number of storage units.

In an instance of the access, the DST client module 34 issues, via the network 24, slice access requests 1-10 to storage units at sites 3 and 4 of the storage pool 1, receives, via the network 24, slice access responses 1-10, and processes the received slice access responses 1-10 to produce a data access response 442 (e.g., the data object when retrieving the data object, storage confirmation when storing the data object). In a specific instance of sending the slice access requests 1-10, the DST client module 34 sends the slice access request 1 to the unit 1 at the site 3, the request 2 to the unit 2 at the site 3, the slice access request 3 to the unit 3 at the site 4, the slice access request 4 to the unit 4 at the site 4, the slice access request 5 to the unit 5 at the site 5, the slice access request 6 to the unit 6 at the site 3, the slice access request 7 to the unit 7 at the site 4, the slice access request 8 to the unit 8 at the site 4, the slice access request 9 to the unit 9 at the site 3, and the slice access request 10 to the unit 10 at the site 4.

In addition to identifying the set of storage units (e.g., the storage pool 1), the DSN may continue to utilize the distributed agreement protocol function to identify other DSN memory resource selections. As specific example of the identifying the other DSN memory resource selections, when the storage scoring resultant identifies the given storage pool, the DST client module 34 utilizes one or more other properties of the DSN memory to identify storage units affiliated with the given storage pool and uses the identified storage units as the set of storage units.

As another specific example of the identifying the other DSN memory resource selections, when the storage scoring resultant identifies particular memory devices within storage units of the plurality of storage units, the DST client module 34 utilizes one or more properties of storage units in a pillar width number of storage units to identify at least a decode threshold number of storage units, utilizes one or more properties of memory devices within storage units of the at least a decode threshold number of storage units to identify the set of storage units, and sends the set of access requests to the set of storage units regarding the DSN access request, where the set of access requests includes indications of particular memory devices within the set of storage units. The indications of particular memory devices are based on the one or more properties of the memory devices.

Figure 43E:
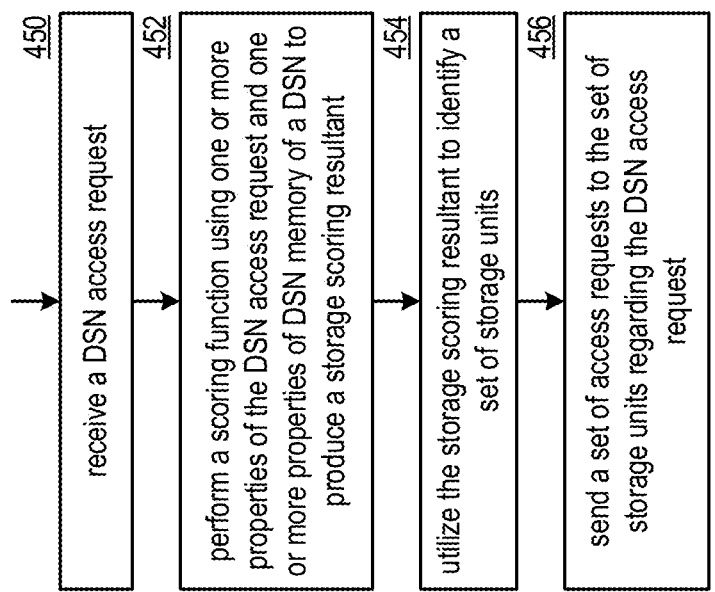
FIG. 43E is a flowchart illustrating an example of accessing a dispersed storage network (DSN) memory in accordance with the present invention.

FIG. 43E is a flowchart illustrating an example of accessing a dispersed storage network (DSN) memory. In particular, a method is presented for use in conjunction with one or more functions and features described in conjunction with FIGS. 1-39, 43A-D, and also FIG. 43E. The method begins at step 450 where a processing module of a computing device of one or more computing devices of a dispersed storage network (DSN) receives a DSN access request regarding at least one data segment of a data object. The method continues at step 452 to where the processing module performs a scoring function (e.g., a distributed agreement protocol function) using one or more properties of the DSN access request and one or more properties of DSN memory of the DSN to produce a storage scoring resultant, where the DSN memory includes a plurality of storage units that are logically arranged into a plurality of storage pools.

As a specific example of the performing the scoring function, the processing module selects a resource level, selects the one or more properties of the DSN memory from a plurality of properties of the DSN memory based on the selected resource level, calculates, based on the selected resource level, a plurality of storage values based on the one or more properties of the DSN access request and the one or more properties of DSN memory, and performs a ranking function of the plurality of storage values to produce the storage scoring resultant.

As another specific example of the performing the scoring function, the processing module selects a storage pool level indication as the resource level, selects a storage pool identifier and a storage pool weighting factor for each of the plurality of storage pools to produce a plurality of storage pool identifiers and a plurality of storage pool weighting factors, where the one or more properties of DSN memory includes the plurality of storage pool identifiers and the plurality of storage pool weighting factors, selects a source name of the DSN access request as the one or more properties of the DSN access request, and selects a series of functions on the source name based on the plurality of storage pool identifiers and the plurality of storage pool weighting factors to produce a plurality of storage values.

As yet another specific example of the performing the scoring function, the processing module selects a storage unit level indication as a resource level, selects a storage site-storage unit identifier and a storage site-storage weighting factor for each of the plurality of storage units to produce a plurality of storage site-storage unit identifiers and a plurality of storage site-storage unit weighting factors, where the one or more properties of DSN memory includes the plurality of storage site-storage unit identifiers and the plurality of storage site-storage unit weighting factors, selects a source name of the DSN access request as the one or more properties of the DSN access request, performs a series of functions on the source name based on the plurality of storage site-storage unit identifiers and the plurality of storage site-storage unit weighting factors to produce a plurality of storage values, and performs a ranking function of the plurality of storage value to produce the storage scoring resultant.

The method continues at step 454 where the processing module utilizes the storage scoring resultant to identify a set of storage units of the plurality of storage units affiliated with a given storage pool of the plurality of storage pools (e.g., identifying storage units associated with highest values of the plurality of storage values). The method continues at step 456 where the processing module sends a set of access requests to the set of storage units regarding the DSN access request.

In addition to identifying the set of storage units, the DSN may continue to utilize the distributed agreement protocol function to identify other DSN memory resource selections. As a specific example, when the storage scoring resultant identifies the given storage pool, the processing module utilizes one or more other properties of the DSN memory to identify storage units affiliated with the given storage pool and uses the identified storage units as the set of storage units. As another specific example of the identifying the other DSN memory resource selections, when the storage scoring resultant identifies a pillar width number of storage units, the processing module utilizes one or more properties of storage units in the pillar width number of storage units to identify at least a decode threshold number of storage units and uses the decode threshold number of storage units as the set of storage units.

As yet another example of the identifying the other DSN memory resource selections, when the storage scoring resultant identifies particular memory devices within storage units of the plurality of storage units, the processing module utilizes one or more properties of storage units in a pillar width number of storage units to identify at least a decode threshold number of storage units, utilizes one or more properties of memory devices within storage units of the at least a decode threshold number of storage units to identify the set of storage units, and sends the set of access requests to the set of storage units regarding the DSN access request, where the set of access requests includes indications of particular memory devices within the set of storage units, wherein the indications of particular memory devices are based on the one or more properties of the memory devices.

The method described above in conjunction with the processing module can alternatively be performed by other modules of the dispersed storage network or by other devices. In addition, at least one memory section (e.g., a non-transitory computer readable storage medium) that stores operational instructions can, when executed by one or more processing modules of one or more computing devices of the dispersed storage network (DSN), cause the one or more computing devices to perform any or all of the method steps described above.

Figure 44A:
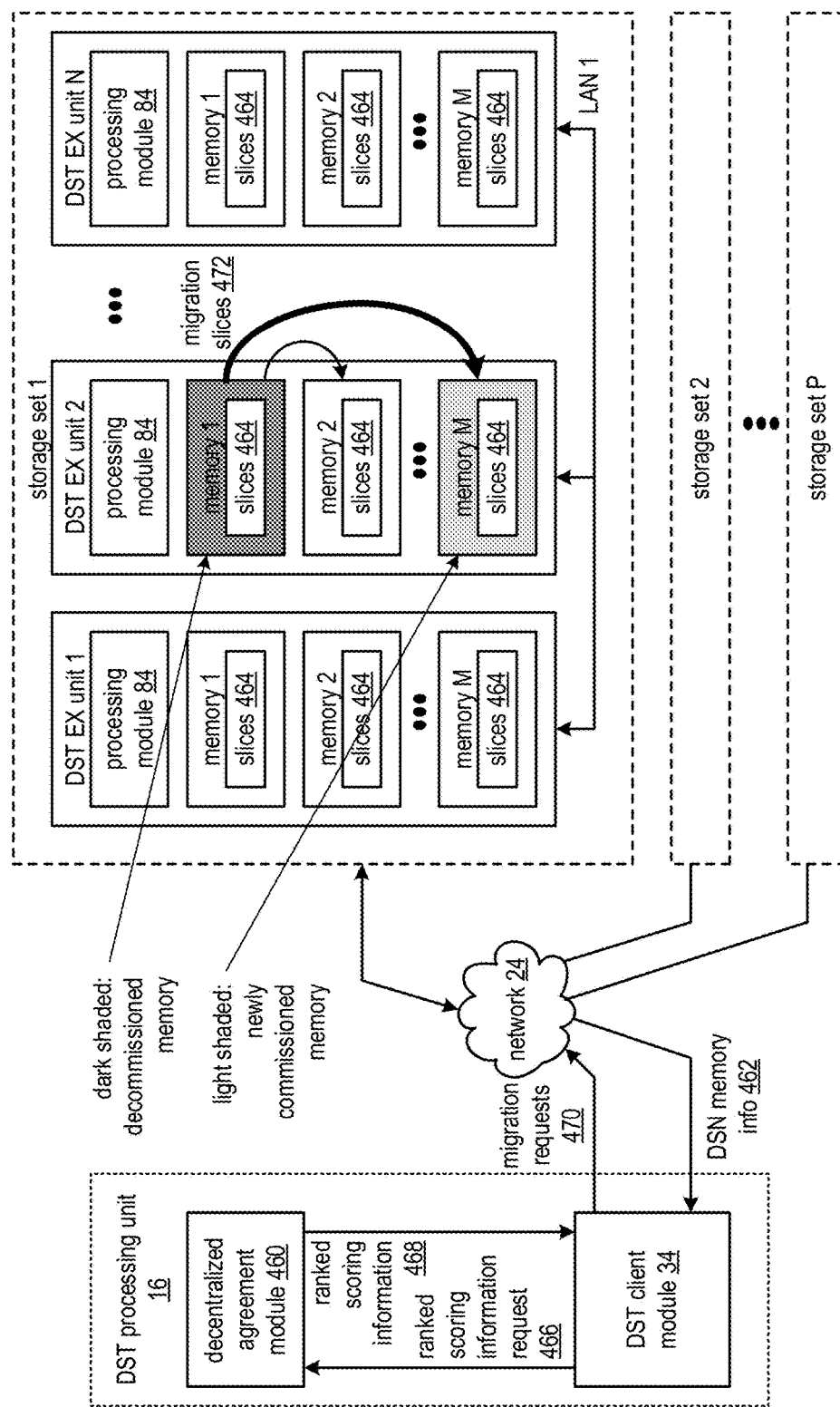
FIG. 44A is a schematic block diagram of another embodiment of a dispersed storage network (DSN) in accordance with the present invention.

FIG. 44A is a schematic block diagram of another embodiment of a dispersed storage network (DSN) that includes the distributed storage and task (DST) processing unit 16 of FIG. 1, the network 24 of FIG. 1, and a plurality of storage sets 1-P. The DST processing unit 16 includes the DST client module 34 of FIG. 1 and a decentralized agreement module 460. The decentralized agreement module 460 may be implemented utilizing the decentralized agreement module 350 of FIG. 40A. Hereafter, the plurality of storage sets may be interchangeably referred to as a DSN memory. Each storage set includes a set of DST execution (EX) units 1-N and a local area network (LAN), where each DST execution unit of the set of DST execution units is operably coupled to remaining DST execution units of the set of DST execution units. Each DST execution unit includes the processing module 84 of FIG. 3 and a set of memories 1-M. Each memory may be implemented utilizing the memory 88 of FIG. 3. Each DST execution unit may be implemented utilizing the DST execution unit 36 of FIG. 1. Hereafter, each DST execution unit may be interchangeably referred to as a storage unit and a set of DST execution units may be interchangeably referred to as a set of storage units and/or a storage pool.

The DSN functions to migrate encoded data slices of the DSN in response to identified changes in the DSN memory, where the identified changes in the DSN memory may include one or more of removing a storage set, adding a new storage set, removing a storage unit, adding a new storage unit, decommissioning a memory, and commissioning a new memory.

In an example of steps of operation of the migrating of the encoded data slices, the DST client module 34 identifies the change in the DSN memory of the DSN. The identifying includes one or more of receiving DSN memory information 462 (e.g., an error message, a resource commissioning report, a resource decommissioning report, active resource status, and configuration information), interpreting an error message, interpreting a commission report, interpreting a deactivation report, interpreting configuration information, initiating a query, and interpreting the received query response. For example, the DST client module 34 receives DSN memory information 462 from DST execution unit 2 of the storage set 1, where the DSN memory information 462 indicates that a memory M of DST execution unit 2 has been newly commissioned. As another example, the DST client module 34 receives further DSN memory information 462 from the DST execution unit 2, where the further DSN memory information 462 indicates that memory 1 has been decommissioned.

Having detected the change in the DSN memory, the DST client module 34, for a set of encoded data slices of stored encoded data slices 464 effected by the change in the DSN memory, where a data segment of a data object is dispersed storage error encoded to produce the set of encoded data slices, ascertains updated properties of the DSN memory, where the updated properties includes the change in the DSN memory (e.g., pool change, storage unit change, memory change, etc.). For example, the DST client module 34 ascertains that the change in the DSN memory includes the memory 1 of the DST execution unit 2 being decommissioned and the memory M of the DST execution unit 2 being newly commissioned.

The updated properties of the DSN memory may further include changes in weighting factors for one or more resource levels of the DSN memory. For example, the DST client module 34 ascertains that a weighting factor associated with the memory 1 of the DST execution unit 2 being decommissioned is updated to zero and a weighting factor associated with the memory M of the DST execution unit 2 being newly commissioned is established at a level associated with a newly established memory (e.g., higher than average based on a higher than average available storage capacity).

Having ascertained the updated properties of the DSN memory, the DST client module 34 performs an updating scoring function using one or more properties of DSN access information of the data segment (e.g., a DSN address) and one or more properties of the updated properties of the DSN memory to produce an updated storage scoring resultant, where the DSN memory includes the plurality of storage units that are logically arranged into the plurality of storage pools. As a specific example, the performing of the updating scoring function includes the DST client module 34 selecting a resource level (e.g., storage pool level, storage unit level, memory level) and selecting the one or more properties (e.g., associated weighting factors of the DSN resources associated with the selected resource level) of the DSN memory from a plurality of updated properties of the DSN memory based on the selected resource level. For instance, the DST client module 34 selects the memory level when detecting the commissioning changes of the memories 1 and M of the DST execution unit 2 and selects location weights associated with the plurality of memories 1-M of the DST execution unit 2.

Having selected the resource level, the DST processing unit 16 calculates, based on the selected resource level, a plurality of storage values based on the one or more properties of the DSN access information and the one or more properties of the updated properties of the DSN memory and performs a ranking function of the plurality of storage values to produce the updated storage scoring resultant. For example, the DST client module 34 issues a ranked scoring information request 466 to the decentralized agreement module 460, where the ranked scoring information request 466 includes one or more of the one or more properties of the DSN access information of the data segment (e.g., a DSN address of the data segment), identifiers of a plurality resources associated with the selected resource level (e.g., identifiers of the memories 1-M), and weighting factors of the plurality resources associated with the selected resource level (e.g., updated weighting factors for the memories 1-M).

Having received the ranked scoring information request 466, the decentralized agreement module 460 performs a decentralized agreement protocol function on the DSN address, the identifiers of the memories 1-M, utilizing the weighting factors of the memories 1-M to produce the plurality of storage values associated with the memories 1-M for the set of encoded data slices. Having produced the plurality of storage values, the decentralized agreement module 460 performs the ranking function to rank order the plurality of storage values associated with the memories 1-M as the updated storage scoring resultant. Having produced the updated storage scoring resultant, the decentralized agreement module 460 issues ranked scoring information 468 to the DST client module 34, where the ranked scoring information 468 includes the updated storage scoring resultant. The generating of the updated storage scoring resultant is discussed in greater detail with reference to FIG. 44B.

Having received the ranked scoring information 468, the DST client module 34 utilizes the updated storage scoring resultant to identify an updated set of storage units of the plurality of storage units affiliated with a given storage pool of the plurality of storage pools when the resource level includes the storage pool level. Alternatively, the DST client module 34 utilizes the updated storage scoring resultant to identify a memory of the plurality of memories 1-M of the DST execution unit 2 when the resource level includes the memory level. Further alternatively, the DST client module 34 utilizes the updated storage scoring resultant to identify another storage unit of the set of storage units when the resource level includes the storage unit level.

Having identified the updated set of storage units (e.g., another storage pool when the resource level includes the storage pool level, another storage unit when the resource level includes the storage unit level, a storage unit associated with a plurality of memories when the resource level includes the memory level), the DST client module 34 sends, via the network 24, at least one data migration request 470 to at least one storage unit of the updated set of storage units regarding migration of at least one encoded data slice of the set of encoded data slices.

The sending of the at least one data migration request 470 to the at least one storage unit includes facilitating one or more migration alternatives. A first migration alternative includes migrating the set of encoded data slices as migration slices 472 from a set of storage units in a second storage pool of the plurality of storage pools to the updated set of storage units. A second migration alternative includes migrating an encoded data slice as the migration slices 472 of the at least one encoded data slice from a storage unit of an original set of storage units in the storage pool to a storage unit of the at least one storage unit. A third migration alternative includes migrating an encoded data slice as the migration slices 472 of the at least one encoded data slice from a first memory device of the at least one storage unit to a second memory device of the at least one storage unit. For instance, the migration request 470 instructs the DST execution unit 2 to migrate a slice 464 of the set of encoded data slices from the decommissioned memory 1 to another memory (e.g., newly commissioned memory M) of the plurality of memories of the DST execution unit 2 that is associated with a highest storage value of the plurality of storage values of the updated storage scoring resultant.

A fourth migration alternative includes sending a data migration request of the at least one data migration request 470 to a storage unit of the at least one storage unit and to another storage unit of the plurality of storage units, where the other storage unit currently stores an encoded data slice of the at least one encoded data slice that is to be migrated to the storage unit (e.g., same storage unit, but different memory within the storage unit; different storage units in same storage pool; different storage units in different pools). The DST client module 34 may identify the other storage unit by performing a scoring function using the one or more properties of DSN access information of the data segment and one or more non-updated properties of the DSN memory to produce a storage scoring resultant (e.g., obtaining further ranked scoring information 468 from the decentralized agreement module 460 associated with previous weighting factors of the DSN resources of the selected resource level). Having performed the scoring function, the DST client module 34 utilizes the storage scoring resultant to identify a non-updated set of storage units of the plurality of storage units (e.g., previous storage locations) and utilizes a particular property of the DSN access information (e.g., the DSN address) to identify the other storage unit.

Alternatively, a storage unit of the at least one storage unit determines a current storage location within the DSN memory of an encoded data slice of the at least one encoded data slice. As a specific example, the storage unit performs the scoring function using the one or more properties of DSN access information (e.g., the DSN address) of the data segment and one or more non-updated properties (e.g., previous weighting factors) of the DSN memory to produce a storage scoring resultant (e.g., previous storage values), utilizes the storage scoring resultant to identify a non-updated set of storage units of the plurality of storage units (e.g., a previous storage set), and utilizes a particular property of the DSN access information to identify the current storage location. The particular property enables identification of the DSN address for the particular encoded data slice.

Figure 44B:
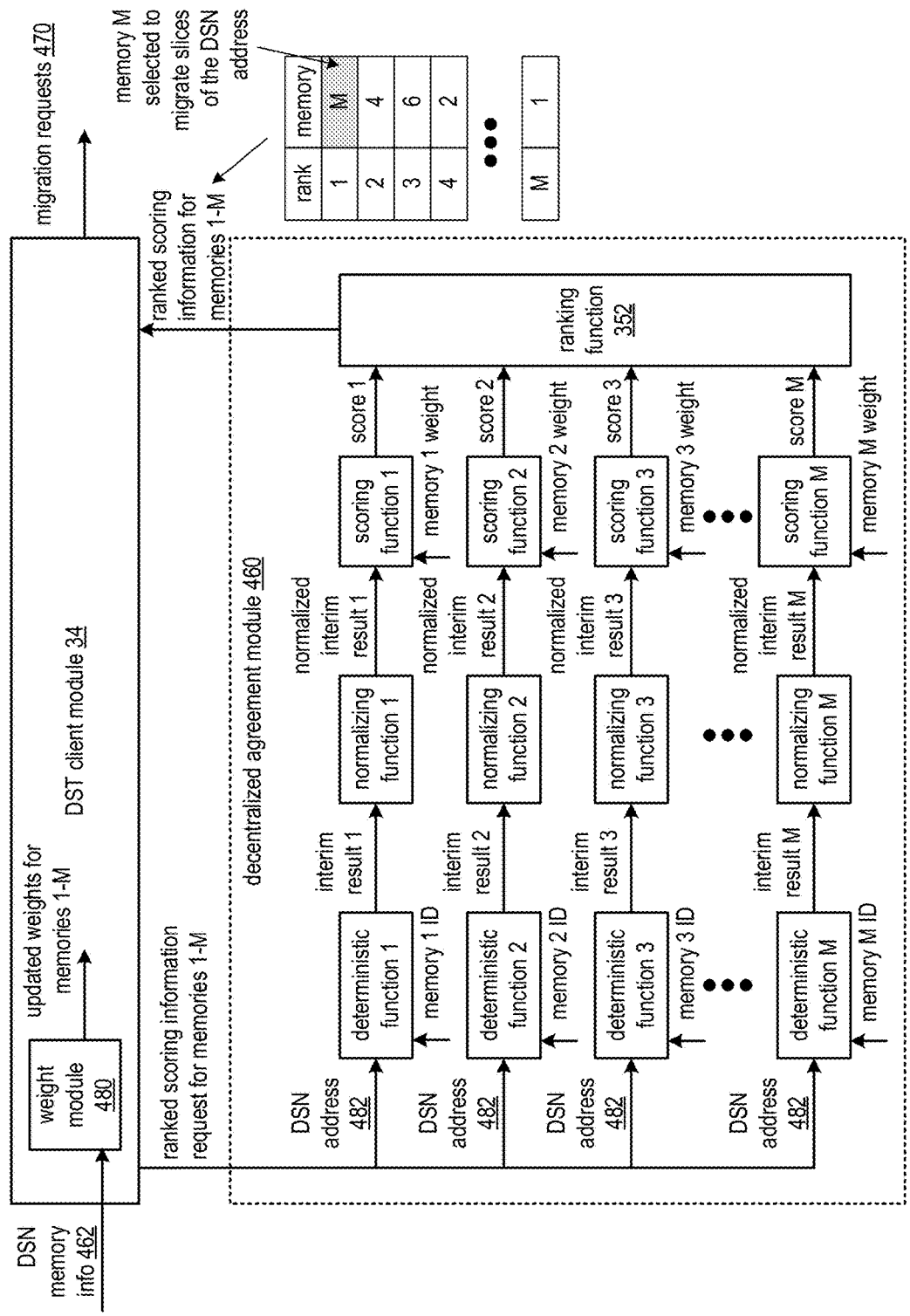
FIG. 44B is a schematic block diagram of another embodiment of a distributed storage and task (DST) processing unit in accordance with the present invention.

FIG. 44B is a schematic block diagram of another embodiment of a distributed storage and task (DST) processing unit 16 of FIG. 44A that includes the DST client module 34 of FIG. 44A and the decentralized agreement module 460 of FIG. 44A. The DST client module 34 includes a weight module 480. The weight module 480 may be implemented utilizing the processing module 84 of FIG. 3. The decentralized agreement module 460 of FIG. 44B includes a plurality of deterministic functions 1-M, a plurality of normalizing functions 1-M, a plurality scoring functions 1-M, and the ranking function 352 of FIG. 40A. Each deterministic function may be implemented utilizing the deterministic function of the decentralized agreement module 350 of FIG. 40A. Each normalizing function may be implemented utilizing the normalizing function of the decentralized agreement module 350 of FIG. 40A. Each scoring function may be implemented utilizing the scoring function of the decentralized agreement module 350 of FIG. 40A.

FIG. 44B further illustrates the steps of the example of operation of the migrating of the encoded data slices of FIG. 44A where the DST client module 34 selects the memory level as the resource level. Having selected the memory level, the weight module 480 of the DST client module 34 receives the DSN memory information 462 and performs a weighting factor updating function on weighting factors of the DSN resources associated with the selected resource level to produce updated weighting factors, where the weighting factor updating function is based on the DSN memory information 462. For example, the weight module 480 performs the weighting factor updating function on weighting factors of the memories 1-M in accordance with the DSN memory information 462 (e.g., decommissioned memory 1, commission new memory M) to produce updated weights for memories 1-M (e.g., zero out weighting factor associated with decommissioned memory 1, establish a weighting factor associated with newly commissioned memory M).

Having produced the updated weighting factors, the DST client module 34 selects a memory identifier and a corresponding updated weighting factor for each of the plurality of memories 1-M to produce a plurality of memory identifiers and a plurality of updated memory weighting factors, where the updated properties of DSN memory includes the plurality of memory identifiers and the plurality of updated memory weighting factors. Having selected the identifiers and weighting factors, the DST client module 34 selects the DSN address 482 (e.g., source name) of the DSN access properties as the one or more properties of the DSN access information. Having selected the DSN address 482, the DST client module 34 issues a ranked scoring information request for memories 1-M to decentralized agreement module 460.

The decentralized agreement module 460 performs a series of functions on the DSN address 482 based on the identifiers and the plurality of weighting factors to produce a plurality of storage values (e.g., scores 1-M). For example, for each memory, a deterministic function performs a hashing type deterministic function on an identifier of a combination of a memory identifier concatenated with the DSN address 482 to produce an interim result, the normalizing function performs the normalizing function on the interim result to produce a normalized interim result, the scoring function performs a scoring function on the normalized interim result and the weight associated with the memory to produce a score of the plurality of storage values (e.g., scores 1-M).

Having produced the plurality of storage values, the decentralized agreement module 460 performs a ranking function of the plurality of storage value to produce the storage scoring resultant. For example, the ranking function 352 ranks scores associated with memories by score to produce ranked scoring information for memories 1-M. For instance, the ranking function 352 produces the storage scoring resultant that indicates that newly commissioned memory M is associated with a highest score. Having produced the storage scoring resultant, the decentralized agreement module 460 sends the storage scoring resultant to the DST client module 34. Having received the storage scoring resultant, the DST client module 34 utilizes the storage scoring resultant to generate the migration requests 470 based on identifying a memory associated with a highest storage value of the storage scoring resultant.

Figure 44C:
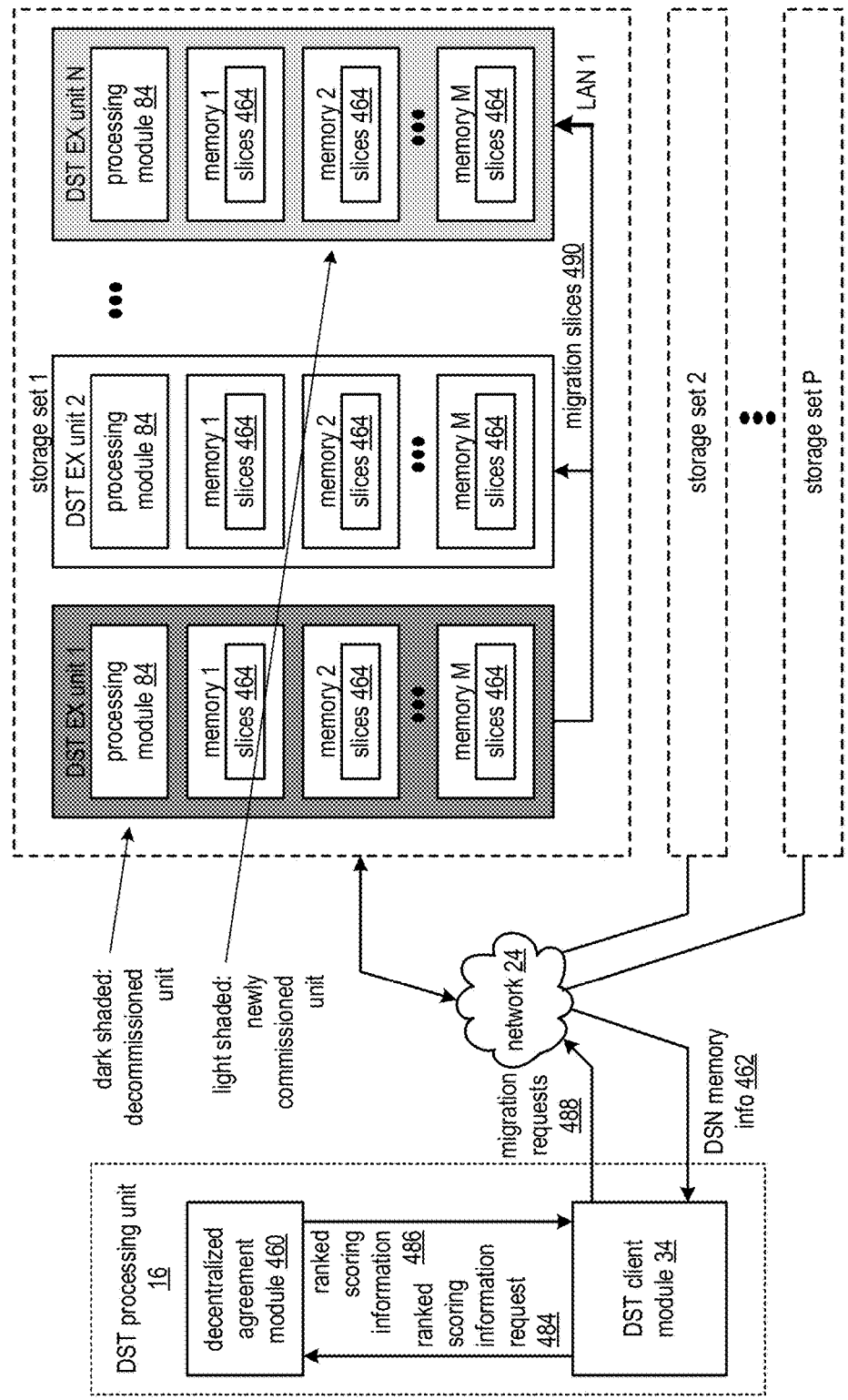
FIG. 44C is a schematic block diagram of another embodiment of a dispersed storage network (DSN) in accordance with the present invention.

FIG. 44C is a schematic block diagram of another embodiment of a dispersed storage network (DSN) that includes the distributed storage and task (DST) processing unit 16 of FIG. 44A, the network 24 of FIG. 44A, and the plurality of storage sets 1-P of FIG. 44A. The DST processing unit 16 includes the DST client module 34 of FIG. 44A and the decentralized agreement module 460 of FIG. 44A. Hereafter, the plurality of storage sets may be interchangeably referred to as a DSN memory. Each storage set includes the set of DST execution (EX) units 1-N of FIG. 44A and the local area network (LAN) of FIG. 44A, where each DST execution unit of the set of DST execution units is operably coupled to remaining DST execution units of the set of DST execution units. Each DST execution unit includes the processing module 84 of FIG. 44A and the set of memories 1-M of FIG. 44A. Hereafter, each DST execution unit may be interchangeably referred to as a storage unit and a set of DST execution units may be interchangeably referred to as a set of storage units and/or a storage pool.

The DSN functions to migrate encoded data slices of the DSN in response to identified changes in the DSN memory, where the identified changes in the DSN memory may include one or more of removing a storage set, adding a new storage set, removing a storage unit, adding a new storage unit, decommissioning a memory, and commissioning a new memory.

In an example of steps of operation of the migrating of the encoded data slices, the DST client module 34 identifies the change in the DSN memory of the DSN. The identifying includes one or more of receiving the DSN memory information 462, interpreting an error message, interpreting a commission report, interpreting a deactivation report, interpreting configuration information, initiating a query, and interpreting the received query response. For example, the DST client module 34 receives, via the network 24, DSN memory information 462 from the DST execution unit 1 of the storage set 1, where the DSN memory information 462 indicates that DST execution unit 1 has been decommissioned and the DST client module 34 receives, via the network 24, further DSN memory information 462 from the DST execution unit N of the storage set 1, where the further DSN memory information 462 indicates that the DST execution unit N has been newly commissioned.

Having detected the change in the DSN memory, the DST client module 34, for a set of encoded data slices of stored encoded data slices 464 effected by the change in the DSN memory (e.g., at least one encoded data slices 464 stored in the memories 1-M of the DST execution unit 1), where a data segment of a data object is dispersed storage error encoded to produce the set of encoded data slices, ascertains updated properties of the DSN memory, where the updated properties includes the change in the DSN memory (e.g., pool change, storage unit change, memory change, etc.). For example, the DST client module 34 ascertains that the change in the DSN memory includes the DST execution unit 1 being decommissioned and the DST execution unit N being newly commissioned.

The updated properties of the DSN memory may further include changes in weighting factors for one or more resource levels of the DSN memory. For example, the DST client module 34 ascertains that a weighting factor associated with the DST execution unit 1 being decommissioned is updated to zero and a weighting factor associated with the DST execution unit N being newly commissioned is established at a level associated with a newly established storage unit (e.g., higher than average based on a higher than average available storage capacity).

Having ascertained the updated properties of the DSN memory, the DST client module 34 performs an updating scoring function using one or more properties of DSN access information of the data segment (e.g., a DSN address, a slice name for a set of slices that includes an encoded data slice 464 stored in the DST execution unit 1) and one or more properties of the updated properties of the DSN memory to produce an updated storage scoring resultant, where the DSN memory includes the plurality of storage units that are logically arranged into the plurality of storage pools. The performing of the updating scoring function includes the DST client module 34 selecting a resource level (e.g., storage pool level, storage unit level, memory level) and selecting the one or more properties (e.g., associated weighting factors of the DSN resources associated with the selected resource level) of the DSN memory from a plurality of updated properties of the DSN memory based on the selected resource level. For the example, the DST client module 34 selects the storage unit level when detecting the commissioning changes of the DST execution units 1 and N and selects location weighting factors associated with the set of DST execution units 1-N of the storage set 1.

Having selected the resource level, the DST processing unit 16 calculates, based on the selected resource level, a plurality of storage values based on the one or more properties of the DSN access information and the one or more properties of the updated properties of the DSN memory and performs a ranking function of the plurality of storage values to produce the updated storage scoring resultant. For example, the DST client module 34 issues a ranked scoring information request 484 to the decentralized agreement module 460, where the ranked scoring information request 484 includes one or more of the one or more properties of the DSN access information of the data segment (e.g., a DSN address of the data segment), identifiers of a plurality resources associated with the selected resource level (e.g., identifiers of the DST execution units 1-N), and weighting factors of the plurality resources associated with the selected resource level (e.g., updated weighting factors for the DST execution units 1-N).

Having received the ranked scoring information request 484, the decentralized agreement module 460 performs a decentralized agreement protocol function on the DSN address, the identifiers of the DST execution units 1-N, utilizing the weighting factors of the DST execution units 1-N to produce the plurality of storage values associated with the DST execution units 1-N for the set of encoded data slices. Having produced the plurality of storage values, the decentralized agreement module 460 performs the ranking function to rank order the plurality of storage values associated with the DST execution units 1-N as the updated storage scoring resultant. Having produced the updated storage scoring resultant, the decentralized agreement module 460 issues ranked scoring information 486 to the DST client module 34, where the ranked scoring information 486 includes the updated storage scoring resultant. The generating of the updated storage scoring resultant is discussed in greater detail with reference to FIG. 44D.

Having received the ranked scoring information 486, the DST client module 34 utilizes the updated storage scoring resultant to identify an updated set of storage units of the plurality of storage units affiliated with a given storage pool of the plurality of storage pools when the resource level includes the storage pool level. Alternatively, the DST client module 34 utilizes the updated storage scoring resultant to identify another DST execution unit of the DST execution units 2-N when the resource level includes the storage unit level and the DST execution unit 1 decommissioned (e.g., source of migration slices 490 to transfer to the other DST execution unit).

Having identified the updated set of storage units (e.g., another storage pool when the resource level includes the storage pool level, another storage unit when the resource level includes the storage unit level, a storage unit associated with a plurality of memories when the resource level includes the memory level), the DST client module 34 sends, via the network 24, at least one data migration request 488 to at least one storage unit of the updated set of storage units regarding migration of at least one encoded data slice of the set of encoded data slices.

The sending of the at least one data migration request 488 to the at least one storage unit includes facilitating one or more migration alternatives. A first migration alternative includes migrating the set of encoded data slices as migration slices 490 from a set of storage units in a second storage pool of the plurality of storage pools to the updated set of storage units. A second migration alternative includes migrating an encoded data slice as the migration slices 490 of the at least one encoded data slice from a storage unit of an original set of storage units in the storage pool to a storage unit of the at least one storage unit. A third migration alternative includes migrating an encoded data slice as the migration slices 490 of the at least one encoded data slice from a first memory device of the at least one storage unit to a second memory device of the at least one storage unit.

A fourth migration alternative includes sending a data migration request of the at least one data migration request 488 to a storage unit of the at least one storage unit and to another storage unit of the plurality of storage units, where the other storage unit currently stores an encoded data slice of the at least one encoded data slice that is to be migrated to the storage unit (e.g., same storage unit, but different memory within the storage unit; different storage units in same storage pool; different storage units in different pools). The DST client module 34 may identify the other storage unit by performing a scoring function using the one or more properties of DSN access information of the data segment and one or more non-updated properties of the DSN memory to produce a storage scoring resultant (e.g., obtaining further ranked scoring information 486 from the decentralized agreement module 460 associated with previous weighting factors of the DSN resources of the selected resource level). Having performed the scoring function, the DST client module 34 utilizes the storage scoring resultant to identify a non-updated set of storage units of the plurality of storage units (e.g., previous storage locations) and utilizes a particular property of the DSN access information (e.g., the DSN address) to identify the other storage unit.

Alternatively, a storage unit of the at least one storage unit determines a current storage location within the DSN memory of an encoded data slice of the at least one encoded data slice. As a specific example, the storage unit performs the scoring function using the one or more properties of DSN access information (e.g., the DSN address) of the data segment and one or more non-updated properties (e.g., previous weighting factors) of the DSN memory to produce a storage scoring resultant (e.g., previous storage values), utilizes the storage scoring resultant to identify a non-updated set of storage units of the plurality of storage units (e.g., a previous storage set), and utilizes a particular property of the DSN access information to identify the current storage location. The particular property enables identification of the DSN address for the particular encoded data slice.

Figure 44D:
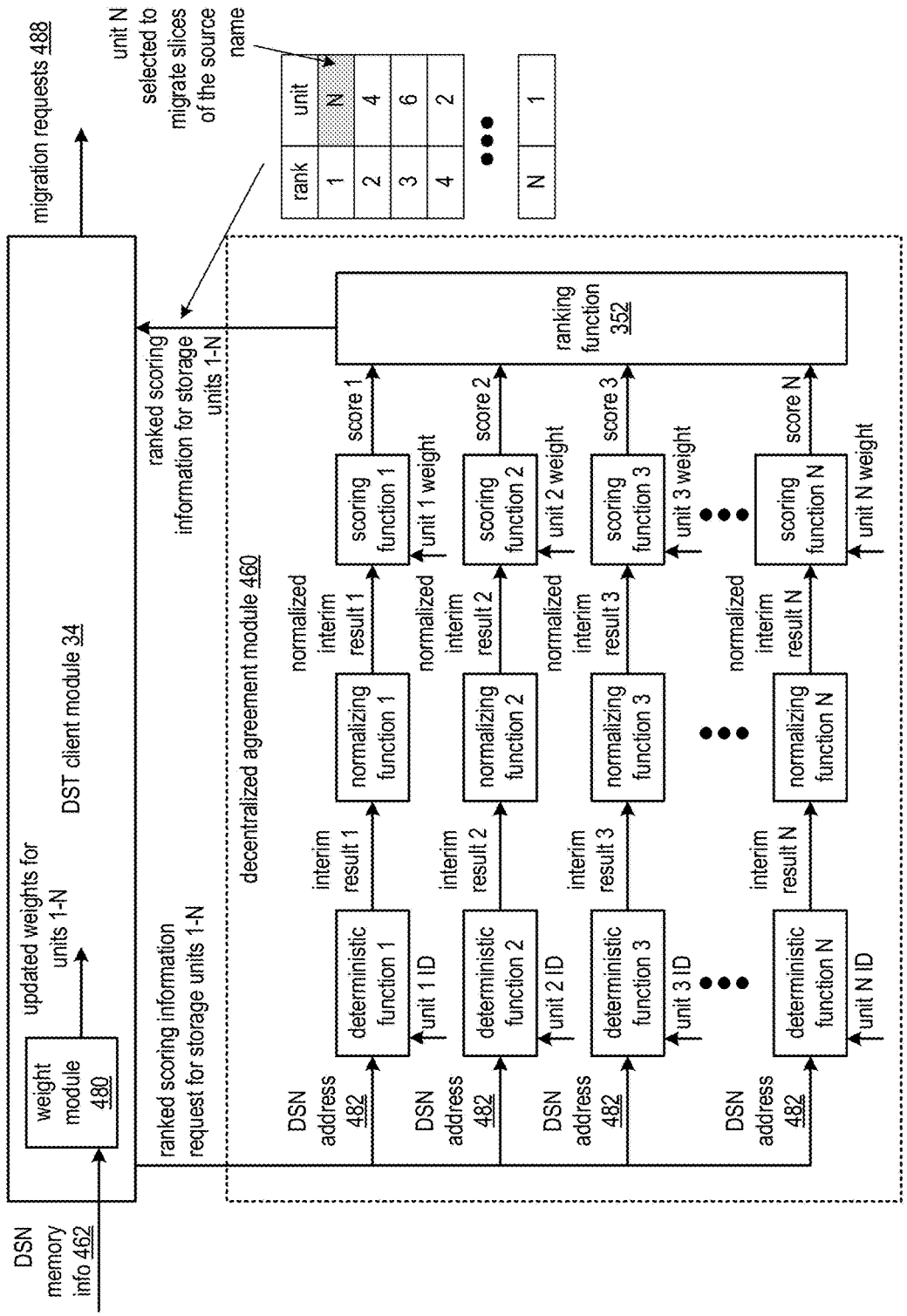
FIG. 44D is a schematic block diagram of another embodiment of a distributed storage and task (DST) processing unit in accordance with the present invention.

FIG. 44D is a schematic block diagram of another embodiment of a distributed storage and task (DST) processing unit 16 of FIG. 44C that includes the DST client module 34 of FIG. 44C and the decentralized agreement module 460 of FIG. 44C. The DST client module 34 includes the weight module 480 of FIG. 44B. The decentralized agreement module 460 includes a plurality of deterministic functions 1-N, a plurality of normalizing functions 1-N, a plurality scoring functions 1-N, and the ranking function 352 of FIG. 40A. Each deterministic function may be implemented utilizing the deterministic function of the decentralized agreement module 350 of FIG. 40A. Each normalizing function may be implemented utilizing the normalizing function of the decentralized agreement module 350 of FIG. 40A. Each scoring function may be implemented utilizing the scoring function of the decentralized agreement module 350 of FIG. 40A.

FIG. 44D further illustrates the steps of the example of operation of the migrating of the encoded data slices of FIG. 44C where the DST client module 34 selects the storage unit level as the resource level. Having selected the storage unit level, the weight module 480 of the DST client module 34 receives the DSN memory information 462 and performs a weighting factor updating function on weighting factors of the DSN resources associated with the selected resource level to produce updated weighting factors, where the weighting factor updating function is based on the DSN memory information 462. For example, the weight module 480 performs the weighting factor updating function on weighting factors of the DST execution units 1-N of FIG. 44C in accordance with the DSN memory information 462

(e.g., decommissioned DST execution unit 1, commission new DST execution unit N) to produce updated weights for the DST execution units 1-N (e.g., zero out weighting factor associated with decommissioned DST execution unit 1, establish a weighting factor associated with newly commissioned DST execution unit N).

Having produced the updated weighting factors, the DST client module 34 selects a DST execution unit identifier and a corresponding updated weighting factor for each of the set of DST execution units 1-N to produce a plurality of storage units identifiers and a plurality of updated storage unit weighting factors, where the updated properties of DSN memory includes the plurality of storage units identifiers and the plurality of updated storage unit weighting factors. Having selected the identifiers and weighting factors, the DST client module 34 selects the DSN address 482 (e.g., source name) of the DSN access properties as the one or more properties of the DSN access information. Having selected the DSN address 482, the DST client module 34 issues a ranked scoring information request for storage units 1-N to the decentralized agreement module 460.

The decentralized agreement module 460 performs a series of functions on the DSN address 482 based on the identifiers and the plurality of weighting factors to produce a plurality of storage values (e.g., scores 1-N). For example, for each storage unit, a deterministic function performs a hashing type deterministic function on an identifier of a combination of a storage unit identifier concatenated with the DSN address 482 to produce an interim result, the normalizing function performs the normalizing function on the interim result to produce a normalized interim result, the scoring function performs a scoring function on the normalized interim result and the weight associated with the storage unit to produce a score of the plurality of storage values (e.g., scores 1-N).

Having produced the plurality of storage values, the decentralized agreement module 460 performs a ranking function of the plurality of storage value to produce the storage scoring resultant. For example, the ranking function 352 ranks scores associated with storage units by score to produce ranked scoring information for storage units 1-N. For instance, the ranking function 352 produces the storage scoring resultant that indicates that newly commissioned storage unit N is associated with a highest score. Having produced the storage scoring resultant, the decentralized agreement module 460 sends the storage scoring resultant to the DST client module 34. Having received the storage scoring resultant, the DST client module 34 utilizes the storage scoring resultant to generate the migration requests 488 based on identifying a storage unit associated with a highest storage value of the storage scoring resultant.

Figure 44E:
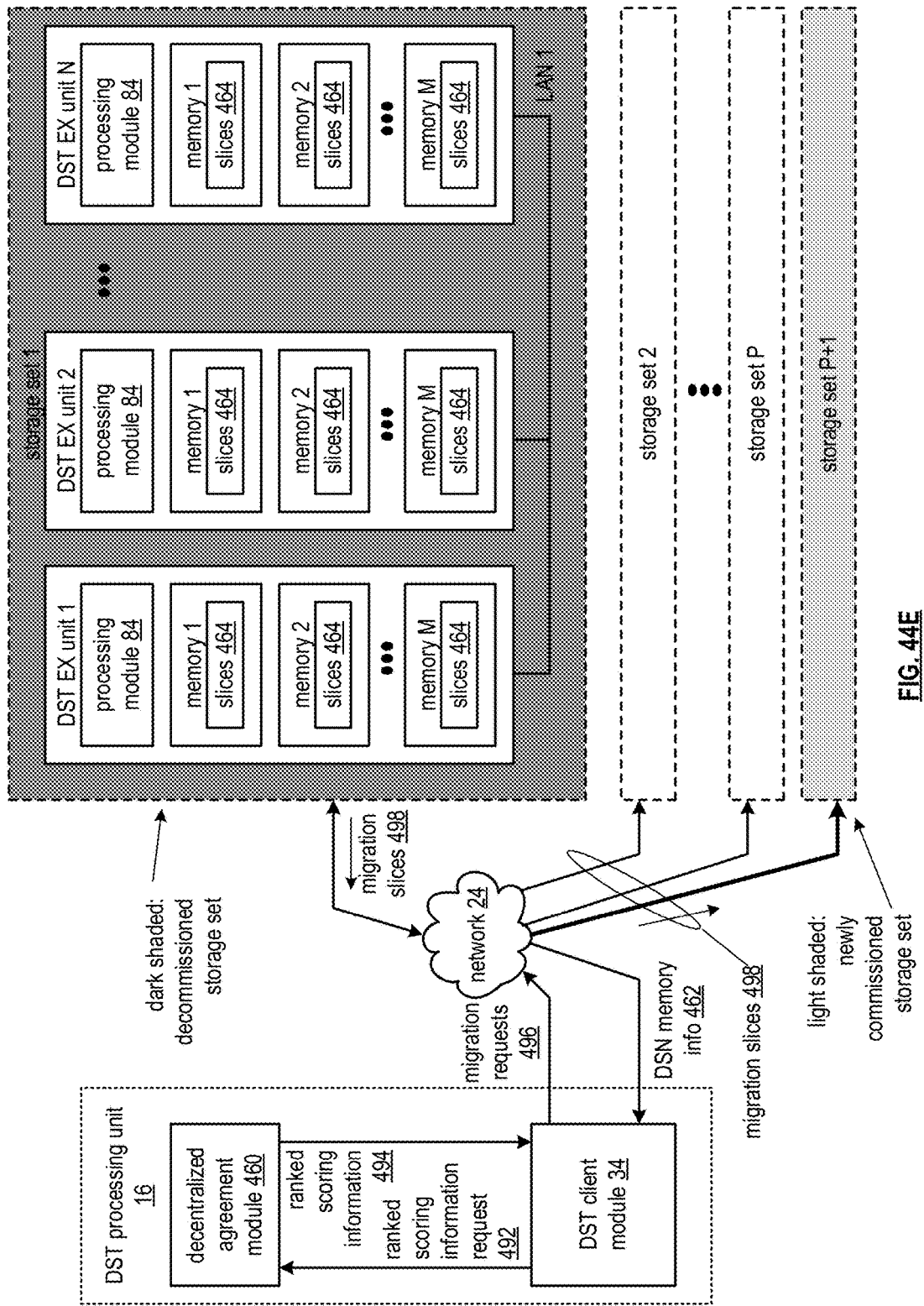
FIG. 44E is a schematic block diagram of another embodiment of a dispersed storage network (DSN) in accordance with the present invention.

FIG. 44E is a schematic block diagram of another embodiment of a dispersed storage network (DSN) that includes the distributed storage and task (DST) processing unit 16 of FIG. 44A, the network 24 of FIG. 44A, the plurality of storage sets 1-P of FIG. 44A, and a newly commissioned storage set P+1. The DST processing unit 16 includes the DST client module 34 of FIG. 44A and the decentralized agreement module 460 of FIG. 44A. Hereafter, the plurality of storage sets may be interchangeably referred to as a DSN memory. Each storage set includes the set of DST execution (EX) units 1-N of FIG. 44A and the local area network (LAN) of FIG. 44A, where each DST execution unit of the set of DST execution units is operably coupled to remaining DST execution units of the set of DST execution units. Each DST execution unit includes the processing module 84 of FIG. 44A and the set of memories 1-M of FIG. 44A. Hereafter, each DST execution unit may be interchangeably referred to as a storage unit and a set of DST execution units may be interchangeably referred to as a set of storage units and/or a storage pool.

The DSN functions to migrate encoded data slices of the DSN in response to identified changes in the DSN memory, where the identified changes in the DSN memory may include one or more of removing a storage set, adding a new storage set, removing a storage unit, adding a new storage unit, decommissioning a memory, and commissioning a new memory.

In an example of steps of operation of the migrating of the encoded data slices, the DST client module 34 identifies the change in the DSN memory of the DSN. The identifying includes one or more of receiving the DSN memory information 462, interpreting an error message, interpreting a commission report, interpreting a deactivation report, interpreting configuration information, initiating a query, and interpreting the received query response. For example, the DST client module 34 receives, via the network 24, DSN memory information 462 from at least one storage unit of the storage set 1, where the DSN memory information 462 indicates that the storage set 1 has been decommissioned and the DST client module 34 receives, via the network 24, further DSN memory information 462 from at least one storage unit of the storage set P+1, where the further DSN memory information 462 indicates that the storage set P+1 has been newly commissioned.

Having detected the change in the DSN memory, the DST client module 34, for a set of encoded data slices of stored encoded data slices 464 effected by the change in the DSN memory (e.g., sets of encoded data slices stored in the storage set 1) where a data segment of a data object is dispersed storage error encoded to produce the set of encoded data slices, ascertains updated properties of the DSN memory, where the updated properties includes the change in the DSN memory (e.g., pool change, storage unit change, memory change, etc.). For example, the DST client module 34 ascertains that the change in the DSN memory includes the storage set 1 being decommissioned and the storage set P+1 being newly commissioned.

The updated properties of the DSN memory may further include changes in weighting factors for one or more resource levels of the DSN memory. For example, the DST client module 34 ascertains that a weighting factor associated with the storage set 1 being decommissioned is updated to zero and a weighting factor associated with the storage set P+1 being newly commissioned is established at a level associated with a newly established storage set (e.g., higher than average based on a higher than average available storage capacity).

Having ascertained the updated properties of the DSN memory, the DST client module 34 performs an updating scoring function using one or more properties of DSN access information of the data segment (e.g., a DSN address, a source name for a plurality of sets of encoded data slices that includes encoded data slices 464 stored in the storage set 1) and one or more properties of the updated properties of the DSN memory to produce an updated storage scoring resultant, where the DSN memory includes the plurality of storage units that are logically arranged into the plurality of storage pools. The performing of the updating scoring function includes the DST client module 34 selecting a resource level (e.g., storage pool level, storage unit level, memory level) and selecting the one or more properties (e.g., associated weighting factors of the DSN resources associated with the selected resource level) of the DSN memory from a plurality of updated properties of the DSN memory based on the selected resource level. For the example, the DST client module 34 selects the storage set level when detecting the commissioning changes of the storage sets 1 and P+1 and selects location weighting factors associated with the plurality of storage sets 1 through P+1.

Having selected the resource level, the DST processing unit 16 calculates, based on the selected resource level, a plurality of storage values based on the one or more properties of the DSN access information and the one or more properties of the updated properties of the DSN memory and performs a ranking function of the plurality of storage values to produce the updated storage scoring resultant. For example, the DST client module 34 issues a ranked scoring information request 492 to the decentralized agreement module 460, where the ranked scoring information request 492 includes one or more of the one or more properties of the DSN access information of the data segment (e.g., a DSN address of the data segment), identifiers of a plurality resources associated with the selected resource level (e.g., identifiers of the storage sets 1 through P+1), and weighting factors of the plurality resources associated with the selected resource level (e.g., updated weighting factors for the storage sets 1 through P+1).

Having received the ranked scoring information request 492, the decentralized agreement module 460 performs a decentralized agreement protocol function on the DSN address, the identifiers of the storage sets 1 through P+1, utilizing the weighting factors of the storage sets 1 through P+1 to produce the plurality of storage values associated with the storage sets 1 through P+1 for the set of encoded data slices. Having produced the plurality of storage values, the decentralized agreement module 460 performs the ranking function to rank order the plurality of storage values associated with the storage sets 1 through P+1 as the updated storage scoring resultant. Having produced the updated storage scoring resultant, the decentralized agreement module 460 issues ranked scoring information 494 to the DST client module 34, where the ranked scoring information 494 includes the updated storage scoring resultant. The generating of the updated storage scoring resultant is discussed in greater detail with reference to FIG. 44F.

Having received the ranked scoring information 494, the DST client module 34 utilizes the updated storage scoring resultant to identify an updated set of storage units of the plurality of storage units affiliated with a given storage pool of the plurality of storage pools when the resource level includes the storage pool level. For example, the DST client module 34 identifies, for a given source name, the storage set P+1 for transfer of encoded data slices 464 from the storage set 1. Having identified the updated set of storage units (e.g., another storage pool when the resource level includes the storage pool level, another storage unit when the resource level includes the storage unit level, a storage unit associated with a plurality of memories when the resource level includes the memory level), the DST client module 34 sends, via the network 24, at least one data migration request 496 to at least one storage unit of the updated set of storage units regarding migration of at least one encoded data slice of the set of encoded data slices.

The sending of the at least one data migration request 496 to the at least one storage unit includes facilitating one or more migration alternatives. A first migration alternative includes migrating the set of encoded data slices as migration slices 498 from a set of storage units in a second storage pool of the plurality of storage pools to the updated set of storage units (e.g., migrating slices 464 from storage set 1 to storage set P+1). A second migration alternative includes migrating an encoded data slice as the migration slices 498 of the at least one encoded data slice from a storage unit of an original set of storage units in the storage pool to a storage unit of the at least one storage unit. A third migration alternative includes migrating an encoded data slice as the migration slices 498 of the at least one encoded data slice from a first memory device of the at least one storage unit to a second memory device of the at least one storage unit.

A fourth migration alternative includes sending a data migration request of the at least one data migration request 496 to a storage unit of the at least one storage unit and to another storage unit of the plurality of storage units, where the other storage unit currently stores an encoded data slice of the at least one encoded data slice that is to be migrated to the storage unit (e.g., same storage unit, but different memory within the storage unit; different storage units in same storage pool; different storage units in different pools). The DST client module 34 may identify the other storage unit by performing a scoring function using the one or more properties of DSN access information of the data segment and one or more non-updated properties of the DSN memory to produce a storage scoring resultant (e.g., obtaining further ranked scoring information 494 from the decentralized agreement module 460 associated with previous weighting factors of the DSN resources of the selected resource level). Having performed the scoring function, the DST client module 34 utilizes the storage scoring resultant to identify a non-updated set of storage units of the plurality of storage units (e.g., previous storage locations) and utilizes a particular property of the DSN access information (e.g., the DSN address) to identify the other storage unit.

Alternatively, a storage unit of the at least one storage unit determines a current storage location within the DSN memory of an encoded data slice of the at least one encoded data slice. As a specific example, the storage unit performs the scoring function using the one or more properties of DSN access information (e.g., the DSN address) of the data segment and one or more non-updated properties (e.g., previous weighting factors) of the DSN memory to produce a storage scoring resultant (e.g., previous storage values), utilizes the storage scoring resultant to identify a non-updated set of storage units of the plurality of storage units (e.g., a previous storage set), and utilizes a particular property of the DSN access information to identify the current storage location. The particular property enables identification of the DSN address for the particular encoded data slice.

Figure 44F:
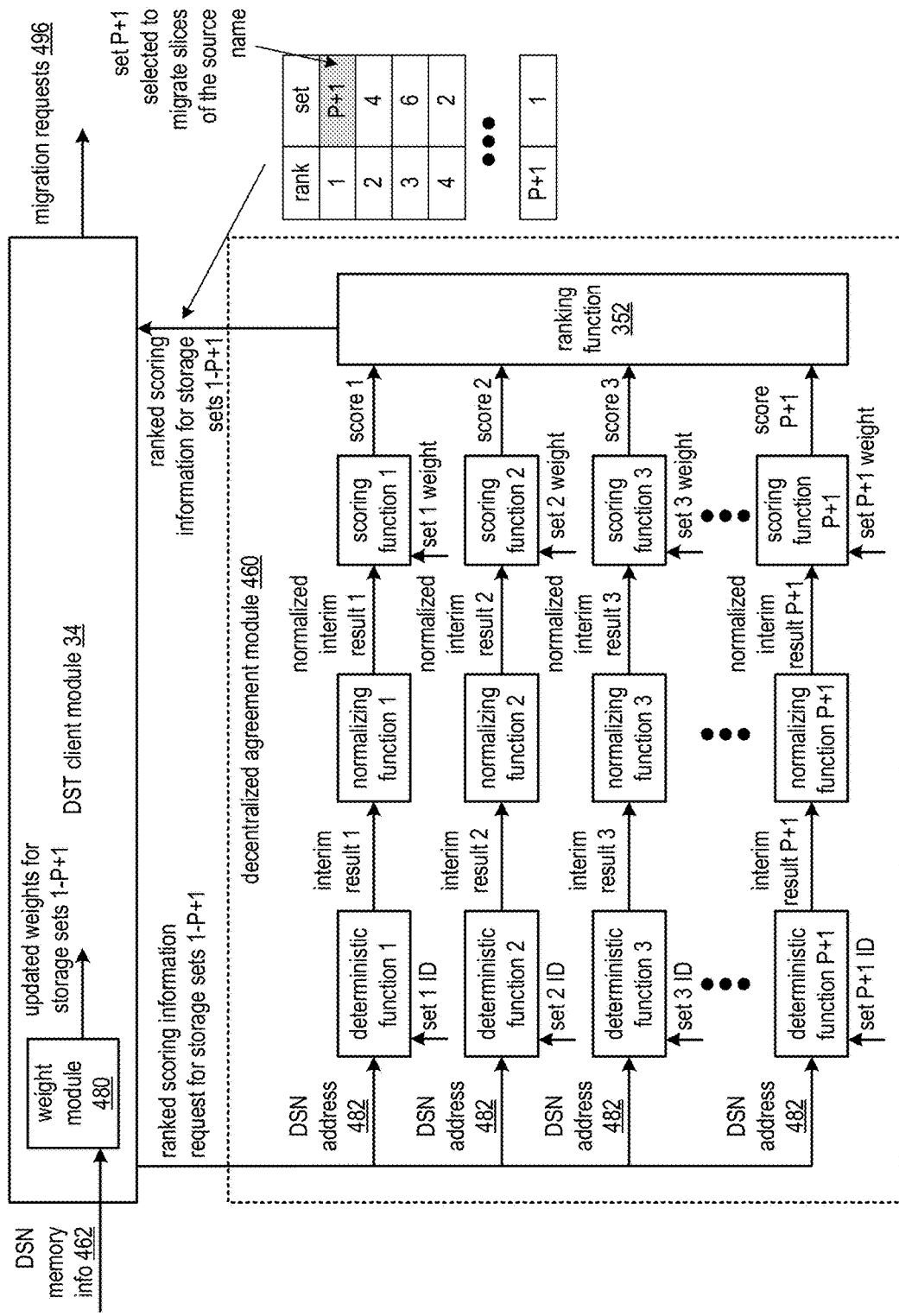
FIG. 44F is a schematic block diagram of another embodiment of a distributed storage and task (DST) processing unit in accordance with the present invention.

FIG. 44F is a schematic block diagram of another embodiment of a distributed storage and task (DST) processing unit 16 of FIG. 44E that includes the DST client module 34 of FIG. 44E and the decentralized agreement module 460 of FIG. 44E. The DST client module 34 includes the weight module 480 of FIG. 44B. The decentralized agreement module 460 includes a plurality of deterministic functions 1-P+1, a plurality of normalizing functions 1-P+1, a plurality scoring functions 1-P+1, and the ranking function 352 of FIG. 40A. Each deterministic function may be implemented utilizing the deterministic function of the decentralized agreement module 350 of FIG. 40A. Each normalizing function may be implemented utilizing the normalizing function of the decentralized agreement module 350 of FIG. 40A. Each scoring function may be implemented utilizing the scoring function of the decentralized agreement module 350 of FIG. 40A.

FIG. 44F further illustrates the steps of the example of operation of the migrating of the encoded data slices of FIG. 44E where the DST client module 34 selects the storage pool (e.g., storage set) level as the resource level. Having selected the storage pool level, the weight module 480 of the DST client module 34 receives the DSN memory information 462 and performs a weighting factor updating function on weighting factors of the DSN resources associated with the selected resource level to produce updated weighting factors, where the weighting factor updating function is based on the DSN memory information 462. For example, the weight module 480 performs the weighting factor updating function on weighting factors of the storage sets 1 through P+1 of FIG. 44E in accordance with the DSN memory information 462 (e.g., decommissioned storage set 1, commission new set P+1) to produce updated weights for the storage sets 1 through P+1 (e.g., zero out weighting factor associated with decommissioned storage set 1, establish a weighting factor associated with newly commissioned storage set P+1).

Having produced the updated weighting factors, the DST client module 34 selects a storage set identifier and a corresponding updated weighting factor for each of the storage sets 1 through P+1 to produce a plurality of storage set identifiers and a plurality of updated storage set weighting factors, where the updated properties of DSN memory includes the plurality of storage set identifiers and the plurality of updated storage set weighting factors. Having selected the identifiers and weighting factors, the DST client module 34 selects the DSN address 482 (e.g., source name) of the DSN access properties as the one or more properties of the DSN access information. Having selected the DSN address 482, the DST client module 34 issues a ranked scoring information request for storage sets 1 through P+1 to the decentralized agreement module 460.

The decentralized agreement module 460 performs a series of functions on the DSN address 482 based on the identifiers and the plurality of weighting factors to produce a plurality of storage values (e.g., scores 1 through P+1). For example, for each storage set, a deterministic function performs a hashing type deterministic function on an identifier of a combination of a storage set identifier concatenated with the DSN address 482 to produce an interim result, the normalizing function performs the normalizing function on the interim result to produce a normalized interim result, the scoring function performs a scoring function on the normalized interim result and the weight associated with the storage unit to produce a score of the plurality of storage values (e.g., scores 1 through P+1).

Having produced the plurality of storage values, the decentralized agreement module 460 performs a ranking function of the plurality of storage value to produce the storage scoring resultant. For example, the ranking function 352 ranks scores associated with storage sets by score to produce ranked scoring information for storage sets 1 through P+1. For instance, the ranking function 352 produces the storage scoring resultant that indicates that newly commissioned storage set P+1 is associated with a highest score. Having produced the storage scoring resultant, the decentralized agreement module 460 sends the storage scoring resultant to the DST client module 34. Having received the storage scoring resultant, the DST client module 34 utilizes the storage scoring resultant to generate the migration requests 496 based on identifying a storage set associated with a highest storage value of the storage scoring resultant.

Figure 44G:
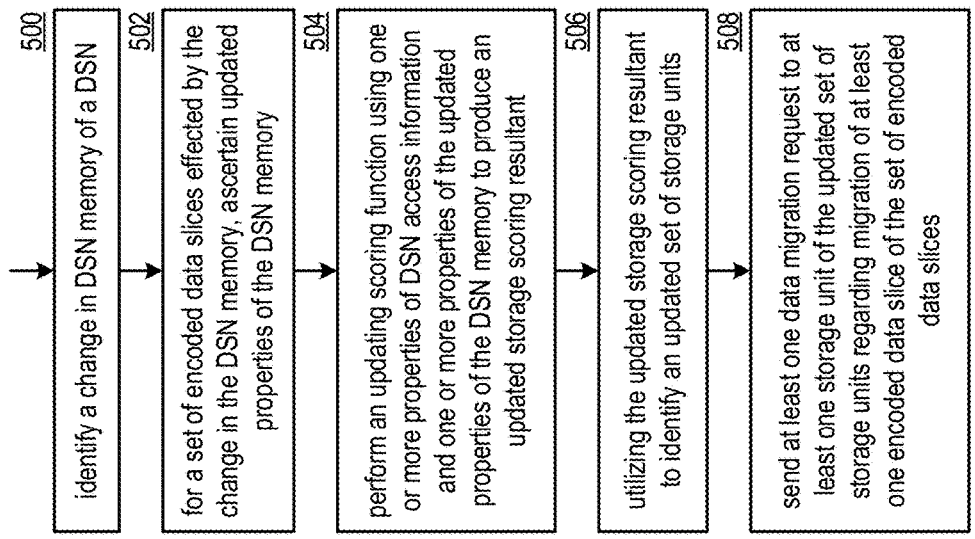
FIG. 44G is a flowchart illustrating an example of migrating encoded data slices in a dispersed storage network (DSN) memory in accordance with the present invention.

FIG. 44G is a flowchart illustrating an example of migrating encoded data slices in a dispersed storage network (DSN) memory. In particular, a method is presented for use in conjunction with one or more functions and features described in conjunction with FIGS. 1-39, 44A-F, and also FIG. 44G. The method begins at step 500 where a processing module of a computing device of one or more computing devices of a dispersed storage network (DSN) identifies a change in DSN memory of the DSN. The method continues at step 502 where the processing module, for a set of encoded data slices effected by the change in the DSN memory, where a data segment of a data object is dispersed storage error encoded to produce the set of encoded data slices, ascertains updated properties of the DSN memory, where the updated properties includes the change in the DSN memory.

The method continues at step 504 where the processing module performs an updating scoring function using one or more properties of DSN access information (e.g., a DSN address) of the data segment and one or more properties of the updated properties of the DSN memory to produce an updated storage scoring resultant, where the DSN memory includes a plurality of storage units that are logically arranged into a plurality of storage pools. The performing of the updating scoring function may further include selecting a resource level and selecting the one or more properties of the DSN memory from a plurality of updated properties of the DSN memory based on the selected resource level. Having selected the resource level, the processing module calculates, based on the selected resource level, a plurality of storage values based on the one or more properties of the DSN access information and the one or more properties of the updated properties of the DSN memory, and performs a ranking function of the plurality of storage values to produce the updated storage scoring resultant.

The method continues at step 506 where the processing module utilizes the updated storage scoring resultant to identify an updated set of storage units of the plurality of storage units affiliated with a given storage pool of the plurality of storage pools. The method continues at step 508 where the processing module sends at least one data migration request to at least one storage unit of the updated set of storage units regarding migration of at least one encoded data slice of the set of encoded data slices.

The sending the at least one data migration request to the at least one storage unit includes one or more migration alternatives. A first migration alternatives includes migrating the set of encoded data slices from a set of storage units in a second storage pool of the plurality of storage pools to the updated set of storage units. A second migration alternatives includes migrating an encoded data slice of the at least one encoded data slice from a storage unit of an original set of storage units in the storage pool to a storage unit of the at least one storage unit. A third migration alternatives includes migrating an encoded data slice of the at least one encoded data slice from a first memory device of the at least one storage unit to a second memory device of the at least one storage unit. A fourth migration alternatives includes sending a data migration request of the at least one data migration request to a storage unit of the at least one storage unit and to another storage unit of the plurality of storage units, where the other storage unit currently stores an encoded data slice of the at least one encoded data slice that is to be migrated to the storage unit.

The identifying the other storage unit may include one or more of performing a scoring function using the one or more properties of DSN access information of the data segment and one or more non-updated properties of the DSN memory to produce a storage scoring resultant, utilizing the storage scoring resultant to identify a non-updated set of storage units of the plurality of storage units, and utilizing a particular property of the DSN access information to identify the other storage unit.

Alternatively, or in addition to, the storage unit of the at least one storage unit determines a current storage location within the DSN memory of an encoded data slice of the at least one encoded data slice by one or more of performing a scoring function using the one or more properties of DSN access information of the data segment and one or more non-updated properties of the DSN memory to produce a storage scoring resultant, utilizing the storage scoring resultant to identify a non-updated set of storage units of the plurality of storage units, and utilizing a particular property of the DSN access information to identify the current storage location.

The method described above in conjunction with the processing module can alternatively be performed by other modules of the dispersed storage network or by other devices. In addition, at least one memory section (e.g., a non-transitory computer readable storage medium) that stores operational instructions can, when executed by one or more processing modules of one or more computing devices of the dispersed storage network (DSN), cause the one or more computing devices to perform any or all of the method steps described above.

Figure 45A:
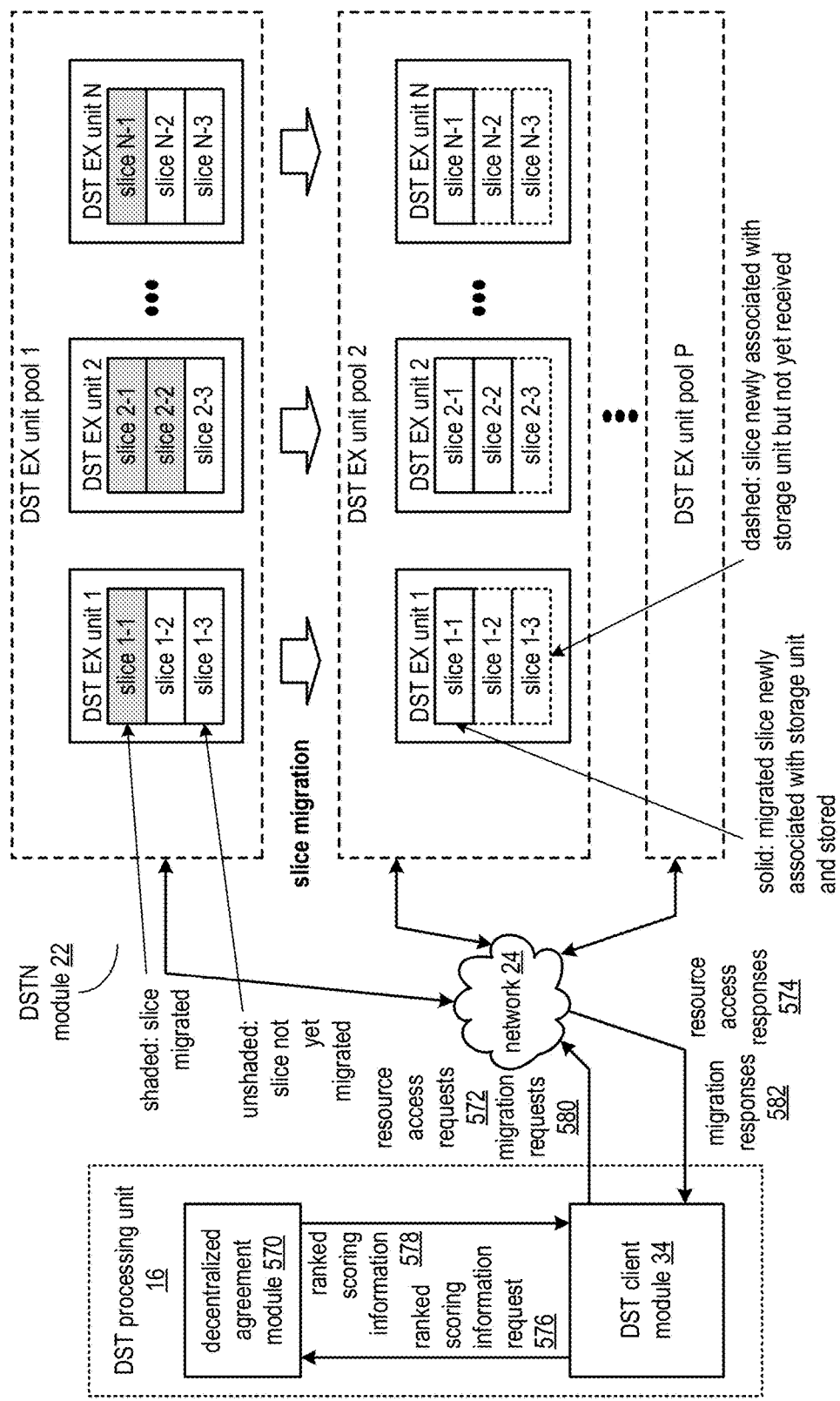
FIG. 45A is a schematic block diagram of another embodiment of a dispersed storage network (DSN) in accordance with the present invention.

FIG. 45A is a schematic block diagram of another embodiment of a dispersed storage network (DSN) that includes a distributed storage and task (DST) processing unit 16, the network 24 of FIG. 1, and a distributed storage and task network (DSTN) module 22. The DST processing module 16 includes the DST client module 34 of FIG. 1 and a decentralized agreement module 570. The decentralized agreement module 570 may be implemented utilizing the decentralized agreement module 350 of FIG. 40A. The DSTN module 22 includes a plurality of DST execution (EX) unit pools 1-P. Each DST execution unit pool includes a set of DST execution units 1-N. Each DST execution unit may be implemented utilizing the DST execution unit 36 of FIG. 1. Hereafter, each DST execution unit may be interchangeably referred to as a storage unit.

The DSN functions to access data stored in one or more of the DST execution unit pools and to migrate encoded data slice assets from a first DST execution unit pool to a second DST execution unit pool. The DST client module 34 dispersed storage error encodes the data to produce a plurality of sets of encoded data slices for storage in the set of DST execution units of the DST execution unit pool 1. For example, encoded data slices 1-1 through N-1 corresponding to a first set of encoded data slices are stored in the DST execution units 1-N of the DST execution unit pool 1, encoded data slices 1-2 through N-2 corresponding to a second set of encoded data slices are stored in the DST execution units 1-N of the DST execution unit pool 1, etc.

In an example of operation, the plurality of sets of encoded data slices stored in the DST execution units 1-N of the DST execution unit pool 1 are in the process of being migrated to the DST execution units 1-N of the DST execution unit pool 2. For example, the DST client module 34 issues migration requests 580 to the DST execution units of the DST execution unit pools 1 and 2 and receives migration responses 582 in accordance with progress of migration. For instance, the progress of migration, at a given point in time during the migration, indicates that all N encoded data slices of the first set of encoded data slices have been migrated, only encoded data slice 2-2 of the second set of encoded data slices has been migrated, and none of the encoded data slices of a third set of encoded data slices have been migrated.

During the migration, a DST execution unit receives a resource access request 572, where the resource access request 572 includes a read slice request for an encoded data slice. The DST execution unit determines whether the DST execution unit is associated with the encoded data slice. For example, the DST execution unit performs a decentralized agreement function using a slice name associated with encoded data slice, location IDs associated with other DST execution units, and utilizing current location weights associated with the DST execution units to produce ranked scoring information 578. The DST execution unit indicates an affirmative association when a highest score of the ranked scoring information is associated with the DST execution unit. Alternatively, the DST client module 34 facilitates performing of the decentralized agreement function by the decentralized agreement module 570 by issuing a ranked scoring information request 576 to the decentralized agreement module 570 and receiving the ranked scoring information 578 in response.

When the DST execution unit is associated with encoded data slice, the DST execution unit issues a resource access response 574 that includes the encoded data slice when the encoded data slices available from a memory of the DST execution unit. When the DST execution unit is associated with the encoded data slice and the encoded data slice is unavailable from memory of the DST execution unit, the DST execution unit identifies a previous DST execution unit associated with encoded data slice. For example, the DST execution unit performs the decentralized agreement function utilizing a previous location weights to produce previous ranked scoring information. Alternatively, the DST execution unit retrieves previous ranked scoring information to identify a DST execution unit associated with a highest score of the previous ranked scoring information as the previous DST execution unit.

Having identified the previous DST execution unit, the DST execution unit obtains the encoded data slice from the previous DST execution unit. For example, the DST execution unit issues a read slice request that includes the slice name to the previous DST execution unit and receives the encoded data slice. Having received the encoded data slice, the DST execution unit stores the received encoded data slice in a local memory of the DST execution unit. Having stored the received encoded data slice, the DST execution unit issues a resource access response 574 that includes the encoded data slice.

Figure 45B:
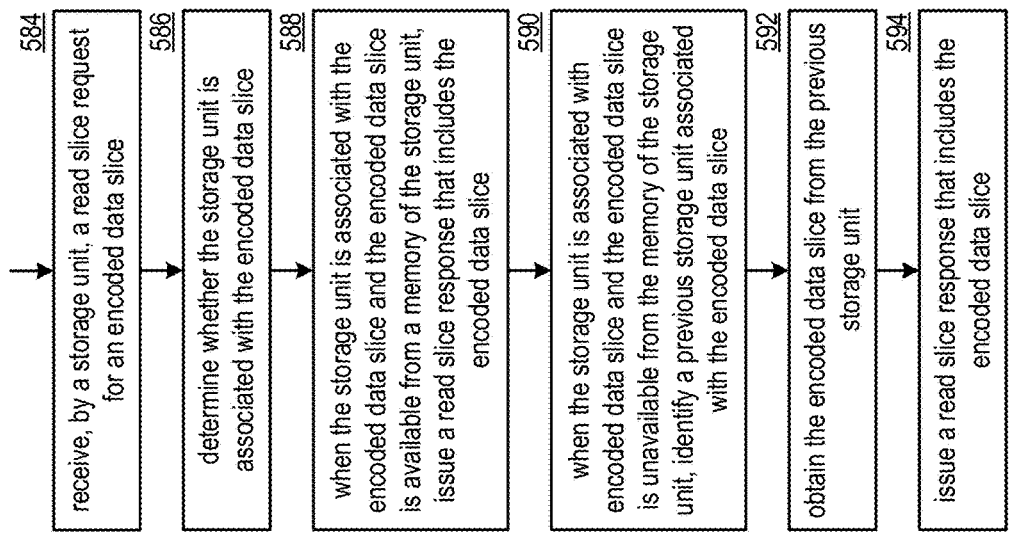
FIG. 45B is a flowchart illustrating an example of recovering a stored encoded data slice in accordance with the present invention.

FIG. 45B is a flowchart illustrating an example of recovering a stored encoded data slice. The method begins or continues at step 584 where a processing module (e.g., of a storage unit) receives, by the storage unit, a read slice request for an encoded data slice. For example, the processing module extracts a slice name associated with encoded data slice from the read slice requests. The method continues at step 586 where the processing module determines whether the storage unit is associated with the encoded data slice. For example, the processing module performs a decentralized agreement function using the slice name as an asset identifier with regards to the storage unit and other storage units of a dispersed storage network memory utilizing current location weights to produce ranked scoring information. The processing module indicates an association when a highest score is associated with the storage unit.

When the storage unit is associated with the encoded data slice and encoded data slices available from the memory of the storage unit, the method continues at step 588 where the processing module issues a read slice response that includes the encoded data slice. For example, the processing module generates a read slice response that includes the encoded data slice and sends the read slice response to a requesting entity.

When the storage unit associated with the encoded data slice and the encoded data slice is unavailable from the memory of the storage unit, the method continues at step 590 where the processing module identifies a previous storage unit associated with the encoded data slice. For example, the processing module performs the decentralized agreement function using the slice name with regards to the storage unit and the other storage units of the DSN memory utilizing a previous location weights to produce previous ranked scoring information. The processing module identifies another storage unit associated with a highest score of the previous ranked scoring information as the previous storage unit.

The method continues at step 592 where the processing module obtains the encoded data slice from the previous storage unit. For example, the processing module generates a read slice requests that includes the slice name of the encoded data slice, sends the read slice request to the previous storage unit, receives a read slice response that includes the encoded data slice, and stores the encoded data slice in the memory of the storage unit.

The method continues at step 594 where the processing module issues a read slice response that includes the encoded data slice. For example, the processing module generates a read slice response that includes encoded data slice and sends the read slice response to the requesting entity.

Figure 46A:
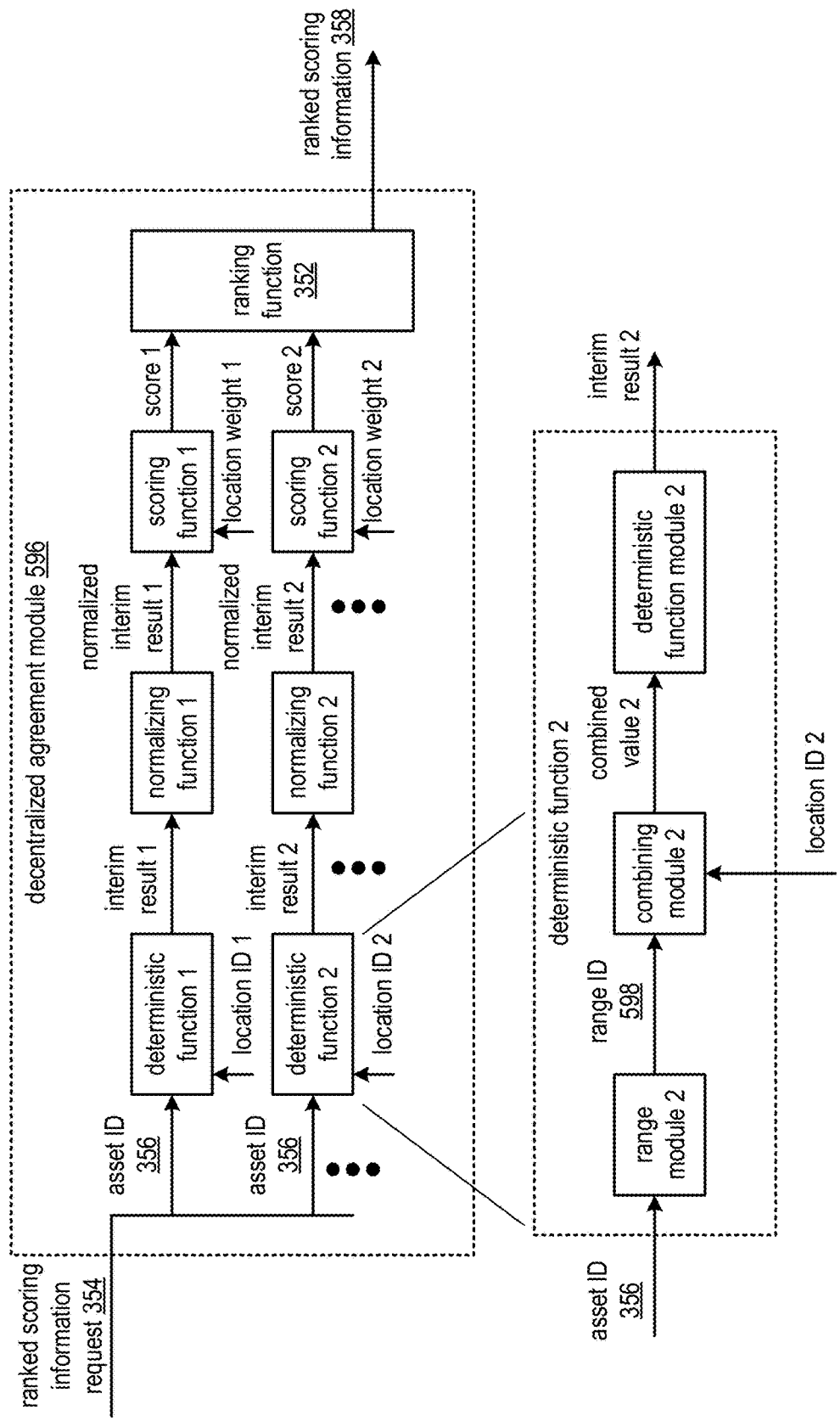
FIG. 46A is a schematic block diagram of another embodiment of a decentralized agreement module in accordance with the present invention.

FIG. 46A is a schematic block diagram of another embodiment of a decentralized agreement module 596 that includes a plurality of deterministic functions, the de-normalizing functions of FIG. 40A, the scoring functions of FIG. 40A, and the ranking function 352 of FIG. 40A. Each deterministic function includes a range module, a combining module, and a deterministic function module. The decentralized agreement module 596 receives the ranked scoring information request 354 of FIG. 40A and generates the ranked scoring information 358 of FIG. 40A.

In an example of operation, the decentralized agreement module 596 receives the ranked scoring information request 354 from a requesting entity. Having received the ranked scoring information request 354, the range module converts an asset identifier (ID) 356 of the ranked scoring information request 354 into a range identifier 598. The converting includes at least one of deleting one or more least significant bytes, performing a lookup, and performing an alternate deterministic function where a number of bits of the range identifier is less than a number of bits of the asset ID. For example, range module 2 deletes 4 least significant bytes of the asset ID to produce the range ID.

For each location ID associated with the range identifier 598, each combining module combines the range ID 598 and a corresponding location ID to produce a corresponding combined value. For example, combining module 2 combines the range ID and location ID 2 to produce combined value 2. The deterministic function module performs a deterministic function on the combined value to produce a corresponding interim result. For example, deterministic function module 2 performs the deterministic function on the combined value 2 to produce an interim result 2.

For each interim result, each normalizing function performs a normalizing function on the interim result to produce a corresponding normalizing to result. For each normalized interim result, each scoring function performs a scoring function on a corresponding normalized interim result using the location weight associated with the location ID associated with the normalized interim result to produce a score of a set of scores. The ranking function 352 orders the set of scores by associated location ID to produce the ranked scoring information 358 for output to the requesting entity.

Figure 46B:
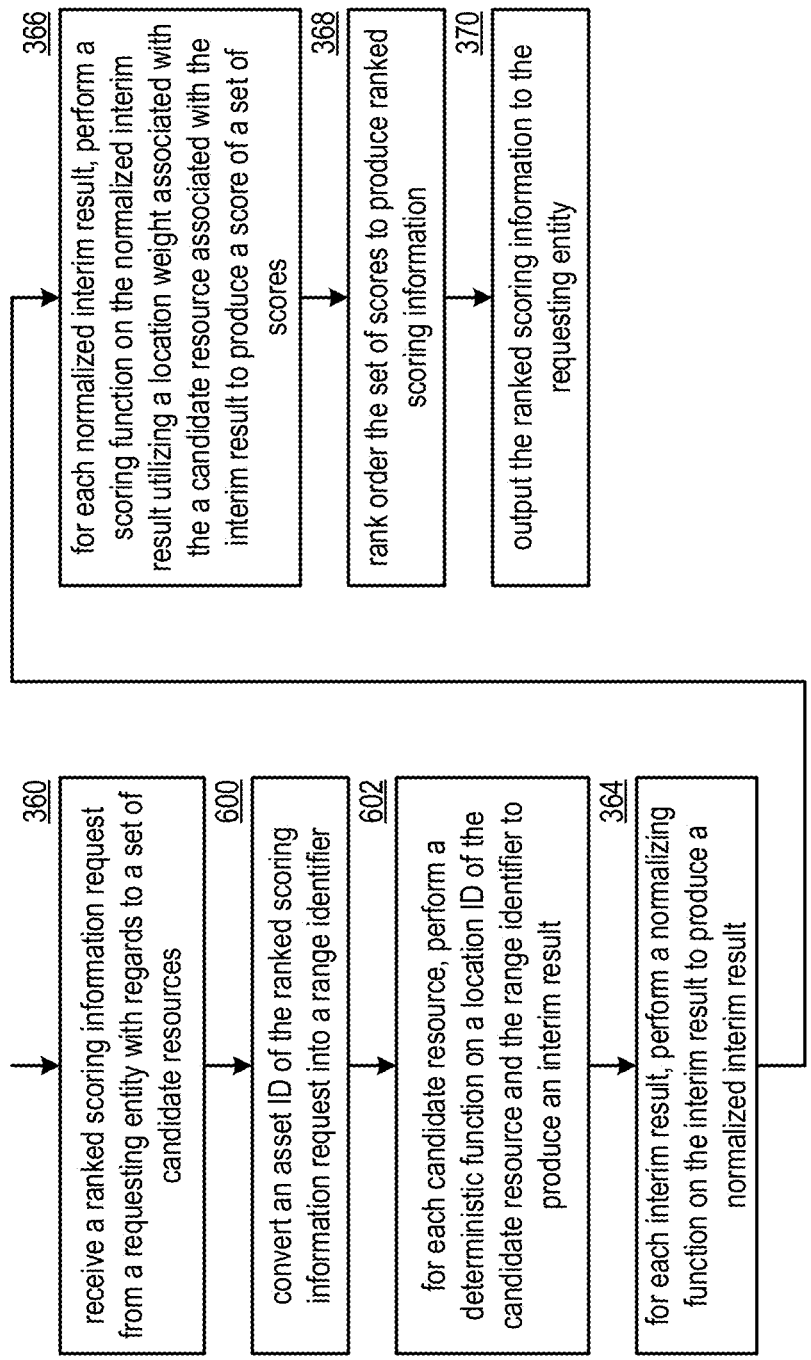
FIG. 46B is a flowchart illustrating another example of selecting a resource in accordance with the present invention.

FIG. 46B is a flowchart illustrating another example of selecting a resource, that includes similar steps to FIG. 40B. The method begins or continues with step 360 of FIG. 40B where a processing module (e.g., of a decentralized agreement module) receives a ranked scoring information request from a requesting entity with regards to a set of candidate resources. The method continues at step 600 where the processing module converts an asset identifier (ID) of the ranked scoring information request into a range identifier (ID). For example, the processing module reduces the number of bits of the asset ID in accordance with a reduction approach to produce the range identifier. In an instance of the reducing, the processing module identifies an asset ID type (e.g., source name, slice name), determines the reduction approach based on the asset ID type (e.g., delete a least significant two bytes for a source name type, delete a segment number field for a slice name type), and performs the reduction based on the reduction approach.

For each candidate resource, the method continues at step 602 where the processing module performs a deterministic function on a location ID of the candidate resource and the range identifier to produce an interim result. For example, the processing module combines and/or concatenates the range identifier and the location ID of the candidate resource to produce a combined value and performs the deterministic function on the combined value to produce the interim result. The method continues with step 364-370 of FIG. 40B where, for each interim result, the processing module performs a normalizing function on the interim result to produce a normalized interim result; for each normalized interim result, performs a scoring function on the normalized interim result utilizing a location weight associated with a candidate resource associated with the interim result to produce a score of a set of scores; rank orders the set of scores to produce ranked scoring information; and outputs the rank scoring information to the requesting entity.

Figure 47A:
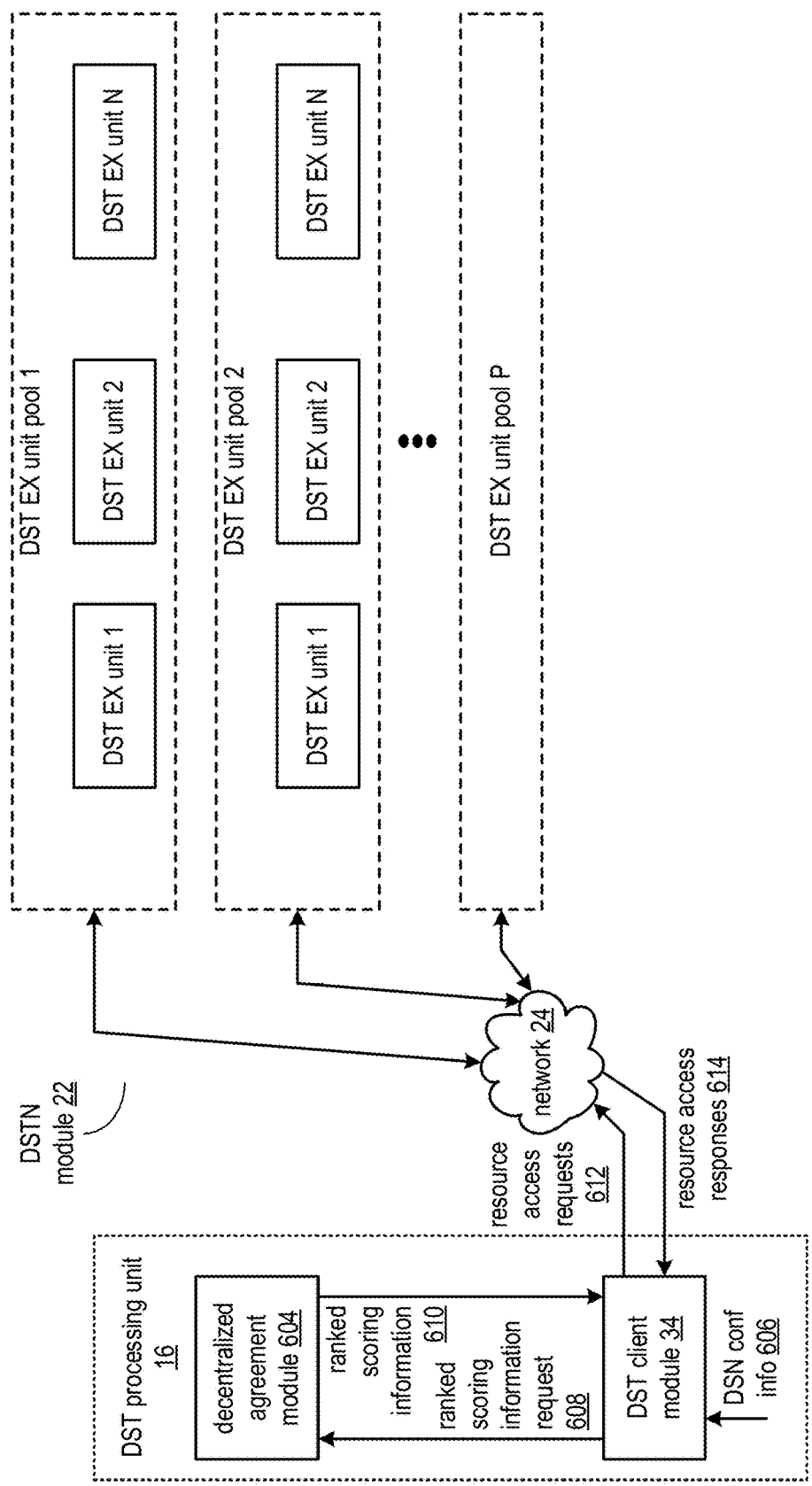
FIG. 47A is a schematic block diagram of another embodiment of a dispersed storage network (DSN) in accordance with the present invention.

FIG. 47A is a schematic block diagram of another embodiment of a dispersed storage network (DSN) that includes a distributed storage and task (DST) processing unit 16, the network 24 of FIG. 1, and the distributed storage and task network (DSTN) module 22 of FIG. 45A. The DST processing unit 16 includes the DST client module 34 of FIG. 1 and a decentralized agreement module 604. The decentralized agreement module 604 may be implemented utilizing the decentralized agreement module 350 of FIG. 40A. The DSN functions to access data stored in the DSTN module 22 in accordance with a decentralized agreement function.

In an example of operation, the DST client module 34 determines to retrieve an encoded data slice associated with a slice name (e.g., receiving a request, identify required data). The DST client module 34 obtains DSN configuration information 606. The obtaining includes at least one of retrieving from a local memory, recovering from the DSTN module 22, and receiving. The DSN configuration information 606 includes information with regards to modifications to a DSN configuration. The modifications include one or more of current resources and location weights, previous resources and previous location weights, utilization history resources, and migration cursor DSN address value for active slice migrations.

Having obtained the DSN configuration information 606, the DST client module 34 identifies one or more configurations of the DSN configuration information 606, where the one or more configurations include a current configuration. Each configuration includes a list of resources and associated location weights. For each configuration, the DST client module 34 determines ranked scoring information 610 for a plurality of resources of the configuration with regards to the slice name as an asset ID. For example, the DST client module 34 issues a ranked scoring information request 608 to the decentralized agreement module 604 and receives the ranked scoring information 610, where the ranked scoring information request 608 includes the asset ID and the DSN configuration information.

For each configuration, the DST client module 34 selects a resource based on associated ranked scoring information 610 for the plurality resources of the configuration, where the plurality of resources includes the selected resource (e.g., selected resource is associated with a highest score). Having selected the resource, the DST client module 34 determines a likelihood level for each selected resource of each configuration. The determining includes calculating a probability that the encoded data slice is retrievable from the selected resource-based on one or more of a migration status, resource availability indicator, and a resource utilization history.

Having determined the likelihood level for each selected resource, the DST client module 34 identifies one or more of the selected resources for slice retrieval based on the likelihood level for each selected resource. For example, the DST client module 34 selects a first m number of resources associated with a highest probabilities. As another example, the DST client module 34 selects those resources associated with probabilities greater than a probability threshold level.

Having identified the one or more of the selected resources for slice retrieval, the DST client module 34 issues read slice requests as resource access requests 612 to the identified one or more selected resources requesting retrieval of the encoded data slice. The DST client module 34 receives at least one resource access response 614 that includes at least one read slice response, where the at least one read slice response includes encoded data slice.

Figure 47B:
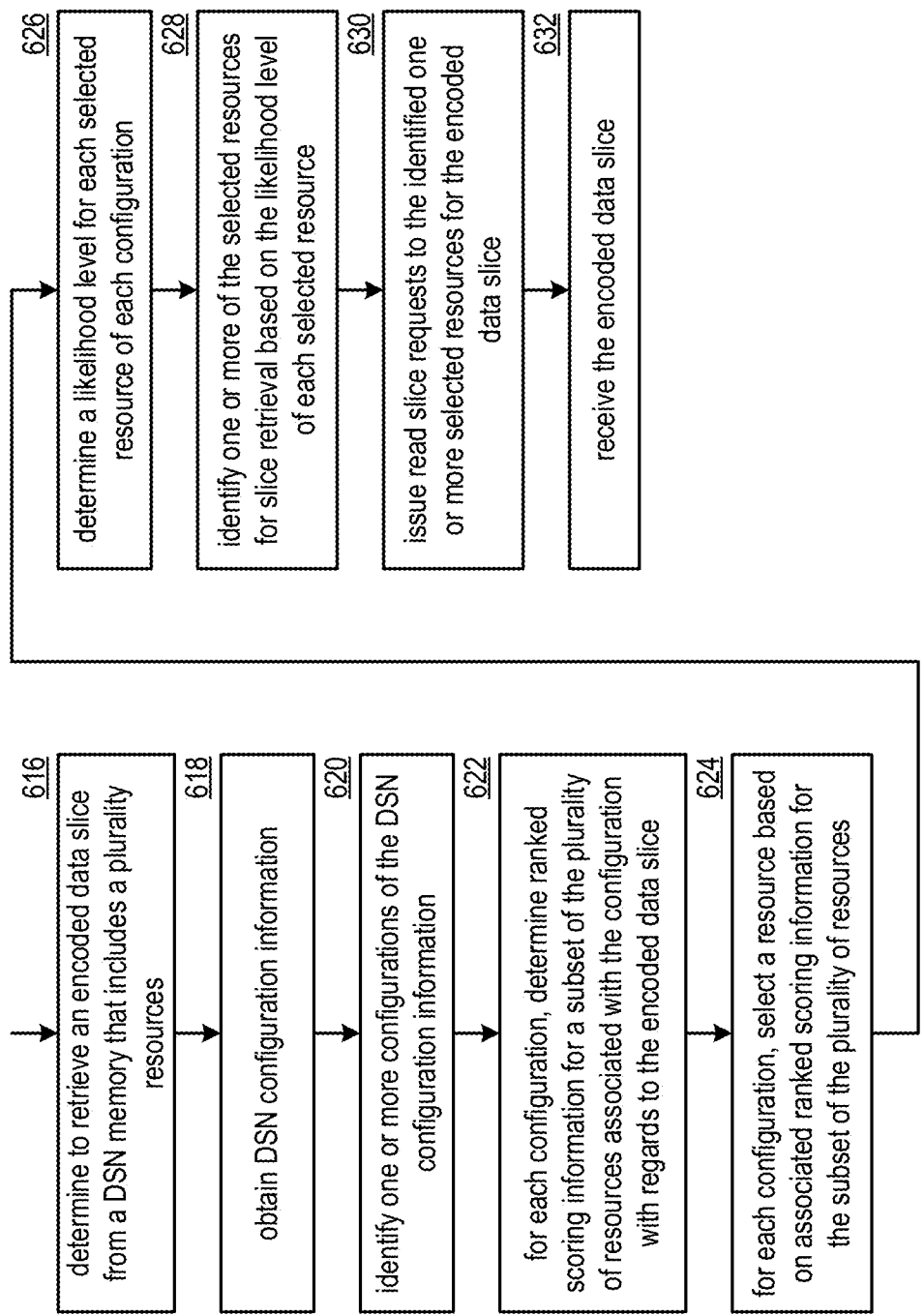
FIG. 47B is a flowchart illustrating another example of selecting a resource in accordance with the present invention.

FIG. 47B is a flowchart illustrating another example of selecting a resource. The method begins or continues at step 616 where a processing module (e.g., of a distributed storage and task (DST) client module) determines to retrieve an encoded data slice from a dispersed storage network (DSN) memory that includes a plurality of resources (e.g., a plurality of storage units). The determining includes one or more of receiving a request, identifying required data, and performing a lookup of a DSN address of the encoded data slice.

The method continues at step 618 where the processing module obtains DSN configuration information. The obtaining the DSN configuration information includes at least one of recovering from the DSN memory, receiving, and retrieving from a local memory. The method continues at step 620 where the processing module identifies one or more configurations of the DSN configuration information. The identifying includes at least one of extracting a current configuration, extracting previous configurations, and extracting resource utilization history.

For each configuration, the method continues at step 622 where the processing module determines ranked scoring information for a subset of the plurality of resources associated with the configuration with regards to the encoded data slice. The determining includes utilizing a decentralized agreement function based on configuration information of the configuration and a slice name of the encoded data slice. For each configuration, the method continues at step 624 where the processing module selects a resource based on associated ranked scoring information for the subset of the plurality of resources. For example, the processing module identifies a resource associated with a highest score of the rank scoring information. As another example, the processing module identifies more than one resource by identifying a second resource with a next highest score.

The method continues at step 626 where the processing module determines a likelihood level for each selected resource of each configuration. For example, the processing module calculates a retrieval probability level from the selected resource. The method continues at step 628 where the processing module identifies one or more of the selected resources for slice retrieval based on the likelihood level of each selected resource. The identifying may be in accordance with a selection method. For example, the processing module selects m number of top-ranked resources. As another example, the processing module selects those resources with a likelihood level greater than a likelihood threshold level.

The method continues at step 630 where the processing module issues read slice requests to the identified one or more selected resources for the encoded data slice. For example, the processing module generates the read slice request to include the slice name and sends the read slice request to each of the identified one or more selected resources. The method continues at step 632 where the processing module receives encoded data slice from at least one of the identified one or more selected resources.

Figure 48A:
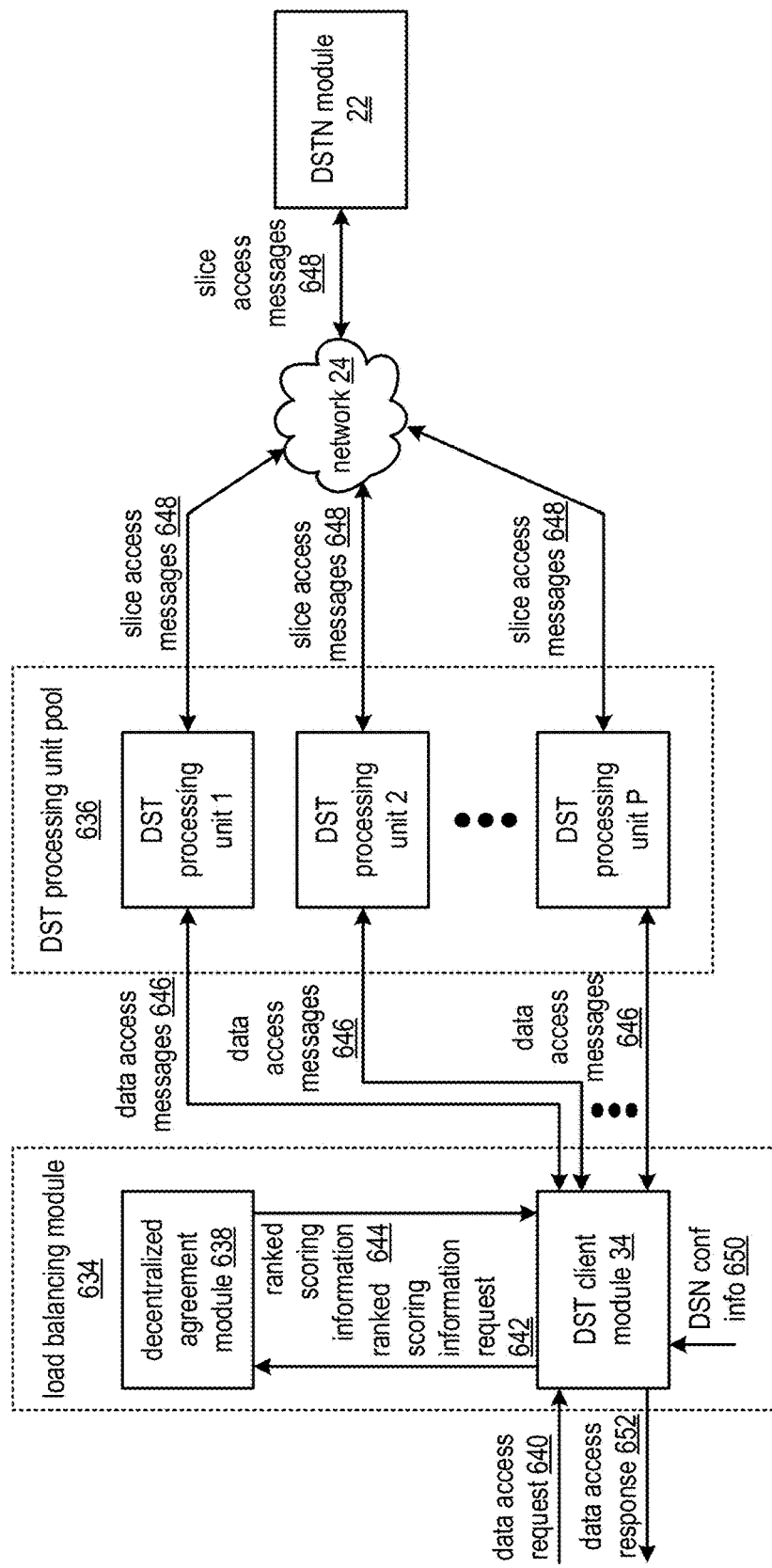
FIG. 48A is a schematic block diagram of another embodiment of a dispersed storage network (DSN) in accordance with the present invention.

FIG. 48A is a schematic block diagram of another embodiment of a dispersed storage network (DSN) that includes a load-balancing module 634, a distributed storage and task (DST) processing unit pool 636, the network 24 of FIG. 1, and the DSTN module 22 of FIG. 1. The load-balancing module 634 includes a decentralized agreement module 638 and the DST client module 34 of FIG. 1. The load-balancing module 634 may be implemented utilizing the DST processing unit 16 of FIG. 1. The decentralized agreement module 638 may be implemented utilizing the decentralized agreement module 350 of FIG. 40A. The DST processing unit pool 636 includes a plurality of DST processing units 1-P. Each DST processing unit may be implemented utilizing the DST processing unit 16 of FIG. 1.

The DSN functions to access data stored in the DSTN module 22. The accessing of the data utilizes a decentralized agreement function to select at least one DST processing unit of the DST processing unit pool to facilitate the accessing of the data. In an example of operation, the DST client module 34 receives a data access request 640 regarding the data stored in the DSTN module 22. The data access request 640 includes a data name associated with the data. Having received the data access request 640, the DST client module 34 determines DSN addressing information of the data access request. The DSN addressing information includes at least one of a source name range, a source name, and a slice name. The determining may be based on one or more of generating when the data access request includes a store data request and performing a lookup utilizing the data name when the data access request includes a retrieve data request.

Having determined the DSN addressing information, the DST client module 34 obtains DSN configuration information 650 that includes access resource configuration information for a plurality of access resources (e.g., DST processing units) with regards to the DSN memory of the DSTN module 22. The DSN configuration information 650 includes one or more of capacity for each access resource, identifiers of the access resources (e.g., individual identifiers of the plurality of DST processing units, an identifier for the pool), and a current loading level of the access resources. The obtaining includes at least one of initiating a query, receiving a query response, performing a lookup, generating, and receiving.

Having obtained the DSN configuration information 650, the DST client module 34 determines ranked scoring information 644 for the plurality of access resources based on the DSN configuration information 650 and the data access request 640. For example, the DST client module 34 issues a ranked scoring information request 642 to the decentralized agreement module 638 and receives the ranked scoring information 644, where each score is calculated as a processing capacity of a resource divided by a negative log of a normalized deterministic function value based on a combination of one or more of a DST processing unit pool identifier, and individual DST processing unit identifier, and the source name as the DSN addressing information.

Having determined the ranked scoring information 644, the DST client module 34 identifies an access resource of the plurality of access resources based on the ranked scoring information 644 to produce a selected access resource. The identifying includes selecting a DST processing unit associated with a highest score of the ranked scoring information 644. Having identified the access resource, the DST client module 34 forwards the data access request as a data access message 646 to the selected access resource, where the selected access resource accesses the DSTN module 22 by issuing a slice access messages 648, receiving other slice access messages section 648, and issuing further data access messages 646 based on received slice access messages 648. Having received the data access messages 646, the DST client module 34 issues a data access response 652 to a requesting entity based on the received data access messages 646. Alternatively, or in addition to, the selected access resource issues the data access response 652 directly to the requesting entity.

Figure 48B:
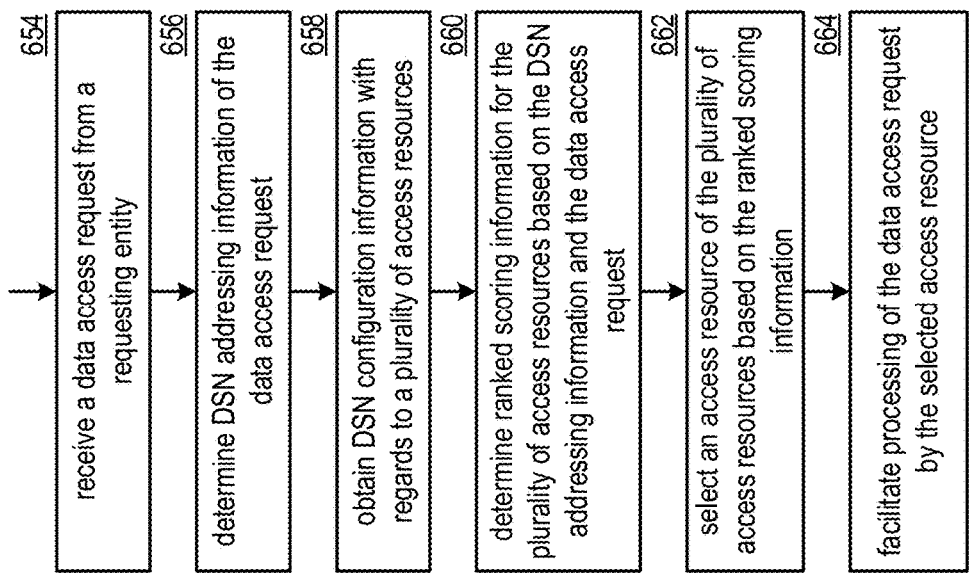
FIG. 48B is a flowchart illustrating an example of selecting an access resource in accordance with the present invention.

FIG. 48B is a flowchart illustrating an example of selecting an access resource. The method begins or continues at step 654 where a processing module (e.g., of a distributed storage and task (DST) client module) receives a data access request from a requesting entity. The data access request includes a data identifier and a requesting entity identifier. The method continues at step 656 where the processing module determines dispersed storage network (DSN) addressing information of the data access request. The determining includes at least one of generating and performing a lookup using the data identifier.

The method continues at step 658 where the processing module obtains DSN configuration information with regards to a plurality of access resources. For example, the processing module recovers the DSN configuration information from DSN memory. As another example, the processing module accesses a local file. As yet another example, the processing module extracts the DSN configuration information from the data access request.

The method continues at step 660 where the processing module determines ranked scoring information for the plurality of access resources based on the DSN addressing information and the data access request. For example, the processing module performs a decentralized agreement function on identifiers of the plurality of access resources, the DSN addressing information, and a capability level of each access resource to produce the ranked scoring information.

The method continues at step 662 where the processing module selects an access resource of the plurality of access resources based on the ranked scoring information. For example, the processing module selects an access resource associated with a highest score of the ranked scoring information. The method continues at step 664 where the processing module facilitates processing of the data access request by the selected access resource. For example, the processing module sends the data access request to the selected access resource, receives a data access response, and forwards the received data access response to the requesting entity.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc., described with reference to one or more of the embodiments discussed herein. Further, from figure to figure, the embodiments may incorporate the same or similarly named functions, steps, modules, etc., that may use the same or different reference numbers and, as such, the functions, steps, modules, etc., may be the same or similar functions, steps, modules, etc., or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by one or more processing modules of one or more computing devices of a dispersed storage network (DSN), the method comprises:
   receiving a DSN access request regarding at least one data segment of a data object associated with the DSN;
   determining a DSN address associated with the DSN access request;
   performing a scoring function using the DSN address and one or more properties of DSN memory of the DSN to produce a storage scoring resultant, wherein the DSN memory includes a plurality of storage units;
   utilizing the storage scoring resultant to identify a set of storage units of the plurality of storage units; and
   sending a set of access requests to the set of storage units regarding the DSN access request.

2. The method of claim 1, wherein the DSN address includes at least one of a source name, a data segment identifier (ID) of the at least one data segment, a set of slice names associated with the at least one data segment, or a plurality of sets of slice names associated with a plurality of sets of encoded data slices associated with storage of the data object.

3. The method of claim 2, wherein the source name includes at least one of a vault identifier or an object number associated with a data name of the data object.

4. The method of claim 1, wherein the DSN access request includes at least one of a store data request, a retrieve data request, a delete data request, a data name, or a requesting entity identifier.

5. The method of claim 1 further comprises:
when the storage scoring resultant identifies a pillar width number of storage units, utilizing one or more properties of storage units in the pillar width number of storage units to identify at least a decode threshold number of storage units; and
using the at least a decode threshold number of storage units as the set of storage units.

6. The method of claim 1 further comprises:
when the storage scoring resultant identifies particular memory devices within storage units of the plurality of storage units, utilizing one or more properties of storage units in a pillar width number of storage units to identify at least a decode threshold number of storage units;
utilizing one or more properties of memory devices within storage units of the at least a decode threshold number of storage units to identify the set of storage units; and
wherein the set of access requests includes indications of particular memory devices within the set of storage units, and wherein the indications of particular memory devices are based on the one or more properties of memory devices.

7. The method of claim 1, wherein the performing the scoring function further comprises:
selecting a resource level relating to the DSN memory;
selecting the one or more properties of DSN memory from a plurality of properties of the DSN memory based on the selected resource level;
calculating, based on the selected resource level, a plurality of storage values based on the DSN address and the one or more properties of DSN memory; and
performing a ranking function of the plurality of storage values to produce the storage scoring resultant.

8. The method of claim 1, wherein the plurality of storage units of the DSN memory are logically arranged as a plurality of storage pools, and wherein the performing the scoring function further comprises:
selecting a storage pool level indication as a resource level;
selecting a storage pool identifier and a storage pool weighting factor for each of the plurality of storage pools to produce a plurality of storage pool identifiers and a plurality of storage pool weighting factors, wherein the one or more properties of DSN memory includes the plurality of storage pool identifiers and the plurality of storage pool weighting factors;
performing a series of functions on the DSN address based on the plurality of storage pool identifiers and the plurality of storage pool weighting factors to produce a plurality of storage values; and
performing a ranking function of the plurality of storage values to produce the storage scoring resultant.

9. The method of claim 8, wherein a series of the series of functions comprises:
a deterministic function of the DSN address and one of the plurality of storage pool identifiers to produce an interim result;
a normalizing function of the interim result to produce a normalized interim result; and
a scoring function of the normalized interim result and a corresponding one of the plurality of storage pool weighting factors to produce a storage value of the plurality of storage values.

10. The method of claim 1, wherein the performing the scoring function further comprises:
selecting a storage unit level indication as a resource level;
selecting a storage site-storage unit identifier and a storage site-storage weighting factor for each of the plurality of storage units to produce a plurality of storage site-storage unit identifiers and a plurality of storage site-storage unit weighting factors, wherein the one or more properties of DSN memory includes the plurality of storage site-storage unit identifiers and the plurality of storage site-storage unit weighting factors;
performing a series of functions on the DSN address based on the plurality of storage site-storage unit identifiers and the plurality of storage site-storage unit weighting factors to produce a plurality of storage values; and
performing a ranking function of the plurality of storage values to produce the storage scoring resultant.

11. A computer readable storage medium comprises:
at least one memory section that stores operational instructions that, when executed by one or more processing modules of one or more computing devices of a dispersed storage network (DSN), causes the one or more computing devices to:
receive a DSN access request regarding at least one data segment of a data object associated with the DSN;
determine a DSN address associated with the DSN access request;
perform a scoring function using the DSN address and one or more properties of DSN memory of the DSN to produce a storage scoring resultant, wherein the DSN memory includes a plurality of storage units;
utilize the storage scoring resultant to identify a set of storage units of the plurality of storage units; and
send a set of access requests to the set of storage units regarding the DSN access request.

12. The computer readable storage medium of claim 11, wherein the DSN address includes at least one of a source name, a data segment identifier (ID) of the at least one data segment, a set of slice names associated with the at least one data segment, or a plurality of sets of slice names associated with a plurality of sets of encoded data slices associated with storage of the data object.

13. The computer readable storage medium of claim 11 further comprises:
the at least one memory section stores further operational instructions that, when executed by the one or more processing modules, causes the one or more computing devices of the DSN to:
when the storage scoring resultant identifies a pillar width number of storage units, utilize one or more properties of storage units in the pillar width number of storage units to identify at least a decode threshold number of storage units; and
use the at least a decode threshold number of storage units as the set of storage units.

14. The computer readable storage medium of claim 11 further comprises:
the at least one memory section stores further operational instructions that, when executed by the one or more processing modules, causes the one or more computing devices of the DSN to:
when the storage scoring resultant identifies particular memory devices within storage units of the plurality of storage units, utilize one or more properties of storage units in a pillar width number of storage units to identify at least a decode threshold number of storage units;

utilize one or more properties of memory devices within storage units of the at least a decode threshold number of storage units to identify the set of storage units; and wherein the set of access requests includes indications of particular memory devices within the set of storage units, and wherein the indications of particular memory devices are based on the one or more properties of memory devices.

15. The computer readable storage medium of claim 11, wherein the one or more processing modules functions to execute the operational instructions stored by the at least one memory section to cause the one or more computing devices of the DSN to further perform the scoring function by:

selecting a resource level relating to the DSN memory;

selecting the one or more properties of DSN memory from a plurality of properties of the DSN memory based on the selected resource level;

calculating, based on the selected resource level, a plurality of storage values based on the DSN address and the one or more properties of DSN memory; and performing a ranking function of the plurality of storage values to produce the storage scoring resultant.

16. The computer readable storage medium of claim 11, wherein the plurality of storage units of the DSN memory are logically arranged as a plurality of storage pools, and wherein the one or more processing modules functions to execute the operational instructions stored by the at least one memory section to cause the one or more computing devices of the DSN to further perform the scoring function by:

selecting a storage pool level indication as a resource level;

selecting a storage pool identifier and a storage pool weighting factor for each of the plurality of storage pools to produce a plurality of storage pool identifiers and a plurality of storage pool weighting factors, wherein the one or more properties of DSN memory includes the plurality of storage pool identifiers and the plurality of storage pool weighting factors;

performing a series of functions on the DSN address based on the plurality of storage pool identifiers and the plurality of storage pool weighting factors to produce a plurality of storage values; and performing a ranking function of the plurality of storage values to produce the storage scoring resultant.

17. The computer readable storage medium of claim 16, wherein a series of the series of functions comprises:

a deterministic function of the DSN address and one of the plurality of storage pool identifiers to produce an interim result;

a normalizing function of the interim result to produce a normalized interim result; and a scoring function of the normalized interim result and a corresponding one of the plurality of storage pool weighting factors to produce a storage value of the plurality of storage values.

18. The computer readable storage medium of claim 11, wherein the one or more processing modules functions to execute the operational instructions stored by the at least one memory section to cause the one or more computing devices of the DSN to further perform the scoring function by:

selecting a storage unit level indication as a resource level;

selecting a storage site-storage unit identifier and a storage site-storage weighting factor for each of the plurality of storage units to produce a plurality of storage site-storage unit identifiers and a plurality of storage site-storage unit weighting factors, wherein the one or more properties of DSN memory includes the plurality of storage site-storage unit identifiers and the plurality of storage site-storage unit weighting factors;

performing a series of functions on the DSN address based on the plurality of storage site-storage unit identifiers and the plurality of storage site-storage unit weighting factors to produce a plurality of storage values; and performing a ranking function of the plurality of storage values to produce the storage scoring resultant.

19. A computing device of a group of computing devices of a dispersed storage network (DSN), the computing device comprises:

an interface;

a local memory comprising instructions; and a processing module operably coupled to the interface and the local memory, wherein the processing module executes the instructions to:

receive, via the interface, a DSN access request regarding at least one data segment of a data object associated with the DSN;

determine a DSN address associated with the DSN access request;

perform a scoring function using the DSN address and one or more properties of DSN memory of the DSN to produce a storage scoring resultant, wherein the DSN memory includes a plurality of storage units;

utilize the storage scoring resultant to identify a set of storage units of the plurality of storage units; and send, via the interface, a set of access requests to the set of storage units regarding the DSN access request.

20. The computing device of claim 19, wherein the processing module further executes the instructions to:

select a resource level relating to the DSN memory;

select the one or more properties of DSN memory from a plurality of properties of the DSN memory based on the selected resource level;

calculate, based on the selected resource level, a plurality of storage values based on the DSN address and the one or more properties of DSN memory; and perform a ranking function of the plurality of storage values to produce the storage scoring resultant.

* * * * *